United States Patent
Wang et al.

(10) Patent No.: US 12,224,833 B2
(45) Date of Patent: Feb. 11, 2025

(54) CHANNEL INFORMATION FEEDBACK METHOD AND COMMUNICATION APPARATUS

(71) Applicant: HUAWEI TECHNOLOGIES CO., LTD., Guangdong (CN)

(72) Inventors: Jie Wang, Shanghai (CN); Li Fan, Shanghai (CN); Shibin Ge, Shanghai (CN); Hui Wang, Shanghai (CN); Zhimeng Zhong, Moscow (RU); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/331,518

(22) Filed: Jun. 8, 2023

(65) Prior Publication Data

US 2023/0318677 A1 Oct. 5, 2023

Related U.S. Application Data

(63) Continuation of application No. PCT/CN2021/134766, filed on Dec. 1, 2021.

(30) Foreign Application Priority Data

Dec. 11, 2020 (CN) .......................... 202011459381.1

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01)

(58) Field of Classification Search
CPC .. H04B 7/0626; H04B 7/0417; H04B 7/0478; H04B 7/0456; H04B 7/0452; H04L 5/0023; H04L 5/0048

(Continued)

(56) References Cited

U.S. PATENT DOCUMENTS

2016/0100413 A1* 4/2016 Hwang ................ H04B 7/0452
370/330
2016/0205633 A1* 7/2016 Mizusawa ............ H04B 7/0456
455/522

(Continued)

FOREIGN PATENT DOCUMENTS

CN 111082839 A 4/2020
WO 2019144418 A1 8/2019

(Continued)

OTHER PUBLICATIONS

Office Action in Japanese Appln. No. 2023-535277, mailed on Jul. 30, 2024, 10 pages (with English translation).

(Continued)

*Primary Examiner* — Emmanuel Bayard
(74) *Attorney, Agent, or Firm* — Fish & Richardson P.C.

(57) ABSTRACT

This application provides a channel state information (CSI) feedback method including: a terminal device selects B complex coefficients from K complex coefficients according to a preset priority rule, and provides feedback, where K is a quantity of complex coefficients that the terminal device is allowed to feed back, and the preset priority rule is related to at least one of the following: an index value of each complex coefficient in the K complex coefficients, an index value of a reference signal port corresponding to each complex coefficient in the K complex coefficients in S reference signal ports, or an index value of each complex coefficient in the K complex coefficients in a plurality of complex coefficients that are allowed to be selected for a corresponding reference signal port, where S is a quantity of reference signal ports that the terminal device is allowed to select.

36 Claims, 13 Drawing Sheets

(58) Field of Classification Search
USPC .................................................. 375/267, 299
See application file for complete search history.

(56) References Cited

U.S. PATENT DOCUMENTS

| | | | |
|---|---|---|---|
| 2018/0091207 A1* | 3/2018 | Kakishima | ........ H04L 25/03343 |
| 2020/0235790 A1 | 7/2020 | Rahman et al. | |
| 2020/0295812 A1 | 9/2020 | Rahman et al. | |
| 2021/0194559 A1* | 6/2021 | Li | ......................... H04W 24/10 |

FOREIGN PATENT DOCUMENTS

| | | | |
|---|---|---|---|
| WO | 2020125510 A1 | 6/2020 |
| WO | 2020132788 A1 | 7/2020 |
| WO | 2020135101 A1 | 7/2020 |
| WO | 2020221118 A1 | 11/2020 |

OTHER PUBLICATIONS

3GPP TS 38.214 V16.3.0, "3rd Generation Partnership Project; Technical Specification Group Radio Access Network; NR; Physical layer procedures for data (Release 16)," Sep. 2020, 165 pages.
Intel Corporation, "On non-codebook Based UL Transmission," 3GPP TSG-RAN WG1 #89, R1-1707350, Hangzhou, China, May 15-19, 2017, 4 pages.
ZTE, "CSI Enhancement for MU-MIMO Support," 3GPP TSG RAN WG1 Meeting #96. R1-1901633, Athens,Greece, Feb. 25 - Mar. 1, 2019, 15 pages.
Extended European Search Report in European Appln No. 21902453.6, dated May 7, 2024, 10 pages.
International Search Report and Written Opinion in International Appln. No. PCT/CN2021/134766, mailed on Mar. 10, 2022, 10 pages (with partial English translation).

* cited by examiner

CHANNEL INFORMATION FEEDBACK METHOD AND COMMUNICATION APPARATUS

CROSS-REFERENCE TO RELATED APPLICATIONS

This application is a continuation of International Application No. PCT/CN2021/134766, filed on Dec. 1, 2021, which claims priority to Chinese Patent Application No. 202011459381.1, filed on Dec. 11, 2020. The disclosures of the aforementioned applications are hereby incorporated by reference in their entireties.

TECHNICAL FIELD

This application relates to the field of wireless communications, and more specifically, to a channel information feedback method and a communication apparatus.

BACKGROUND

In a massive multiple-input multiple-output (Massive MIMO) technology, a network device can reduce interference between a plurality of users and interference between a plurality of signal streams of a same user by using a precoding technology, so as to improve signal quality, achieve spatial multiplexing, and improve spectrum utilization.

For example, a terminal device may determine, through channel measurement, a precoding vector that adapts to a downlink channel, and expects to provide feedback, so that the network device obtains a precoding vector that is the same as or close to the precoding vector determined by the terminal device. In some communication technologies such as a frequency division duplex (FDD) technology, there is partial reciprocity between uplink and downlink channels. The network device may obtain reciprocity information such as a delay and an angle of a downlink channel through estimation on an uplink channel. The network device may precode a downlink reference signal based on the delay and the angle, and then send the downlink reference signal, to reduce feedback overheads of the terminal device.

However, in some cases, sufficient uplink resources for reporting channel state information (CSI) may not be allocated to the terminal device. In this case, how to fully use limited physical uplink resources to report the CSI without increasing complexity of the terminal device becomes a technical problem to be solved urgently.

SUMMARY

This application provides a channel information feedback method, to report CSI by using limited physical uplink resources.

According to a first aspect, a channel information feedback method is provided. The method may be performed by a terminal device, or may be performed by a component (for example, a circuit, a chip, or a chip system) configured in the terminal device. This is not limited in this application.

The method includes: generating first indication information, where the first indication information is determined based on a received precoded reference signal, and the precoded reference signal corresponds to P reference signal ports; the first indication information indicates B complex coefficients, the B complex coefficients are determined from K complex coefficients according to a preset priority rule, the K complex coefficients are determined from a complex coefficient set, the complex coefficient set includes $T_p$ complex coefficients that are determined at each transport layer in Z transport layers and that correspond to a $p^{th}$ reference signal port in the P reference signal ports, wherein $p=0, 1, \ldots, P-1$, the K complex coefficients correspond to S reference signal ports in the P reference signal ports, and the preset priority rule is related to at least one of the following: an index value of each complex coefficient in the K complex coefficients, an index value of a reference signal port corresponding to each complex coefficient in the K complex coefficients in the S reference signal ports, or an index value of each complex coefficient in the K complex coefficients in a plurality of complex coefficients that are allowed to be selected for a corresponding reference signal port; wherein P, B, K, S, Z, and $T_p$ are all positive integers, B≤K, and S≤P; and sending the first indication information.

With reference to the first aspect, in some possible implementations of the first aspect, the preset priority rule satisfies $pri(k)=f_1(k)$ where $k=0, 1, \ldots, K-1$, $pri(k)$ represents a priority of a $k^{th}$ complex coefficient in the K complex coefficients, $f_1(k)$ represents an index value of the $k^{th}$ complex coefficient that is determined based on the K complex coefficients, and $f_1(k) \in \{0, 1, \ldots, K-1\}$.

In an example, $f_1(k)$ may represent the index value of the $k^{th}$ complex coefficient that is determined in descending order of amplitudes of the K complex coefficients. Smaller $f_1(k)$ indicates a higher priority of the $k^{th}$ complex coefficient. Alternatively, $f_1(k)$ may represent the index value of the $k^{th}$ complex coefficient that is determined in ascending order of amplitudes of the K complex coefficients. Larger $f_1(k)$ indicates a higher priority of the $k^{th}$ complex coefficient.

With reference to the first aspect, in some possible implementations of the first aspect, the preset priority rule satisfies $pri(s)=f_2(s)$ where $s=0, 1, \ldots, S-1$, $pri(s)$ represents a priority of a complex coefficient corresponding to an $s^{th}$ reference signal port in the S reference signal ports, $f_2(s)$ represents an index value of the $s^{th}$ reference signal port that is determined based on the K complex coefficients, and $f_2(s) \in \{0, 1, \ldots, S-1\}$.

It may be understood that, in this implementation, if a plurality of complex coefficients in the K complex coefficients correspond to the $s^{th}$ reference signal port, the plurality of complex coefficients have a same priority.

With reference to the first aspect, in some possible implementations of the first aspect, $T_0=T_1=\ldots=T_{P-1}=T \geq 2$, the K complex coefficients are determined based on U complex coefficients corresponding to each reference signal port in the S reference signal ports at each transport layer in the Z transport layers, and the preset priority rule satisfies $pri(s, u_s)=S \cdot f_3(u_s)+f_2(s)$ where $s=0, 1, \ldots, S-1, u_s=0, 1, \ldots, U-1$, $pri(s,u_s)$ represents a priority of a $u_s^{th}$ complex coefficient that corresponds to an $s^{th}$ reference signal port in the S reference signal ports and that is on the $s^{th}$ reference signal port, $f_2(s)$ represents an index value of the $s^{th}$ reference signal port that is determined based on the K complex coefficients, $f_2(s) \in \{0, 1, \ldots, S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s) \in \{0, 1, \ldots, U-1\}$, U is a positive integer, U≤T, and K≤S×U×Z.

It may be understood that, in this implementation, if the $u_s^{th}$ complex coefficient that is in the K complex coefficients and that corresponds to the $s^{th}$ reference signal port exists at a plurality of transport layers, the $u_s^{th}$ complex coefficients on the $s^{th}$ reference signal ports at the plurality of transport layers have a same priority.

With reference to the first aspect, in some possible implementations of the first aspect, $T_0=T_1=\ldots=T_{P-1}=T\geq 2$, the K complex coefficients are determined based on U complex coefficients corresponding to each reference signal port in the S reference signal ports at each transport layer in the Z transport layers, and the preset priority rule satisfies $pri(s,u_s)=U\cdot f_2(s)+f_3(u_s)$ where $s=0, 1, \ldots, S-1, u_s=0, 1, \ldots, U-1$, $pri(s,u_s)$ represents a priority of a $u_s^{th}$ complex coefficient that corresponds to an $s^{th}$ reference signal port in the S reference signal ports and that is on the $s^{th}$ reference signal port, $f_2(s)$ represents an index value of the $s^{th}$ reference signal port that is determined based on the K complex coefficients, $f_2(s)\in\{0, 1, \ldots, S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s)\in\{0, 1, \ldots, U-1\}$, U is a positive integer, $U\leq T$, and $K\leq S\times U\times Z$.

It may be understood that, in this implementation, if the $u_s^{th}$ complex coefficient that is in the K complex coefficients and that corresponds to the $s^{th}$ reference signal port exists at a plurality of transport layers, the $u_s^{th}$ complex coefficients on the $s^{th}$ reference signal ports at the plurality of transport layers have a same priority.

With reference to the first aspect, in some possible implementations of the first aspect, $f_2(s)$ is a monotonically increasing function related to s, and a smaller sequence number of the $s^{th}$ reference signal port in the S reference signal ports indicates a higher priority of the complex coefficient corresponding to the $s^{th}$ reference signal port; or $f_2(s)$ is a monotonically decreasing function related to s, and a larger sequence number of the $s^{th}$ reference signal port in the S reference signal ports indicates a higher priority of the complex coefficient corresponding to the $s^{th}$ reference signal port.

With reference to the first aspect, in some possible implementations of the first aspect, $f_2(s)$ is a monotonically increasing function related to s, and a priority of a $u^{th}$ complex coefficient corresponding to the $s^{th}$ reference signal port is higher than a priority of a $u^{th}$ complex coefficient corresponding to an $(s+1)^{th}$ reference signal port, where the $u^{th}$ complex coefficient corresponding to the $s^{th}$ reference signal port is a complex coefficient whose index value is u on the $s^{th}$ reference signal port, and the $u^{th}$ complex coefficient corresponding to the $(s+1)^{th}$ reference signal port is a complex coefficient whose index value is u on the $(s+1)^{th}$ reference signal port; or $f_2(s)$ is a monotonically decreasing function related to s, and a priority of a $u^{th}$ complex coefficient corresponding to the $s^{th}$ reference signal port is lower than a priority of a $u^{th}$ complex coefficient corresponding to an $(s+1)^{th}$ reference signal port.

With reference to the first aspect, in some possible implementations of the first aspect, $f_2(s)$ represents the index value of the $s^{th}$ reference signal port that is determined in descending order of amplitudes of the K complex coefficients. Smaller $f_2(s)$ indicates a higher priority of the complex coefficient corresponding to the $s^{th}$ reference signal port. Alternatively, $f_2(s)$ represents the index value of the $s^{th}$ reference signal port that is determined in ascending order of amplitudes of the K complex coefficients. Larger $f_2(s)$ indicates a higher priority of the complex coefficient corresponding to the $s^{th}$ reference signal port.

With reference to the first aspect, in some possible implementations of the first aspect, $f_3(u_s)$ is a monotonically increasing function related to $u_s$, and on the $s^{th}$ reference signal port, a smaller sequence number of $u_s$ indicates a higher priority of a corresponding $u_s^{th}$ complex coefficient; or $f_3(u_s)$ is a monotonically decreasing function related to $u_s$, and on the $s^{th}$ reference signal port, a larger sequence number of $u_s$ indicates a higher priority of a corresponding $u_s^{th}$ complex coefficient.

With reference to the first aspect, in some possible implementations of the first aspect, the preset priority rule is further related to the quantity Z of transport layers, and Z is a positive integer.

With reference to the first aspect, in some possible implementations of the first aspect, the priority rule satisfies $pri(z,k_z)=Z\cdot f_4(k_z)+z$, $k_z=0, 1, \ldots, K-1$, $z=1, 2, \ldots, Z$, $\Sigma_{z=1}^{Z}K_z=K$, $K_z$ represents a quantity of complex coefficients at a $z^{th}$ transport layer in the Z transport layers, $pri(z,k_z)$ represents a priority of a $k_z^{th}$ complex coefficient in $K_z$ complex coefficients at the $z^{th}$ transport layer, $f_4(k_z)$ represents an index value of the $k_z^{th}$ complex coefficient that is at the $z^{th}$ transport layer and that is determined based on the $K_z$ complex coefficients at the $z^{th}$ transport layer, and $f_4(k)\in\{0, 1, \ldots, K-1\}$.

With reference to the first aspect, in some possible implementations of the first aspect, the priority rule satisfies $pri(z,s_z)=Z\cdot f_5(s_z)+z$, $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z)\in\{0, 1, \ldots, S-1\}$, $K_z$ represents a quantity of complex coefficients at the $z^{th}$ transport layer, and $\Sigma_{z=1}^{Z}K_z=K$.

With reference to the first aspect, in some possible implementations of the first aspect, $T_0=T_1=\ldots=T_{P-1}=T\geq 2$, the K complex coefficients are determined based on U complex coefficients corresponding to each reference signal port in the S reference signal ports at each transport layer in the Z transport layers, the priority rule satisfies $pri(z,s_z,u_{s_z})=Z\cdot S\cdot f_6(u_{s_z})+Z\cdot f_5(s_z)+z$, $s_z=0, 1, \ldots, S-1, u_{s_z}=0, 1, \ldots, U-1, z=1, 2, \ldots, Z$, $pri(z,s_z,u_{s_z})$ represents a priority of a $u_{s_z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z)\in\{0, 1, \ldots, S-1\}$, $K_z$ represents a quantity of complex coefficients at the $z^{th}$ transport layer, $\Sigma_{z=1}^{Z}K_z=K$, $f_6(u_{s_z})$ represents an index value of the $u_{s_z}^{th}$ complex coefficient and that is determined based on a complex coefficient corresponding to the $s_z^{th}$ reference signal port at the $z^{th}$ transport layer in the $K_z$ complex coefficients, $f_6(u_{s_z})\in\{0, 1, \ldots, U-1\}$, U is a positive integer, $U\leq T$, and $K\leq S\times U\times Z$.

With reference to the first aspect, in some possible implementations of the first aspect, $T_0=T_1=\ldots=T_{P-1}=T\geq 2$, the K complex coefficients are determined based on U complex coefficients corresponding to each reference signal port in the S reference signal ports at each transport layer in the Z transport layers, the priority rule satisfies $pri(z,s_z,u_{s_z})=Z\cdot U\cdot f_5(s_z)+Z\cdot f_6(u_{s_z})+z$, $s=0, 1, \ldots, S-1, u_{s_z}=0, 1, \ldots, U-1, z=1, 2, \ldots, Z$, $pri(z,s_z,u_{s_z})$ represents a priority of a $u_{s_z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z)\in\{0, 1, \ldots, S-1\}$, $K_z$ represents a quantity of complex coefficients at the $z^{th}$ transport layer, $\Sigma_{z+1}^{Z} K_z = K$, $f_6(u_{s,z})$ represents an index value of the $u_{s,z}^{th}$ complex coefficient that is determined based on a complex coefficient corresponding to the $s_z^{th}$ reference signal port at the $z^{th}$ transport layer in the $K_z$ complex coefficients, $f_6(u_{s,z}) \in \{0, 1, \ldots, U-1\}$, U is a positive integer, $U \leq T$, and $K \leq S \times U \times Z$.

With reference to the first aspect, in some possible implementations of the first aspect, $f_5(s_z)$ is a monotonically increasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port; or $f_5(s_z)$ is a monotonically decreasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

With reference to the first aspect, in some possible implementations of the first aspect, $f_5(s_z)$ is a monotonically increasing function related to $s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, where the $u^{th}$ complex coefficient corresponding to the $s_z^{th}$ reference signal port is a complex coefficient whose index value is u on the $s_z^{th}$ reference signal port, and the $u^{th}$ complex coefficient corresponding to the $(s_z+1)^{th}$ reference signal port is a complex coefficient whose index value is u on the $(s_z+1)^{th}$ reference signal port; or $f_5(s_z)$ is a monotonically decreasing function related to $s_z$, and at the $z^{th}$ transport layer, a priority of a $u^{th}$ complex coefficient corresponding to the $s_z^{th}$ reference signal port is lower than a priority of a $u^{th}$ complex coefficient corresponding to an $(s_z+1)^{th}$ reference signal port.

With reference to the first aspect, in some possible implementations of the first aspect, $f_5(s_z)$ represents the index value of the $s_z$ reference signal port at the $z^{th}$ transport layer that is determined in descending order of amplitudes of the $K_z$ complex coefficients. Smaller $f_5(s_z)$ indicates a higher priority of the complex coefficient corresponding to the $s_z^{th}$ reference signal port at the $z^{th}$ transport layer. Alternatively, $f_5(s_z)$ represents the index value of the $s_z^{th}$ reference signal port at the $z^{th}$ transport layer that is determined in ascending order of amplitudes of the $K_z$ complex coefficients. Larger $f_5(s_z)$ indicates a higher priority of the complex coefficient corresponding to the $s_z^{th}$ reference signal port at the $z^{th}$ transport layer.

With reference to the first aspect, in some possible implementations of the first aspect, $f_6(u_{s,z})$ is a monotonically increasing function related to $u_{s,z}$, and on the $s_z^{th}$ reference signal port at the $z^{th}$ transport layer, a smaller sequence number of $u_{s,z}$ indicates a higher priority of a corresponding $u_{s,z}^{th}$ complex coefficient; or $f_6(u_{s,z})$ is a monotonically decreasing function related to $u_{s,z}$, and on the $s_z^{th}$ reference signal port at the $z^{th}$ transport layer, a larger sequence number of $u_{s,z}$ indicates a higher priority of a corresponding $u_{s,z}^{th}$ complex coefficient.

With reference to the first aspect, in some possible implementations of the first aspect, $T_p=1$, $T_p$ complex coefficients corresponding to the $p^{th}$ reference signal port correspond to one angle-delay pair, and reference signal precoding of the $p^{th}$ reference signal port is determined by one angle-delay pair.

With reference to the first aspect, in some possible implementations of the first aspect, $T_p=1$, $T_p$ complex coefficients corresponding to the $p^{th}$ reference signal port correspond to one angle-delay pair, reference signal precoding of the $p^{th}$ reference signal port is determined by one angle vector, and the method further includes: receiving second indication information, where the second indication information indicates a delay vector corresponding to the $p^{th}$ reference signal port.

With reference to the first aspect, in some possible implementations of the first aspect, $T_0=T_1=\ldots=T_{P-1}=T\geq 2$, T complex coefficients corresponding to the $p^{th}$ reference signal port correspond to one angle-delay pair, the T complex coefficients corresponding to the $p^{th}$ reference signal port correspond to T different delay positions, the $k^{th}$ complex coefficient in the K complex coefficients is one of the T complex coefficients corresponding to the reference signal port corresponding to the $k^{th}$ complex coefficient, and $k=0, 1, \ldots, K-1$.

With reference to the first aspect, in some possible implementations of the first aspect, the $k^{th}$ complex coefficient has a largest amplitude in the T complex coefficients corresponding to the reference signal port corresponding to the $k^{th}$ complex coefficient.

With reference to the first aspect, in some possible implementations of the first aspect, the method further includes: receiving third indication information, where the third indication information indicates the T different delay positions.

With reference to the first aspect, in some possible implementations of the first aspect, the method further includes: sending fourth indication information, where the fourth indication information indicates a delay position corresponding to each complex coefficient in the K complex coefficients.

With reference to the first aspect, in some possible implementations of the first aspect, $T_p \geq 1$, $T_p$ complex coefficients corresponding to the $p^{th}$ reference signal port correspond to $T_p$ angle-delay pairs, reference signal precoding of the $p^{th}$ reference signal port is determined by one angle vector, and the method further includes: receiving fifth indication information, where the fifth indication information indicates $T_p$ delay vectors corresponding to the $p^{th}$ reference signal port.

With reference to the first aspect, in some possible implementations of the first aspect, $T_0=T_1=\ldots=T_{P-1}=T\geq 2$, the T complex coefficients corresponding to the $p^{th}$ reference signal port correspond to T angle-delay pairs, reference signal precoding of the $p^{th}$ reference signal port is determined by the T angle-delay pairs corresponding to the $p^{th}$ reference signal port, the K complex coefficients are determined based on the U complex coefficients corresponding to each reference signal port in the S reference signal ports, U is a positive integer, $U \leq T$, and $K \leq S \times U \times Z$.

With reference to the first aspect, in some possible implementations of the first aspect, $T_0=T_1=\ldots=T_{P-1}=T\geq 2$, the reference signal precoding of the $p^{th}$ reference signal port is determined by $M_p$ angle-delay pairs, $M_p$ complex coefficients in the $T_p$ complex coefficients corresponding to the $p^{th}$ reference signal port correspond to the $M_p$ angle-delay pairs, $T_p - M_p$ complex coefficients in the $T_p$ complex coefficients are determined by searching within a preset delay range, $M_p$ is a positive integer, and $M_p \leq T_p$.

With reference to the first aspect, in some possible implementations of the first aspect, the method further includes: receiving sixth indication information, where the sixth indication information indicates the preset delay range and/or a search delay granularity.

With reference to the first aspect, in some possible implementations of the first aspect, the method further includes: sending seventh indication information, where the seventh indication information indicates a delay position corresponding to each complex coefficient in the K complex coefficients.

According to a second aspect, a channel information feedback method is provided. The method may be performed by a network device, or may be performed by a component (for example, a circuit, a chip, or a chip system) configured in the network device. This is not limited in this application.

The method includes: receiving first indication information, where the first indication information is determined based on a precoded reference signal, and the precoded reference signal corresponds to P reference signal ports; the first indication information indicates B complex coefficients, the B complex coefficients are determined from K complex coefficients according to a preset priority rule, the K complex coefficients are determined from a complex coefficient set, the complex coefficient set includes $T_p$ complex coefficients that are determined at each transport layer in Z transport layers and that correspond to a $p^{th}$ reference signal port in the P reference signal ports, wherein p=0, 1, ..., P−1, the K complex coefficients correspond to S reference signal ports in the P reference signal ports, and the preset priority rule is related to at least one of the following: an index value of each complex coefficient in the K complex coefficients, an index value of a reference signal port corresponding to each complex coefficient in the K complex coefficients in the S reference signal ports, or an index value of each complex coefficient in the K complex coefficients in a plurality of complex coefficients that are allowed to be selected for a corresponding reference signal port; wherein P, B, K, S, Z, and $T_p$ are all positive integers, B≤K, and S≤P; and determining a precoding matrix based on the first indication information.

Based on the foregoing technical solution, if reporting resources of a terminal device are limited, the terminal device may report, according to the foregoing preset priority rule, a calculated complex coefficient. Compared with a method for determining a priority of a reporting amount of CSI part 2 in a known technology, when the network device loads, to a downlink reference signal port, an angle-delay pair or an angle vector included in the angle-delay pair that is obtained based on uplink and downlink channel reciprocity, there is no calculation redundancy when a complex coefficient is reported according to the preset priority rule, thereby reducing complexity of the terminal device.

With reference to the second aspect, in some possible implementations of the second aspect, the preset priority rule satisfies pri(k)=$f_1$(k), where k=0, 1, ..., K−1, pri(k) represents a priority of a $k^{th}$ complex coefficient in the K complex coefficients, $f_1$(k) represents an index value of the $k^{th}$ complex coefficient that is determined based on the K complex coefficients, and $f_1(k) \in \{0, 1, ..., K-1\}$.

In an example, $f_1$(k) may represent the index value of the $k^{th}$ complex coefficient that is determined in descending order of amplitudes of the K complex coefficients. Smaller $f_1$(k) indicates a higher priority of the $k^{th}$ complex coefficient. Alternatively, $f_1$(k) may represent the index value of the $k^{th}$ complex coefficient that is determined in ascending order of amplitudes of the K complex coefficients. Larger $f_1$(k) indicates a higher priority of the $k^{th}$ complex coefficient.

With reference to the second aspect, in some possible implementations of the second aspect, the preset priority rule satisfies pri(s)=$f_2$(s), where s=0, 1, ..., S−1, pri(s) represents a priority of a complex coefficient corresponding to an $s^{th}$ reference signal port in the S reference signal ports, $f_2$(s) represents an index value of the $s^{th}$ reference signal port that is determined based on the K complex coefficients, and $f_2(s) \in \{0, 1, ..., S-1\}$.

It may be understood that, in this implementation, if a plurality of complex coefficients in the K complex coefficients correspond to the $s^{th}$ reference signal port, the plurality of complex coefficients have a same priority.

With reference to the second aspect, in some possible implementations of the second aspect, $T_0 = T_1 = ... = T_{P-1} = T \geq 2$, the K complex coefficients are determined based on U complex coefficients corresponding to each reference signal port in the S reference signal ports at each transport layer in the Z transport layers, and the preset priority rule satisfies pri(s,$u_s$)=S·$f_3(u_s)$+$f_2$(s) where s=0, 1, ..., S−1, $u_s$=0, 1, ..., U−1, pri(s,$u_s$) represents a priority of a $u_s^{th}$ complex coefficient that corresponds to an $s^{th}$ reference signal port in the S reference signal ports and that is on the $s^{th}$ reference signal port, $f_2$(s) represents an index value of the $s^{th}$ reference signal port that is determined based on the K complex coefficients, $f_2(s) \in \{0, 1, ..., S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s) \in \{0, 1, ..., U-1\}$, U is a positive integer, U≤T, and K≤S×U×Z.

It may be understood that, in this implementation, if the $u_s^{th}$ complex coefficient that is in the K complex coefficients and that corresponds to the $s^{th}$ reference signal port exists at a plurality of transport layers, the $u_s^{th}$ complex coefficients on the $s^{th}$ reference signal ports at the plurality of transport layers have a same priority.

With reference to the second aspect, in some possible implementations of the second aspect, $T_0 = T_1 = ... = T_{P-1} = T \geq 2$, the K complex coefficients are determined based on U complex coefficients corresponding to each reference signal port in the S reference signal ports at each transport layer in the Z transport layers, and the preset priority rule satisfies pri(s,$u_s$)=U·$f_2$(s)+$f_3(u_s)$ where s=0, 1, ..., S−1, $u_s$=0, 1, ..., U−1, pri(s,$u_s$) represents a priority of a $u_s^{th}$ complex coefficient that corresponds to an $s^{th}$ reference signal port in the S reference signal ports and that is on the $s^{th}$ reference signal port, $f_2$(s) represents an index value of the $s^{th}$ reference signal port that is determined based on the K complex coefficients, $f_2(s) \in \{0, 1, ..., S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s) \in \{0, 1, ..., U-1\}$, U is a positive integer, U≤T, and K≤S×U×Z.

It may be understood that, in this implementation, if the $u_s^{th}$ complex coefficient that is in the K complex coefficients and that corresponds to the $s^{th}$ reference signal port exists at a plurality of transport layers, the $u_s^{th}$ complex coefficients on the $s^{th}$ reference signal ports at the plurality of transport layers have a same priority.

With reference to the second aspect, in some possible implementations of the second aspect, $f_2$(s) is a monotonically increasing function related to s, and a smaller sequence number of the $s^{th}$ reference signal port in the S reference signal ports indicates a higher priority of the complex coefficient corresponding to the $s^{th}$ reference signal port; or $f_2$(s) is a monotonically decreasing function related to s, and a larger sequence number of the $s^{th}$ reference signal port in the S reference signal ports indicates a higher priority of the complex coefficient corresponding to the $s^{th}$ reference signal port.

With reference to the second aspect, in some possible implementations of the second aspect, $f_2(s)$ is a monotonically increasing function related to s, and a priority of a $u^{th}$ complex coefficient corresponding to the $s^{th}$ reference signal port is higher than a priority of a $u^{th}$ complex coefficient corresponding to an $(s+1)^{th}$ reference signal port, where the $u^{th}$ complex coefficient corresponding to the $s^{th}$ reference signal port is a complex coefficient whose index value is u on the $s^{th}$ reference signal port, and the $u^{th}$ complex coefficient corresponding to the $(s+1)^{th}$ reference signal port is a complex coefficient whose index value is u on the $(s+1)^{th}$ reference signal port; or $f_2(s)$ is a monotonically decreasing function related to s, and a priority of a $u^{th}$ complex coefficient corresponding to the $s^{th}$ reference signal port is lower than a priority of a $u^{th}$ complex coefficient corresponding to an $(s+1)^{th}$ reference signal port.

With reference to the second aspect, in some possible implementations of the second aspect, $f_2(s)$ represents the index value of the $s^{th}$ reference signal port that is determined in descending order of amplitudes of the K complex coefficients. Smaller $f_2(s)$ indicates a higher priority of the complex coefficient corresponding to the $s^{th}$ reference signal port. Alternatively, $f_2(s)$ represents the index value of the $s^{th}$ reference signal port that is determined in ascending order of amplitudes of the K complex coefficients. Larger $f_2(s)$ indicates a higher priority of the complex coefficient corresponding to the $s^{th}$ reference signal port.

With reference to the second aspect, in some possible implementations of the second aspect, $f_3(u_s)$ is a monotonically increasing function related to $u_s$, and on the $s^{th}$ reference signal port, a smaller sequence number of $u_s$ indicates a higher priority of a corresponding $u_s^{th}$ complex coefficient; or $f_3(u_s)$ is a monotonically decreasing function related to $u_s$, and on the $s^{th}$ reference signal port, a larger sequence number of $u_s$ indicates a higher priority of a corresponding $u_s^{th}$ complex coefficient.

With reference to the second aspect, in some possible implementations of the second aspect, the preset priority rule is further related to the quantity Z of transport layers, and Z is a positive integer.

With reference to the second aspect, in some possible implementations of the second aspect, the priority rule satisfies $pri(z,k_z)=Z \cdot f_4(k_z)+z$, $k_z=0, 1, \ldots, K-1$, $z=1, 2, \ldots, Z$, $\Sigma_{z=1}^{Z}K_z=K$, $K_z$ represents a quantity of complex coefficients at a $z^{th}$ transport layer in the Z transport layers, $pri(z,k_z)$ represents a priority of a $k_z^{th}$ complex coefficient in $K_z$ complex coefficients at the $z^{th}$ transport layer, $f_4(k_z)$ represents an index value of the $k_z^{th}$ complex coefficient that is at the $z^{th}$ transport layer and that is determined based on the $K_z$ complex coefficients at the $z^{th}$ transport layer, and $f_4(k_z) \in \{0, 1, \ldots, K-1\}$.

With reference to the second aspect, in some possible implementations of the second aspect, the priority rule satisfies $pri(z,s_z)=Z \cdot f_5(s_z)+z$, $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $s$ ($s_z$) represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\Sigma_{z=1}^{Z}K_z=K$.

With reference to the second aspect, in some possible implementations of the second aspect, $T_0=T_1=\ldots=T_{P-1}=T \geq 2$, the K complex coefficients are determined based on U complex coefficients corresponding to each reference signal port in the S reference signal ports at each transport layer in the Z transport layers, the priority rule satisfies $pri(z,s_z,u_{s,z})=Z \cdot S \cdot f_6(u_{s,z})+Z \cdot f_5(s_z)+z$, $s_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z}K_z=K$, $f_6(u_{s,z})$ represents an index value of the $u_{s,z}^{th}$ complex coefficient that is determined based on a complex coefficient corresponding to the $s_z^{th}$ reference signal port at the $z^{th}$ transport layer in the $K_z$ complex coefficients, $f_6(u_{s,z}) \in \{0, 1, \ldots, U-1\}$, U is a positive integer, $U \leq T$, and $K \leq S \times U \times Z$.

With reference to the second aspect, in some possible implementations of the second aspect, $T_0=T_1=\ldots=T_{P-1}=T \geq 2$, the K complex coefficients are determined based on U complex coefficients corresponding to each reference signal port in the S reference signal ports at each transport layer in the Z transport layers, the priority rule satisfies $pri(z,s_z,u_{s,z})=Z \cdot U \cdot f_5(s_z)+Z \cdot f_6(u_{s,z})+z$, $s_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z}K_z=K$, $f_6(u_{s,z})$ represents an index value of the $u_{s,z}^{th}$ complex coefficient that is determined based on a complex coefficient corresponding to the $s_z^{th}$ reference signal port at the $z^{th}$ transport layer in the $K_z$ complex coefficients, $f_6(u_{s,z}) \in \{0, 1, \ldots, U-1\}$, U is a positive integer, $U \leq T$, and $K \leq S \times U \times Z$.

With reference to the second aspect, in some possible implementations of the second aspect, $f_5(s_z)$ is a monotonically increasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port; or $f_5(s_z)$ is a monotonically decreasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

With reference to the second aspect, in some possible implementations of the second aspect, $f_5(s_z)$ is a monotonically increasing function related to $s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, where the $u^{th}$ complex coefficient corresponding to the $s_z^{th}$ reference signal port is a complex coefficient whose index value is u on the $s_z^{th}$ reference signal port, and the $u^{th}$ complex coefficient corresponding to the $(s_z+1)^{th}$ reference signal port is a complex coefficient whose index value is u on the $(s_z+1)^{th}$ reference signal port; or $f_5(s_z)$ is a monotonically decreasing function related to $s_z$, and at the $z^{th}$ transport layer, a priority of a $u^{th}$ complex coefficient corresponding to the $s_z^{th}$ reference signal port is lower than a priority of a $u^{th}$ complex coefficient corresponding to an $(s_z+1)^{th}$ reference signal port.

With reference to the second aspect, in some possible implementations of the second aspect, $f_5(s_z)$ represents the index value of the $s_z$ reference signal port at the $z^{th}$ transport layer that is determined in descending order of amplitudes of the $K_z$ complex coefficients. Smaller $f_5(s_z)$ indicates a higher priority of the complex coefficient corresponding to the $s_z^{th}$ reference signal port at the $z^{th}$ transport layer. Alternatively, $f_5(s_z)$ represents the index value of the $s_z^{th}$ reference signal port at the $z^{th}$ transport layer that is determined in ascending order of amplitudes of the $K_z$ complex coefficients. Larger $f_5(s_z)$ indicates a higher priority of the complex coefficient corresponding to the $s_z^{th}$ reference signal port at the $z^{th}$ transport layer.

With reference to the second aspect, in some possible implementations of the second aspect, $f_6(u_{s,z})$ is a monotonically increasing function related to $u_{s,z}$, and on the $s_z^{th}$ reference signal port at the $z^{th}$ transport layer, a smaller sequence number of $u_{s,z}$ indicates a higher priority of a corresponding $u_{s,z}^{th}$ complex coefficient; or $f_6(u_{s,z})$ is a monotonically decreasing function related to $u_{s,z}$, and on the $s_z^{th}$ reference signal port at the $z^{th}$ transport layer, a larger sequence number of $u_{s,z}$ indicates a higher priority of a corresponding $u_{s,z}^{th}$ complex coefficient.

With reference to the second aspect, in some possible implementations of the second aspect, $T_p=1$, $T_p$ complex coefficients corresponding to the $p^{th}$ reference signal port correspond to one angle-delay pair, and reference signal precoding of the $p^{th}$ reference signal port is determined by one angle-delay pair.

With reference to the second aspect, in some possible implementations of the second aspect, $T_p=1$, $T_p$ complex coefficients corresponding to the $p^{th}$ reference signal port correspond to one angle-delay pair, reference signal precoding of the $p^{th}$ reference signal port is determined by one angle vector, and the method further includes: sending second indication information, where the second indication information indicates a delay vector corresponding to the $p^{th}$ reference signal port.

With reference to the second aspect, in some possible implementations of the second aspect, $T_0=T_1=\ldots=T_{P-1}=T\geq 2$, T complex coefficients corresponding to the $p^{th}$ reference signal port correspond to one angle-delay pair, the T complex coefficients corresponding to the $p^{th}$ reference signal port correspond to T different delay positions, the $k^{th}$ complex coefficient in the K complex coefficients is one of the T complex coefficients corresponding to the reference signal port corresponding to the $k^{th}$ complex coefficient, and $k=0, 1, \ldots, K-1$.

With reference to the second aspect, in some possible implementations of the second aspect, the $k^{th}$ complex coefficient has a largest amplitude in the T complex coefficients corresponding to the reference signal port corresponding to the $k^{th}$ complex coefficient.

With reference to the second aspect, in some possible implementations of the second aspect, the method further includes: sending third indication information, where the third indication information indicates the T different delay positions.

With reference to the second aspect, in some possible implementations of the second aspect, the method further includes: receiving fourth indication information, where the fourth indication information indicates a delay position corresponding to each complex coefficient in the K complex coefficients.

With reference to the second aspect, in some possible implementations of the second aspect, $T_p\geq 1$, $T_p$ complex coefficients corresponding to the $p^{th}$ reference signal port correspond to $T_p$ angle-delay pairs, reference signal precoding of the $p^{th}$ reference signal port is determined by one angle vector, and the method further includes: sending fifth indication information, where the fifth indication information indicates $T_p$ delay vectors corresponding to the $p^{th}$ reference signal port.

With reference to the second aspect, in some possible implementations of the second aspect, $T_0=T_1=\ldots=T_{P-1}=T\geq 2$, the T complex coefficients corresponding to the $p^{th}$ reference signal port correspond to T angle-delay pairs, reference signal precoding of the $p^{th}$ reference signal port is determined by the T angle-delay pairs corresponding to the $p^{th}$ reference signal port, the K complex coefficients are determined based on the U complex coefficients corresponding to each reference signal port in the S reference signal ports, U is a positive integer, $U\leq T$, and $K\leq S\times U\times Z$.

With reference to the second aspect, in some possible implementations of the second aspect, $T_0=T_1=\ldots=T_{P-1}=T\geq 2$, the reference signal precoding of the $p^{th}$ reference signal port is determined by $M_p$ angle-delay pairs, $M_p$ complex coefficients in the $T_p$ complex coefficients corresponding to the $p^{th}$ reference signal port correspond to the $M_p$ angle-delay pairs, $T_p-M_p$ complex coefficients in the $T_p$ complex coefficients are determined by searching within a preset delay range, $M_p$ is a positive integer, and $M_p\leq T_p$.

With reference to the second aspect, in some implementations of the second aspect, the method further includes: sending sixth indication information, where the sixth indication information indicates the preset delay range and/or a search delay granularity.

With reference to the second aspect, in some implementations of the second aspect, the method further includes: receiving seventh indication information, where the seventh indication information indicates a delay position corresponding to each complex coefficient in the K complex coefficients.

According to a third aspect, a communication apparatus is provided, including a transceiver unit and a processing unit. The processing unit is configured to generate first indication information, where the first indication information is determined based on a received precoded reference signal, and the precoded reference signal corresponds to P reference signal ports; the first indication information indicates B complex coefficients, the B complex coefficients are determined from K complex coefficients according to a preset priority rule, the K complex coefficients are determined from a complex coefficient set, the complex coefficient set includes $T_p$ complex coefficients that are determined at each transport layer in Z transport layers and that correspond to a $p^{th}$ reference signal port in the P reference signal ports, wherein $p=0, 1, \ldots, P-1$, the K complex coefficients correspond to S reference signal ports in the P reference signal ports, and the preset priority rule is related to at least one of the following: an index value of each complex coefficient in the K complex coefficients, an index value of a reference signal port corresponding to each complex coefficient in the K complex coefficients in the S reference signal ports, or an index value of each complex coefficient in the K complex coefficients in a plurality of complex coefficients that are allowed to be selected for a corresponding reference signal port; wherein P, B, K, S, Z, and $T_p$ are all positive integers, $B\leq K$, and $S\leq P$. The transceiver unit is configured to send the first indication information.

With reference to the third aspect, in some possible implementations of the third aspect, the preset priority rule satisfies $pri(k)=f_1(k)$ where $k=0, 1, \ldots, K-1$, $pri(k)$ represents a priority of a $k^{th}$ complex coefficient in the K complex coefficients, $f_1(k)$ represents an index value of the $k^{th}$ complex coefficient that is determined based on the K complex coefficients, and $f_1(k) \in \{0, 1, \ldots, K-1\}$.

In an example, $f_1(k)$ may represent the index value of the $k^{th}$ complex coefficient that is determined in descending order of amplitudes of the K complex coefficients. Smaller $f_1(k)$ indicates a higher priority of the $k^{th}$ complex coefficient. Alternatively, $f_1(k)$ may represent the index value of the $k^{th}$ complex coefficient that is determined in ascending order of amplitudes of the K complex coefficients. Larger $f_1(k)$ indicates a higher priority of the $k^{th}$ complex coefficient.

With reference to the third aspect, in some possible implementations of the third aspect, the preset priority rule satisfies $pri(s)=f_2(s)$ where $s=0, 1, \ldots, S-1$, $pri(s)$ represents a priority of a complex coefficient corresponding to an $s^{th}$ reference signal port in the S reference signal ports, $f_2(s)$ represents an index value of the $s^{th}$ reference signal port that is determined based on the K complex coefficients, and $f_2(s) \in \{0, 1, \ldots, S-1\}$.

With reference to the third aspect, in some possible implementations of the third aspect, $T_0=T_1=\ldots=T_{P-1}=T \geq 2$, the K complex coefficients are determined based on U complex coefficients corresponding to each reference signal port in the S reference signal ports at each transport layer in the Z transport layers, and the preset priority rule satisfies $pri(s,u_s)=S \cdot f_3(u_s)+f_2(s)$ where $s=0, 1, \ldots, S-1$, $u_s=0, 1, \ldots, U-1$, $pri(s,u_s)$ represents a priority of a $u_s^{th}$ complex coefficient that corresponds to an $s^{th}$ reference signal port in the S reference signal ports and that is on the $s^{th}$ reference signal port, $f_2(s)$ represents an index value of the $s^{th}$ reference signal port that is determined based on the K complex coefficients, $f_2(s) \in \{0, 1, \ldots, S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s) \in \{0, 1, \ldots, U-1\}$, U is a positive integer, $U \leq T$, and $K \leq S \times U \times Z$.

With reference to the third aspect, in some possible implementations of the third aspect, $T_0=T_1=\ldots=T_{P-1}=T \geq 2$, the K complex coefficients are determined based on U complex coefficients corresponding to each reference signal port in the S reference signal ports at each transport layer in the Z transport layers, and the preset priority rule satisfies $pri(s,u_s)=U \cdot f_2(s)+f_3(u_s)$ where $s=0, 1, \ldots, S-1$, $u_s=0, 1, \ldots, U-1$, $pri(s,u_s)$ represents a priority of a $u_s^{th}$ complex coefficient that corresponds to an $s^{th}$ reference signal port in the S reference signal ports and that is on the $s^{th}$ reference signal port, $f_2(s)$ represents an index value of the $s^{th}$ reference signal port that is determined based on the K complex coefficients, $f_2(s) \in \{0, 1, \ldots, S-1\}$, $f_3(u_s)$ represents an index value of the $u_s^{th}$ complex coefficient that is on the $s^{th}$ reference signal port and that is determined based on a complex coefficient corresponding to the $s^{th}$ reference signal port in the K complex coefficients, $f_3(u_s) \in \{0, 1, \ldots, U-1\}$, U is a positive integer, $U \leq T$, and $K \leq S \times U \times Z$.

With reference to the third aspect, in some possible implementations of the third aspect, $f_2(s)$ is a monotonically increasing function related to s, and a smaller sequence number of the $s^{th}$ reference signal port in the S reference signal ports indicates a higher priority of the complex coefficient corresponding to the $s^{th}$ reference signal port; or $f_2(s)$ is a monotonically decreasing function related to s, and a larger sequence number of the $s^{th}$ reference signal port in the S reference signal ports indicates a higher priority of the complex coefficient corresponding to the $s^{th}$ reference signal port.

With reference to the third aspect, in some possible implementations of the third aspect, $f_2(s)$ is a monotonically increasing function related to s, and a priority of a $u^{th}$ complex coefficient corresponding to the $s^{th}$ reference signal port is higher than a priority of a $u^{th}$ complex coefficient corresponding to an $(s+1)^{th}$ reference signal port, where the $u^{th}$ complex coefficient corresponding to the $s^{th}$ reference signal port is a complex coefficient whose index value is u on the $s^{th}$ reference signal port, and the $u^{th}$ complex coefficient corresponding to the $(s+1)^{th}$ reference signal port is a complex coefficient whose index value is u on the $(s+1)^{th}$ reference signal port; or $f_2(s)$ is a monotonically decreasing function related to s, and a priority of a $u^{th}$ complex coefficient corresponding to the $s^{th}$ reference signal port is lower than a priority of a $u^{th}$ complex coefficient corresponding to an $(s+1)^{th}$ reference signal port.

With reference to the third aspect, in some possible implementations of the third aspect, $f_2(s)$ represents the index value of the $s^{th}$ reference signal port that is determined in descending order of amplitudes of the K complex coefficients. Smaller $f_2(s)$ indicates a higher priority of the complex coefficient corresponding to the $s^{th}$ reference signal port. Alternatively, $f_2(s)$ represents the index value of the $s^{th}$ reference signal port that is determined in ascending order of amplitudes of the K complex coefficients. Larger $f_2(s)$ indicates a higher priority of the complex coefficient corresponding to the $s^{th}$ reference signal port.

With reference to the third aspect, in some possible implementations of the third aspect, $f_3(u_s)$ is a monotonically increasing function related to $u_s$, and on the $s^{th}$ reference signal port, a smaller sequence number of $u_s$ indicates a higher priority of a corresponding $u_s^{th}$ complex coefficient; or $f_3(u_s)$ is a monotonically decreasing function related to $u_s$, and on the $s^{th}$ reference signal port, a larger sequence number of $u_s$ indicates a higher priority of a corresponding $u_s^{th}$ complex coefficient.

With reference to the third aspect, in some possible implementations of the third aspect, the preset priority rule is further related to the quantity Z of transport layers, and Z is a positive integer.

With reference to the third aspect, in some possible implementations of the third aspect, the priority rule satisfies $pri(z,k_z)=Z \cdot f_4(k_z)+z$, $k_z=0, 1, \ldots, K_z-1$, $z=1, 2, \ldots, Z$, $\sum_{z=1}^{Z} K_z=K$, $K_z$ represents a quantity of complex coefficients at a $z^{th}$ transport layer in the Z transport layers, $pri(z,k_z)$ represents a priority of a $k_z^{th}$ complex coefficient in $K_z$ complex coefficients at the $z^{th}$ transport layer, $f_4(k_z)$ represents an index value of the $k_z^{th}$ complex coefficient that is at the $z^{th}$ transport layer and that is determined based on the $K_z$ complex coefficients at the $z^{th}$ transport layer, and $f_4(k_z) \in \{0, 1, \ldots, K_z-1\}$.

With reference to the third aspect, in some possible implementations of the third aspect, the priority rule satisfies $pri(z,s_z)=Z \cdot f_5(s_z)+z$, $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\sum_{z=1}^{Z} K_z=K$.

With reference to the third aspect, in some possible implementations of the third aspect, $T_0=T_1=\ldots=T_{P-1}=T \geq 2$, the K complex coefficients are determined based on U complex coefficients corresponding to each reference signal port in the S reference signal ports at each transport layer in the Z transport layers, the priority rule satisfies $\text{pri}(z, s_z, u_{s_z z}) = Z \cdot S \cdot f_6(u_{s_z z}) + Z \cdot f_5(s_z) + z$, $s_z = 0, 1, \ldots, S-1$, $u_{s_z z} = 0, 1, \ldots, U-1$, $z = 1, 2, \ldots, Z$, $\text{pri}(z, s_z, u_{s_z z})$ represents a priority of a $u_{s_z z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z} K_z = K$, $f_6(u_{s_z z})$ represents an index value of the $u_{s_z z}^{th}$ complex coefficient that is determined based on a complex coefficient corresponding to the $s_z^{th}$ reference signal port at the $z^{th}$ transport layer in the $K_z$ complex coefficients, $f_6(u_{s_z z}) \{0, 1, \ldots, U-1\}$, U is a positive integer, $U \leq T$, and $K \leq S \times U \times Z$.

With reference to the third aspect, in some possible implementations of the third aspect, $T_0 = T_1 = \ldots = T_{P-1} = T \geq 2$, the K complex coefficients are determined based on U complex coefficients corresponding to each reference signal port in the S reference signal ports at each transport layer in the Z transport layers, the priority rule satisfies $\text{pri}(z, s_z, u_{s_z z}) = Z \cdot U \cdot f_5(s_z) + Z \cdot f_6(u_{s_z z}) + z$, $s = 0, 1, \ldots, S-1$, $u_{s_z z} = 0, 1, \ldots, U-1$, $z = 1, 2, \ldots, Z$, $\text{pri}(z, s_z, u_{s_z z})$ represents a priority of a $u_{s_z z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z} K_z = K$, $f_6(u_{s_z z})$ represents an index value of the $u_{s_z z}^{th}$ complex coefficient that is determined based on a complex coefficient corresponding to the $s_z^{th}$ reference signal port at the $z^{th}$ transport layer in the $K_z$ complex coefficients, $f_6(u_{s_z z}) \{0, 1, \ldots, U-1\}$, U is a positive integer, $U \leq T$, and $K \leq S \times U \times Z$.

With reference to the third aspect, in some possible implementations of the third aspect, $f_5(s_z)$ is a monotonically increasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port; or $f_5(s_z)$ is a monotonically decreasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

With reference to the third aspect, in some possible implementations of the third aspect, $f_5(s_z)$ is a monotonically increasing function related to $s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, where the $u^{th}$ complex coefficient corresponding to the $s_z^{th}$ reference signal port is a complex coefficient whose index value is u on the $s_z^{th}$ reference signal port, and the $u^{th}$ complex coefficient corresponding to the $(s_z+1)^{th}$ reference signal port is a complex coefficient whose index value is u on the $(s_z+1)^{th}$ reference signal port; or $f_5(s_z)$ is a monotonically decreasing function related to $s_z$, and at the $z^{th}$ transport layer, a priority of a $u^{th}$ complex coefficient corresponding to the $s_z^{th}$ reference signal port is lower than a priority of a $u^{th}$ complex coefficient corresponding to an $(s_z+1)^{th}$ reference signal port.

With reference to the third aspect, in some possible implementations of the third aspect, $f_5(s_z)$ represents the index value of the $s_z^{th}$ reference signal port at the $z^{th}$ transport layer that is determined in descending order of amplitudes of the $K_z$ complex coefficients. Smaller $f_5(s_z)$ indicates a higher priority of the complex coefficient corresponding to the $s_z^{th}$ reference signal port at the $z^{th}$ transport layer. Alternatively, $f_5(s_z)$ represents the index value of the $s_z^{th}$ reference signal port at the $z^{th}$ transport layer that is determined in ascending order of amplitudes of the $K_z$ complex coefficients. Larger $f_5(s_z)$ indicates a higher priority of the complex coefficient corresponding to the $s_z^{th}$ reference signal port at the $z^{th}$ transport layer.

With reference to the third aspect, in some possible implementations of the third aspect, $f_6(u_{s_z z})$ is a monotonically increasing function related to $u_{s_z z}$, and on the $s_z^{th}$ reference signal port at the $z^{th}$ transport layer, a smaller sequence number of $u_{s_z z}$ indicates a higher priority of a corresponding $u_{s_z z}^{th}$ complex coefficient; or $f_6(u_{s_z z})$ is a monotonically decreasing function related to $u_{s_z z}$, and on the $s_z^{th}$ reference signal port at the $z^{th}$ transport layer, a larger sequence number of $u_{s_z z}$ indicates a higher priority of a corresponding $u_{s_z z}$ complex coefficient.

With reference to the third aspect, in some possible implementations of the third aspect, $T_p = 1$, $T_p$ complex coefficients corresponding to the $p^{th}$ reference signal port correspond to one angle-delay pair, and reference signal precoding of the $p^{th}$ reference signal port is determined by one angle-delay pair.

With reference to the third aspect, in some possible implementations of the third aspect, $T_p = 1$, $T_p$ complex coefficients corresponding to the $p^{th}$ reference signal port correspond to one angle-delay pair, and reference signal precoding of the $p^{th}$ reference signal port is determined by one angle vector. The transceiver unit is further configured to receive second indication information, where the second indication information indicates a delay vector corresponding to the $p^{th}$ reference signal port.

With reference to the third aspect, in some possible implementations of the third aspect, $T_0 = T_1 = \ldots = T_{P-1} = T \geq 2$, T complex coefficients corresponding to the $p^{th}$ reference signal port correspond to one angle-delay pair, the T complex coefficients corresponding to the $p^{th}$ reference signal port correspond to T different delay positions, the $k^{th}$ complex coefficient in the K complex coefficients is one of the T complex coefficients corresponding to the reference signal port corresponding to the $k^{th}$ complex coefficient, and $k = 0, 1, \ldots, K-1$.

With reference to the third aspect, in some possible implementations of the third aspect, the $k^{th}$ complex coefficient has a largest amplitude in the T complex coefficients corresponding to the reference signal port corresponding to the $k^{th}$ complex coefficient.

With reference to the third aspect, in some possible implementations of the third aspect, the transceiver unit is further configured to receive third indication information, where the third indication information indicates the T different delay positions.

With reference to the third aspect, in some possible implementations of the third aspect, the transceiver unit is further configured to send fourth indication information, where the fourth indication information indicates a delay position corresponding to each complex coefficient in the K complex coefficients.

With reference to the third aspect, in some possible implementations of the third aspect, $T_p \geq 1$, $T_p$ complex coefficients corresponding to the $p^{th}$ reference signal port correspond to $T_p$ angle-delay pairs, and reference signal precoding of the $p^{th}$ reference signal port is determined by one angle vector. The transceiver unit is further configured to receive fifth indication information, where the fifth indication information indicates $T_p$ delay vectors corresponding to the $p^{th}$ reference signal port.

With reference to the third aspect, in some possible implementations of the third aspect, $T_0=T_1=\ldots=T_{P-1}=T\geq 2$, the T complex coefficients corresponding to the $p^{th}$ reference signal port correspond to T angle-delay pairs, reference signal precoding of the $p^{th}$ reference signal port is determined by the T angle-delay pairs corresponding to the $p^{th}$ reference signal port, the K complex coefficients are determined based on the U complex coefficients corresponding to each reference signal port in the S reference signal ports, U is a positive integer, U≤T, and K≤S×U×Z.

With reference to the third aspect, in some possible implementations of the third aspect, $T_0=T_1=\ldots=T_{P-1}=T\geq 2$, the reference signal precoding of the $p^{th}$ reference signal port is determined by $M_p$ angle-delay pairs, $M_p$ complex coefficients in the $T_p$ complex coefficients corresponding to the $p^{th}$ reference signal port correspond to the $M_p$ angle-delay pairs, $T_p$-$M_p$ complex coefficients in the $T_p$ complex coefficients are determined by searching within a preset delay range, $M_p$ is a positive integer, and $M_p\leq T_p$.

With reference to the third aspect, in some possible implementations of the third aspect, the transceiver unit is further configured to receive sixth indication information, where the sixth indication information indicates the preset delay range and/or a search delay granularity.

With reference to the third aspect, in some possible implementations of the third aspect, the transceiver unit is further configured to send seventh indication information, where the seventh indication information indicates a delay position corresponding to each complex coefficient in the K complex coefficients.

According to a fourth aspect, a communication apparatus is provided, including a transceiver unit and a processing unit. The transceiver unit is configured to receive first indication information, where the first indication information is determined based on a precoded reference signal, and the precoded reference signal corresponds to P reference signal ports; the first indication information indicates B complex coefficients, the B complex coefficients are determined from K complex coefficients according to a preset priority rule, the K complex coefficients are determined from a complex coefficient set, the complex coefficient set includes $T_p$ complex coefficients that are determined at each transport layer in Z transport layers and that correspond to a $p^{th}$ reference signal port in the P reference signal ports, wherein p=0, 1, . . . , P−1, the K complex coefficients correspond to S reference signal ports in the P reference signal ports, and the preset priority rule is related to at least one of the following: an index value of each complex coefficient in the K complex coefficients, an index value of a reference signal port corresponding to each complex coefficient in the K complex coefficients in the S reference signal ports, or an index value of each complex coefficient in the K complex coefficients in a plurality of complex coefficients that are allowed to be selected for a corresponding reference signal port; wherein P, B, K, S, Z, and $T_p$ are all positive integers, B≤K, and S≤P. The processing unit is configured to determine a precoding matrix based on the first indication information.

With reference to the fourth aspect, in some possible implementations of the fourth aspect, the preset priority rule satisfies pri(k)=$f_1$(k), where k=0, 1, . . . , K−1, pri(k) represents a priority of a $k^{th}$ complex coefficient in the K complex coefficients, $f_1$(k) represents an index value of the $k^{th}$ complex coefficient that is determined based on the K complex coefficients, and $f_1$(k)∈{0, 1, . . . , K−1}.

In an example, $f_1$(k) may represent the index value of the $k^{th}$ complex coefficient that is determined in descending order of amplitudes of the K complex coefficients. Smaller $f_1$(k) indicates a higher priority of the $k^{th}$ complex coefficient. Alternatively, $f_1$(k) may represent the index value of the $k^{th}$ complex coefficient that is determined in ascending order of amplitudes of the K complex coefficients. Larger $f_1$(k) indicates a higher priority of the $k^{th}$ complex coefficient.

With reference to the fourth aspect, in some possible implementations of the fourth aspect, the preset priority rule satisfies pri(s)=$f_2$(s), where s=0, 1, . . . , S−1, pri(s) represents a priority of a complex coefficient corresponding to an $s^{th}$ reference signal port in the S reference signal ports, $f_2$(s) represents an index value of the $s^{th}$ reference signal port that is determined based on the K complex coefficients, and $f_2$(s)∈{0, 1, . . . , S−1}.

With reference to the fourth aspect, in some possible implementations of the fourth aspect, $T_0=T_1=\ldots=T_{P-1}=T\geq 2$, the K complex coefficients are determined based on U complex coefficients corresponding to each reference signal port in the S reference signal ports at each transport layer in the Z transport layers, and the preset priority rule satisfies pri(s,$u_s$)=S·$f_3$($u_s$)+$f_2$(s) where s=0, 1, . . . , S−1, $u_s$=0, 1, . . . , U−1, pri(s,$u_s$) represents a priority of a $u_s^{th}$ complex coefficient that corresponds to an $s^{th}$ reference signal port in the S reference signal ports and that is on the $s^{th}$ reference signal port, $f_2$(s) represents an index value of the $s^{th}$ reference signal port that is determined based on the K complex coefficients, $f_2$(s)∈{0, 1, . . . , S−1}, $f_3$($u_s$) represents an index value of the $u_s^{th}$ complex coefficient that is on the $s^{th}$ reference signal port and that is determined based on a complex coefficient corresponding to the $s^{th}$ reference signal port in the K complex coefficients, $f_3$($u_s$)∈{0, 1, . . . , U−1}, U is a positive integer, U≤T, and K≤S×U×Z.

With reference to the fourth aspect, in some possible implementations of the fourth aspect, $T_0=T_1=\ldots=T_{P-1}=T\geq 2$, the K complex coefficients are determined based on U complex coefficients corresponding to each reference signal port in the S reference signal ports at each transport layer in the Z transport layers, and the preset priority rule satisfies pri(s,$u_s$)=U·$f_2$(s)+$f_3$($u_s$) where s=0, 1, . . . , S−1, $u_s$=0, 1, . . . , U−1, pri(s,$u_s$) represents a priority of a $u_s^{th}$ complex coefficient that corresponds to an $s^{th}$ reference signal port in the S reference signal ports and that is on the $s^{th}$ reference signal port, $f_2$(s) represents an index value of the $s^{th}$ reference signal port that is determined based on the K complex coefficients, $f_2$(s)∈{0, 1, . . . , S−1}, $f_3$($u_s$) represents an index value of the $u_s^{th}$ complex coefficient that is on the $s^{th}$ reference signal port and that is determined based on a complex coefficient corresponding to the $s^{th}$ reference signal port in the K complex coefficients, $f_3$(s)∈{0, 1, . . . , U−1}, U is a positive integer, U≤T, and K≤S×U×Z.

With reference to the fourth aspect, in some possible implementations of the fourth aspect, $f_2$(s) is a monotonically increasing function related to s, and a smaller sequence number of the $s^{th}$ reference signal port in the S reference signal ports indicates a higher priority of the complex coefficient corresponding to the $s^{th}$ reference signal port; or $f_2$(s) is a monotonically decreasing function related to s, and a larger sequence number of the $s^{th}$ reference signal port in the S reference signal ports indicates a higher priority of the complex coefficient corresponding to the $s^{th}$ reference signal port.

With reference to the fourth aspect, in some possible implementations of the fourth aspect, $f_2$(s) is a monotonically increasing function related to s, and a priority of a $u^{th}$ complex coefficient corresponding to the $s^{th}$ reference signal port is higher than a priority of a $u^{th}$ complex coefficient corresponding to an $(s+1)^{th}$ reference signal port, where the $u^{th}$ complex coefficient corresponding to the $s^{th}$ reference signal port is a complex coefficient whose index value is u on the $s^{th}$ reference signal port, and the $u^{th}$ complex coefficient corresponding to the $(s+1)^{th}$ reference signal port is a complex coefficient whose index value is u on the $(s+1)^{th}$ reference signal port; or $f_2(s)$ is a monotonically decreasing function related to s, and a priority of a $u^{th}$ complex coefficient corresponding to the $s^{th}$ reference signal port is lower than a priority of a $u^{th}$ complex coefficient corresponding to an $(s+1)^{th}$ reference signal port.

With reference to the fourth aspect, in some possible implementations of the fourth aspect, $f_2(s)$ represents the index value of the $s^{th}$ reference signal port that is determined in descending order of amplitudes of the K complex coefficients. Smaller $f_2(s)$ indicates a higher priority of the complex coefficient corresponding to the $s^{th}$ reference signal port. Alternatively, $f_2(s)$ represents the index value of the $s^{th}$ reference signal port that is determined in ascending order of amplitudes of the K complex coefficients. Larger $f_2(s)$ indicates a higher priority of the complex coefficient corresponding to the $s^{th}$ reference signal port.

With reference to the fourth aspect, in some possible implementations of the fourth aspect, $f_3(u_s)$ is a monotonically increasing function related to $u_s$, and on the $s^{th}$ reference signal port, a smaller sequence number of $u_s$ indicates a higher priority of a corresponding $u_s^{th}$ complex coefficient; or $f_3(u_s)$ is a monotonically decreasing function related to $u_s$, and on the $s^{th}$ reference signal port, a larger sequence number of $u_s$ indicates a higher priority of a corresponding $u_s^{th}$ complex coefficient.

With reference to the fourth aspect, in some possible implementations of the fourth aspect, the preset priority rule is further related to the quantity Z of transport layers, and Z is a positive integer.

With reference to the fourth aspect, in some possible implementations of the fourth aspect, the priority rule satisfies $pri(z,k_z)=Z \cdot f_4(k_z)+z$, $k_z=0, 1, \ldots, K-1$, $z=1, 2, \ldots, Z$, $\Sigma_{z=1}^{Z} K_z=K$, $K_z$ represents a quantity of complex coefficients at a $z^{th}$ transport layer in the Z transport layers, $pri(z,k_z)$ represents a priority of a $k_z^{th}$ complex coefficient in $K_z$ complex coefficients at the $z^{th}$ transport layer, $f_4(k_z)$ represents an index value of the $k_z^{th}$ complex coefficient that is at the $z^{th}$ transport layer and that is determined based on the $K_z$ complex coefficients at the $z^{th}$ transport layer, and $f_4(k) \in \{0, 1, \ldots, K-1\}$.

With reference to the fourth aspect, in some possible implementations of the fourth aspect, the priority rule satisfies $pri(z,s_z)=Z \cdot f_5(s_z)+z$, $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\Sigma_{z=1}^{Z} K_z=K$.

With reference to the fourth aspect, in some possible implementations of the fourth aspect, $T_0=T_1=\ldots=T_{P-1}=T \geq 2$, the K complex coefficients are determined based on U complex coefficients corresponding to each reference signal port in the S reference signal ports at each transport layer in the Z transport layers, the priority rule satisfies $pri(z,s_z,u_{s,z})=Z \cdot S \cdot f_6(u_{s,z})+Z \cdot f_5(s_z)+z$, $s_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z} K_z=K$, $f_6(u_{s,z})$ represents an index value of the $u_{s,z}^{th}$ complex coefficient that is determined based on a complex coefficient corresponding to the $s_z^{th}$ reference signal port at the $z^{th}$ transport layer in the $K_z$ complex coefficients, $f_6(u_{s,z}) \in \{0, 1, \ldots, U-1\}$, U is a positive integer, $U \leq T$, and $K \leq S \times U \times Z$.

With reference to the fourth aspect, in some possible implementations of the fourth aspect, $T_0=T_1=\ldots=T_{P-1}=T \geq 2$, the K complex coefficients are determined based on U complex coefficients corresponding to each reference signal port in the S reference signal ports at each transport layer in the Z transport layers, the priority rule satisfies $pri(z,s_z,u_{s,z})=Z \cdot U \cdot f_5(s)+Z \cdot f_6(u_{s,z})+z$, $s_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\Sigma_{z=1}^{Z} K_z=K$, $f_6(u_{s,z})$ represents an index value of the $u_{s,z}^{th}$ complex coefficient that is determined based on a complex coefficient in the Kz complex coefficients that corresponds to the $s_z^{th}$ reference signal port at the $z^{th}$ transport layer, $f_6(u_{s,z}) \in \{0, 1, \ldots, U-1\}$, U is a positive integer, $U \leq T$, and $K \leq S \times U \times Z$.

With reference to the fourth aspect, in some possible implementations of the fourth aspect, $f_5(s_z)$ is a monotonically increasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port; or $f_5(s_z)$ is a monotonically decreasing function related to $s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

With reference to the fourth aspect, in some possible implementations of the fourth aspect, $f_5(s_z)$ is a monotonically increasing function related to $s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, where the $u^{th}$ complex coefficient corresponding to the $s_z^{th}$ reference signal port is a complex coefficient whose index value is u on the $s_z^{th}$ reference signal port, and the $u^{th}$ complex coefficient corresponding to the $(s_z+1)^{th}$ reference signal port is a complex coefficient whose index value is u on the $(s_z+1)^{th}$ reference signal port; or $f_5(s_z)$ is a monotonically decreasing function related to $s_z$, and at the $z^{th}$ transport layer, a priority of a $u^{th}$ complex coefficient corresponding to the $s_z^{th}$ reference signal port is lower than a priority of a $u^{th}$ complex coefficient corresponding to an $(s_z+1)^{th}$ reference signal port.

With reference to the fourth aspect, in some possible implementations of the fourth aspect, $f_5(s_z)$ represents the index value of the $s_z^{th}$ reference signal port at the $z^{th}$ transport layer that is determined in descending order of amplitudes of the $K_z$ complex coefficients. Smaller $f_5(s_z)$ indicates a higher priority of the complex coefficient corresponding to the $s_z^{th}$ reference signal port at the $z^{th}$ transport layer. Alternatively, $f_5(s_z)$ represents the index value of the $s_z^{th}$ reference signal port at the $z^{th}$ transport layer that is determined in ascending order of amplitudes of the $K_z$ complex coefficients. Larger $f_5(s_z)$ indicates a higher priority of the complex coefficient corresponding to the $s_z^{th}$ reference signal port at the $z^{th}$ transport layer.

With reference to the fourth aspect, in some possible implementations of the fourth aspect, $f_6(u_{s,z})$ is a monotonically increasing function related to $u_{s,z}$ and on the $s_z^{th}$ reference signal port at the $z^{th}$ transport layer, a smaller sequence number of $u_{s,z}$ indicates a higher priority of a corresponding $u_{s,z}^{th}$ complex coefficient; or $f_6(u_{s,z})$ is a monotonically decreasing function related to $u_{s,z}$, and on the $s_z^{th}$ reference signal port at the $z^{th}$ transport layer, a larger sequence number of $u_{s,z}$ indicates a higher priority of a corresponding $u_{s,z}$ complex coefficient.

With reference to the fourth aspect, in some possible implementations of the fourth aspect, $T_p=1$, $T_p$ complex coefficients corresponding to the $p^{th}$ reference signal port correspond to one angle-delay pair, and reference signal precoding of the $p^{th}$ reference signal port is determined by one angle-delay pair.

With reference to the fourth aspect, in some possible implementations of the fourth aspect, $T_p=1$, $T_p$ complex coefficients corresponding to the $p^{th}$ reference signal port correspond to one angle-delay pair, and reference signal precoding of the $p^{th}$ reference signal port is determined by one angle vector. The transceiver unit is further configured to send second indication information, where the second indication information indicates a delay vector corresponding to the $p^{th}$ reference signal port.

With reference to the fourth aspect, in some possible implementations of the fourth aspect, $T_0=T_1=\ldots=T_{P-1}=T\geq 2$, T complex coefficients corresponding to the $p^{th}$ reference signal port correspond to one angle-delay pair, the T complex coefficients corresponding to the $p^{th}$ reference signal port correspond to T different delay positions, the $k^{th}$ complex coefficient in the K complex coefficients is one of the T complex coefficients corresponding to the reference signal port corresponding to the $k^{th}$ complex coefficient, and $k=0, 1, \ldots, K-1$.

With reference to the fourth aspect, in some possible implementations of the fourth aspect, the $k^{th}$ complex coefficient has a largest amplitude in the T complex coefficients corresponding to the reference signal port corresponding to the $k^{th}$ complex coefficient.

With reference to the fourth aspect, in some possible implementations of the fourth aspect, the transceiver unit is further configured to send third indication information, where the third indication information indicates the T different delay positions.

With reference to the fourth aspect, in some possible implementations of the fourth aspect, the transceiver unit is further configured to receive fourth indication information, where the fourth indication information indicates a delay position corresponding to each complex coefficient in the K complex coefficients.

With reference to the fourth aspect, in some possible implementations of the fourth aspect, $T_p\geq 1$, $T_p$ complex coefficients corresponding to the $p^{th}$ reference signal port correspond to $T_p$ angle-delay pairs, and reference signal precoding of the $p^{th}$ reference signal port is determined by one angle vector. The transceiver unit is further configured to send fifth indication information, where the fifth indication information indicates $T_p$ delay vectors corresponding to the $p^{th}$ reference signal port.

With reference to the fourth aspect, in some possible implementations of the fourth aspect, $T_0=T_1=\ldots=T_{P-1}=T\geq 2$, the T complex coefficients corresponding to the $p^{th}$ reference signal port correspond to T angle-delay pairs, reference signal precoding of the $p^{th}$ reference signal port is determined by the T angle-delay pairs corresponding to the $p^{th}$ reference signal port, the K complex coefficients are determined based on the U complex coefficients corresponding to each reference signal port in the S reference signal ports, U is a positive integer, $U\leq T$, and $K\leq S\times U\times Z$.

With reference to the fourth aspect, in some possible implementations of the fourth aspect, $T_0=T_1=\ldots=T_{P-1}=T\geq 2$, the reference signal precoding of the $p^{th}$ reference signal port is determined by $M_p$ angle-delay pairs, $M_p$ complex coefficients in the $T_p$ complex coefficients corresponding to the $p^{th}$ reference signal port correspond to the $M_p$ angle-delay pairs, $T_p-M_p$ complex coefficients in the $T_p$ complex coefficients are determined by searching within a preset delay range, $M_p$ is a positive integer, and $M_p\leq T_p$.

With reference to the fourth aspect, in some implementations of the fourth aspect, the transceiver unit is further configured to send sixth indication information, where the sixth indication information indicates the preset delay range and/or a search delay granularity.

With reference to the fourth aspect, in some implementations of the fourth aspect, the transceiver unit is further configured to receive seventh indication information, where the seventh indication information indicates a delay position corresponding to each complex coefficient in the K complex coefficients.

According to a fifth aspect, a communication apparatus is provided, and includes a processor. The processor is coupled to a memory, and may be configured to execute instructions in the memory, to implement the method according to any one of the possible implementations of the first aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a terminal device. When the communication apparatus is the terminal device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a sixth aspect, a communication apparatus is provided. The communication apparatus includes a processor. The processor is coupled to a memory, and may be configured to execute instructions in the memory, to implement the method according to any one of the possible implementations of the second aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an implementation, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a seventh aspect, a processor is provided. The processor includes an input circuit, an output circuit, and a processing circuit. The processing circuit is configured to receive a signal by using the input circuit, and transmit a signal by using the output circuit, to enable the processor to perform the method according to any one of the possible implementations of the first aspect and the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal outputted by the output circuit may be outputted to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a processing apparatus is provided. The processing apparatus includes a communication interface and a processor. The communication interface is coupled to the processor. The communication interface is configured to input and/or output information. The information includes at least one of instructions and data. The processor is configured to execute a computer program, to enable the processing apparatus to perform the method according to any one of the possible implementations of the first aspect and the second aspect.

Optionally, there are one or more processors, and there are one or more memories.

According to a ninth aspect, a processing apparatus is provided. The processing apparatus includes a processor and a memory. The processor is configured to read instructions stored in the memory, and may receive a signal through a receiver, and transmit a signal through a transmitter, to enable the processing apparatus to perform the method according to any one of the possible implementations of the first aspect and the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in embodiments of this application.

It should be understood that in a related information exchange process, for example, sending of indication information may be a process of outputting the indication information from the processor, and receiving of the indication information may be a process of inputting the received indication information to the processor. The information outputted by the processor may be outputted to the transmitter, and the inputted information received by the processor may be from the receiver. The transmitter and the receiver may be collectively referred to as a transceiver.

The apparatuses in the eighth aspect and the ninth aspect may be chips. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor, and exist independently.

According to a tenth aspect, a computer program product is provided. The computer program product includes a computer program (which may also be referred to as code or instructions). When the computer program is run, a computer is enabled to perform the method according to any one of the possible implementations of the first aspect and the second aspect.

According to an eleventh aspect, a computer-readable medium is provided. The computer-readable medium stores a computer program (which may also be referred to as code or instructions). When the computer program is run on a computer, the computer is enabled to perform the method according to any one of the possible implementations of the first aspect and the second aspect.

According to a twelfth aspect, a communication system is provided. The communication system includes the foregoing terminal device and network device.

DESCRIPTION OF EMBODIMENTS

Figure 1:
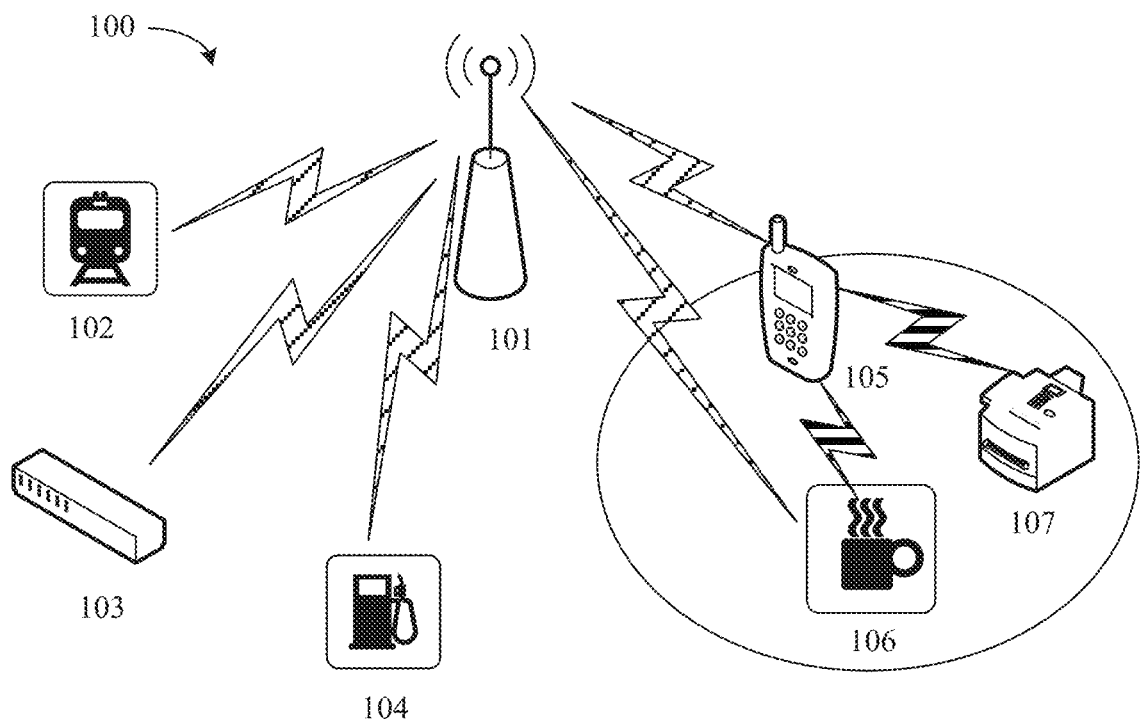
FIG. 1 is a schematic diagram of a communications system to which a channel information feedback method according to an embodiment of this application is applicable.

The following describes technical solutions of this application with reference to the accompanying drawings.

The technical solutions provided in this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) mobile communication system, or a new radio access technology (NR). The 5G mobile communication system may include a non-standalone (NSA) communication system and/or a standalone (SA) communication system.

The technical solutions provided in this application may be further applied to machine type communication (MTC), long term evolution-machine (LTE-M), a device-to-device (D2D) network, a machine-to-machine (M2M) network, an internet of things (IoT) network, or another network. The IoT network may include, for example, internet of vehicles. Communication modes in an internet of vehicles system are collectively referred to as vehicle-to-X (vehicle-to-X, V2X, where X may represent anything). For example, the V2X may include vehicle-to-vehicle (V2V) communication, vehicle-to-infrastructure (V2I) communication, vehicle-to-pedestrian (V2P) communication, or vehicle-to-network (V2N) communication.

The technical solutions provided in this application may be further applied to a future communication system, for example, a sixth generation mobile communication system. This is not limited in this application.

In embodiments of this application, a network device may be any device having a wireless transceiver function. The device includes but is not limited to: an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), or a transmission reception point (TRP). Alternatively, the network device may be a gNB in a 5G system, for example, an NR system, a transmission point (TRP or TP), one or a group of (including a plurality of antenna panels) antenna panels of a base station in a 5G system, or a network node that constitutes a gNB or a transmission point, for example, a baseband unit (BBU) or a distributed unit (DU).

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, to implement functions of a radio link control (RLC) layer, a medium access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or the DU and the AAU. It may be understood that the network device may be a device including one or more of a CU node, a DU node, or an AAU node. In addition, the CU may be classified into a network device in an access network (RAN), or the CU may be classified into a network device in a core network (CN). This is not limited in this application.

The network device serves a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device having a wireless connection function or a vehicle-mounted device. Currently, some examples of the terminal may be: a mobile phone, a tablet computer (pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, and a terminal device in a future evolved public land mobile network (PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. IoT is an important part in future development of information technologies. A main technical feature of the IoT is to connect things to a network by using a communication technology, to implement an intelligent network for human-machine interconnection and thing-thing interconnection. IoT technologies can achieve massive connections, deep coverage, and terminal power saving by using a narrowband (NB) technology or the like.

In addition, the terminal device may alternatively include sensors such as an intelligent printer, a train detector, and a gas station, and main functions of the terminal device include: collecting data (which is a function of some terminal devices), receiving control information and downlink data of a network device, sending an electromagnetic wave, and transmitting uplink data to the network device.

For ease of understanding of embodiments of this application, a communication system to which a channel measurement method according to an embodiment of this application is applicable is first described in detail with reference to FIG. 1. FIG. 1 is a schematic diagram of a communication system 100 to which a method according to an embodiment of this application is applicable. As shown in the figure, the communication system 100 may include at least one network device, such as a network device 101 shown in FIG. 1. The communication system 100 may further include at least one terminal device, such as terminal devices 102 to 107 shown in FIG. 1. The terminal devices 102 to 107 may be movable or fixed. The network device 101 may communicate with one or more of the terminal devices 102 to 107 through a radio link. Each network device may provide communication coverage for a particular geographic area, and may communicate with a terminal device within the coverage. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 constitute a communication system.

Optionally, the terminal devices may directly communicate with each other, for example, by using a D2D technology. As shown in the figure, the terminal devices 105 and 106, and the terminal devices 105 and 107 may directly communicate with each other by using the D2D technology. The terminal devices 106 and 107 may separately or simultaneously communicate with the terminal device 105.

The terminal devices 105 to 107 may alternatively communicate with the network device 101 separately. For example, the terminal devices 105 to 107 may directly communicate with the network device 101. For example, the terminal devices 105 and 106 in the figure may directly communicate with the network device 101. Alternatively, the terminal devices 105 to 107 may indirectly communicate with the network device 101. For example, the terminal device 107 in the figure communicates with the network device 101 through the terminal device 105.

It should be understood that FIG. 1 shows an example of one network device, a plurality of terminal devices, and communication links between communication devices. Optionally, the communication system 100 may include a plurality of network devices, and coverage of each network device may include another quantity of terminal devices, for example, more or fewer terminal device. This is not limited in this application.

A plurality of antennas may be configured for each of the foregoing communication devices, for example, the network device 101 and the terminal devices 102 to 107 in FIG. 1. The plurality of antennas may include at least one transmitting antenna for sending a signal and at least one receiving antenna for receiving a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

Optionally, the communications system 100 may further include another network entity, for example, a network controller or a mobility management entity. This is not limited in embodiments of this application.

To better understand embodiments of this application, the following several items are described before embodiments of this application.

First, for ease of understanding, physical meanings represented by several letters in embodiments of this application are first described as follows:

Q denotes a quantity of angle-delay pairs obtained by the network device based on uplink and downlink channel reciprocity, where Q is an integer greater than 1.

X denotes a quantity of angle vectors that are included in the Q angle-delay pairs and that are different from each other, where X is a positive integer.

P denotes a quantity of reference signal ports, that is, a quantity of ports obtained by performing spatial domain precoding or performing spatial domain precoding and frequency domain precoding on a reference signal, where P is a positive integer.

S denotes a quantity of reference signal ports that are allowed to be selected and that correspond to a complex coefficient reported by the terminal device, where S is a positive integer.

$T_p$ denotes a quantity of complex coefficients obtained by the terminal device through calculation on a $p^{th}$ reference signal port, where $T_p$ is a positive integer, and p=0, 1, ..., P−1.

K denotes a quantity of complex coefficients selected by the terminal device, where K is a positive integer.

U denotes a quantity of complex coefficients that the terminal device is allowed to select on each reference signal port, where U is a positive integer.

B denotes a quantity of complex coefficients fed back by the terminal device, where B is a positive integer.

Z denotes a quantity of transport layers, where Z is a positive integer.

Second, in embodiments of this application, for ease of description, numbering may be performed consecutively starting from 0. For example, the P reference signal ports may include a $0^{th}$ reference signal port to a $(P−1)^{th}$ reference signal port, and the U complex coefficients may include a $0^{th}$ complex coefficient to a $(U−1)^{th}$ complex coefficient. Certainly, this imposes no limitation during specific implementation. For example, numbering may alternatively be performed consecutively starting from 1. For example, the Z transport layers may include a first transport layer to a $Z^{th}$ transport layer, the Q angle-delay pairs may include a first angle-delay pair to a $Q^{th}$ angle-delay pair, and the P reference signal ports may include a first reference signal port to a $P^{th}$ reference signal port. For brevity, examples are not listed herein.

It should be understood that the foregoing descriptions are all set to help describe the technical solutions provided in embodiments of this application, but are not intended to limit the scope of this application.

Third, in this application, "indicating" may include "directly indicating" and "indirectly indicating". When a piece of indication information is described as indicating A, the indication information may directly indicate A or indirectly indicate A, but it does not necessarily indicate that the indication information carries A.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of various pieces of information that is pre-agreed on (for example, stipulated in a protocol), to reduce indication overheads to some extent. In addition, a common part of various pieces of information may be further identified and indicated, to reduce indication overheads caused by separately indicating same information. For example, a person skilled in the art should understand that a precoding matrix includes precoding vectors, and the precoding vectors in the precoding matrix may have a same part in terms of composition or another attribute.

Furthermore, specific indication manners may alternatively be various existing indication manners, for example, but not limited to, the foregoing indication manners and various combinations thereof. For details of the various indication manners, refer to the conventional technology. Details are not described in this specification. It can be learned from the foregoing descriptions that, when a plurality of pieces of information of a same type need to be indicated, different pieces of information may be indicated in different manners, or the like. In a specific implementation process, a required indication manner may be selected based on a specific requirement. The selected indication manner is not limited in embodiments of this application. In this way, the indication manner in embodiments of this application should be understood as covering various methods through which a to-be-indicated party learns of the to-be-indicated information.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmitting end device by sending configuration information to a receiving end device. By way of example but not limitation, the configuration information may include one or a combination of at least two of radio resource control signaling, medium access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Fourth, definitions listed in this application for many features (for example, a precoding matrix indicator (PMI), a channel, a resource block (resource block, RB), a resource block group (RBG), a subband, a precoding resource block group (PRG), a resource element (RE), an angle, and a delay) are merely used to explain functions of the features by using an example. For detailed content, refer to the conventional technology.

Fifth, the first, the second, and various numbers in the following embodiments are used for differentiation only for ease of description, and are not used to limit the scope of embodiments of this application. For example, the terms are used to differentiate between different indication information.

Sixth, "predefinition" or "preconfiguration" may be implemented by pre-storing corresponding code or a corresponding table in a device (for example, including the terminal device and the network device) or in another manner that can be used to indicate related information. A specific implementation of "predefinition" or "preconfiguration" is not limited in this application. "Storage" may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Seventh, a "protocol" in embodiments of this application may be a standard protocol in the communications field, for example, may include an LTE protocol, an NR protocol, and a related protocol applied to a future communication system. This is not limited in this application.

Eighth, "at least one" means one or more, and "a plurality of" means two or more. In addition, "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

Ninth, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation; and do not mean any other limitation.

To help understand embodiments of this application, the following briefly describes terms in embodiments of this application.

1. Channel reciprocity: In some communication modes, for example, TDD, uplink and downlink channels transmit signals on a same frequency domain resource but different time domain resources. Within a short time period (for example, a coherence time period of channel propagation), it may be considered that the signals on the uplink and downlink channels encounter same channel fading. This is reciprocity between the uplink and downlink channels. Based on the reciprocity between the uplink and downlink channels, the network device may measure the uplink channel based on an uplink reference signal such as a sounding reference signal (SRS), and may estimate the downlink channel based on the uplink channel, to determine a precoding matrix used for downlink transmission.

However, in some other communication modes, for example, FDD, because a frequency band interval between uplink and downlink channels is far greater than a coherence bandwidth, and there is no complete reciprocity between the uplink and downlink channels, a precoding matrix that is used for downlink transmission and that is determined by using the uplink channel may not adapt to the downlink channel. However, in the FDD mode, there is still partial reciprocity such as angle reciprocity and delay reciprocity between the uplink and downlink channels. Therefore, an angle and a delay may also be referred to as reciprocity parameters.

When a signal is transmitted through a radio channel, the signal may arrive at a receiving antenna through a plurality of paths from a transmitting antenna. A multipath delay causes frequency selective fading, namely, a change in a frequency domain channel. The delay is an amount of transmission time of a radio signal on different transmission paths, is determined by a distance and a speed, and is irrelevant to frequency domain of the radio signal. When a signal is transmitted on different transmission paths, there are different transmission delays due to different distances. Because physical locations of the network device and the terminal device are fixed, multipath distribution delays on the uplink and downlink channels are the same. Therefore, delays on the uplink and downlink channels in the FDD mode may be considered to be the same, that is, reciprocal.

In addition, the angle may be an angle of arrival (AOA) at which a signal arrives at a receiving antenna through a radio channel, or may be an angle of departure (AOD) at which a signal is transmitted through a transmitting antenna. In embodiments of this application, the angle may be an angle of arrival at which an uplink signal arrives at the network device, or may be an angle of departure at which the network device transmits a downlink signal. Due to transmission path reciprocity between the uplink and downlink channels on different frequencies, an angle of arrival of an uplink reference signal and an angle of departure of a downlink reference signal may be considered to be reciprocal.

In embodiments of this application, each angle may be represented by one angle vector, and each delay may be represented by one delay vector. Therefore, in embodiments of this application, one angle vector may represent one angle, and one delay vector may represent one delay.

Each angle vector may be combined with one delay vector described below to obtain one angle-delay pair. In other words, one angle-delay pair may include one angle vector and one delay vector.

2. Reference signal (RS) and precoded reference signal: The reference signal may also be referred to as a pilot, a reference sequence, or the like. In embodiments of this application, the reference signal may be a reference signal used for channel measurement. For example, the reference signal may be a channel state information reference signal (CSI-RS) used for measuring a downlink channel, or may be an SRS used for measuring an uplink channel. It should be understood that the foregoing reference signals is merely an example, and should not constitute any limitation on this application. This application does not exclude a possibility of defining another reference signal in a future protocol to implement a same or similar function.

The precoded reference signal may be a reference signal obtained by precoding the reference signal. Precoding may include beamforming and/or phase rotation. For example, beamforming may be implemented by precoding a downlink reference signal based on one or more angle vectors, and phase rotation may be implemented by precoding a downlink reference signal based on one or more delay vectors.

In embodiments of this application, for ease of distinguishing and description, a reference signal obtained through precoding such as beamforming and/or phase rotation is referred to as a precoded reference signal, and a reference signal on which precoding is not performed is referred to as a reference signal for short.

In embodiments of this application, precoding a downlink reference signal based on one or more angle vectors may also be referred to as loading the one or more angle vectors to the downlink reference signal to implement beamforming, and precoding a downlink reference signal based on one or more delay vectors may also be referred to as loading the one or more delay vectors to the downlink reference signal to implement phase rotation.

3. Angle vector: The angle vector may also be referred to as a spatial domain vector, a beam vector, or the like. The angle vector may be understood as a precoding vector used to perform beamforming on a reference signal. A process of precoding the reference signal based on the angle vector may be considered as a process of performing precoding in spatial domain.

The angle vector may be a vector whose length is $N_{tx}$. $N_{tx}$ may represent a quantity of transmitting antenna ports, and $N_{tx}$ is an integer greater than 1. An angle vector whose length is $N_{tx}$ includes $N_{tx}$ spatial domain weights, and the $N_{tx}$ weights may be used to weight $N_{tx}$ transmitting antenna ports, so that reference signals transmitted by the $N_{tx}$ transmitting antenna ports have specific spatial directivity, thereby implementing beamforming.

Precoding a reference signal based on different angle vectors is equivalent to performing beamforming on a transmitting antenna port based on different angle vectors, so that transmitted reference signals have different spatial directivity.

Optionally, the angle vector is a discrete Fourier transform (DFT) vector. The DFT vector may be a vector in a DFT matrix.

Optionally, the angle vector is a conjugate transpose vector of a DFT vector. The conjugate transpose vector of the DFT vector may be a column vector in a conjugate transpose matrix of a DFT matrix.

Optionally, the angle vector is an oversampled DFT vector. The oversampled DFT vector may be a vector in an oversampled DFT matrix.

In a possible design, the angle vector may be, for example, a two-dimensional (2D)-DFT vector $v_{l,m}$ defined in a type II codebook in the 3rd Generation Partnership Project (3GPP) technical specification (TS) 38.214 release 15 (R15) or R16. In other words, the angle vector may be a 2D-DFT vector or an oversampled 2D-DFT vector.

It should be understood that a specific form of the angle vector is merely an example, and should not constitute any limitation on this application. For example, the delay vector may be obtained from a DFT matrix. A specific form of the delay vector is not limited in this application.

It should be further understood that the angle vector is a form representing an angle in this application. The angle vector is named only for ease of distinguishing from the delay vector, and should not constitute any limitation on this application. This application does not exclude a possibility of defining another name in a future protocol to represent a same or similar meaning.

If a real downlink channel is denoted as V, V may be represented as a matrix whose dimension is R×$N_{tx}$. R is a quantity of receiving antenna ports, and $N_{tx}$ is a quantity of transmitting antenna ports. R and $N_{tx}$ are both positive integers. In downlink transmission, a precoded reference signal obtained by precoding a reference signal based on the angle vector may be transmitted to the terminal device through a downlink channel. Therefore, a channel measured by the terminal device based on the received precoded reference signal is equivalent to a channel to which the angle vector is loaded. For example, a channel obtained after the angle vector $a_i$ is loaded to the downlink channel V may be represented as $Va_i$. In other words, loading the angle vector to the reference signal is loading the angle vector is loaded to the channel.

4. Delay vector: The delay vector may also be referred to as a frequency domain vector. The delay vector is a vector indicating a change rule of a channel in frequency domain. As described above, a multipath delay causes frequency selective fading. It can be learned from Fourier transform that a time delay of a signal in time domain may be equivalent to a phase gradient in frequency domain.

Because a phase change of a channel in each frequency domain unit is related to a delay, a phase change rule of the channel in each frequency domain unit may be indicated by the delay vector. In other words, the delay vector may indicate a delay characteristic of the channel.

The delay vector may be a vector whose length is $N_f$. $N_f$ may represent a quantity of frequency domain units used to carry reference signals, and $N_f$ is an integer greater than 1. A delay vector whose length is $N_f$ includes $N_f$ frequency domain weights, and the $N_f$ weights may be respectively used to perform phase rotation on the $N_f$ frequency domain units. The reference signals carried in the $N_f$ frequency domain units may be precoded to pre-compensate for a frequency selective characteristic caused by a multipath delay. Therefore, a process of precoding the reference signal based on the delay vector may be considered as a process of performing precoding in frequency domain.

Precoding a reference signal based on different delay vectors is equivalent to performing phase rotation on each frequency domain unit of a channel based on the different delay vectors. In addition, a phase rotation angle of a same frequency domain unit may vary.

Optionally, the delay vector is a DFT vector. The DFT vector may be a vector in a DFT matrix.

For example, the delay vector may be represented as $b_l$, where $$b_l = \begin{bmatrix} e^{-j2\pi f_1 \tau_l} \\ e^{-j2\pi f_2 \tau_l} \\ \vdots \\ e^{-j2\pi f_{N_f} \tau_l} \end{bmatrix}, l = 1, 2, \ldots, L.$$

L may represent a quantity of delay vectors. $f_1, f_2, \ldots, f_{N_f}$ respectively represent carrier frequencies of the first, second, ..., and $N_j^{th}$ frequency domain units.

Optionally, the delay vector is a conjugate transpose vector of a DFT vector. The conjugate transpose vector of the DFT vector may be a column vector in a conjugate transpose matrix of a DFT matrix.

Optionally, the delay vector is an oversampled DFT vector. The oversampled DFT vector may be a vector in an oversampled DFT matrix.

It should be understood that the foregoing specific form the delay vector is merely an example, and should not constitute any limitation on this application. For example, the delay vector may be obtained from a DFT matrix. A specific form of the delay vector is not limited in this application.

It should be further understood that the delay vector is a form representing a delay in this application. The delay vector is named only for ease of distinguishing from the angle vector, and should not constitute any limitation on this application. This application does not exclude a possibility of defining another name in a future protocol to represent a same or similar meaning.

In downlink transmission, a precoded reference signal obtained by precoding a reference signal based on the delay vector may be transmitted to the terminal device through a downlink channel. Therefore, a channel measured by the terminal device based on the received precoded reference signal is equivalent to a channel to which the delay vector is loaded. In other words, loading the delay vector to the reference signal is loading the delay vector to the channel. A plurality of weights in the delay vector are respectively loaded to a plurality of frequency domain units of a channel, and each weight is loaded to one frequency domain unit.

For example, a frequency domain unit is a resource block (RB). If the reference signal is precoded based on a delay vector whose length is $N_f$, $N_f$ weights in the delay vector may be respectively loaded to reference signals carried on $N_f$ RBs, that is, $N_f$ elements in the delay vector are respectively loaded to the $N_f$ RBs. A channel obtained after an $n^{th}$ element in the delay vector $b_l$ is loaded to a channel $V_n$ on an $n^{th}$ RB may be, for example, represented as $V_n e^{j2\pi f_n \tau_l}$.

It should be understood that a manner of precoding the reference signal based on the delay vector is similar to a processing manner of performing precoding in spatial domain, except that a spatial domain vector (or the angle vector) is replaced with the delay vector.

It should be noted that frequency domain precoding may be performed on the reference signal based on the delay vector before or after resource mapping. This is not limited in this application.

For ease of understanding, the process of precoding the reference signal based on the delay vector $b_l$ is described below in detail with reference to FIG. 2.

Figure 2:
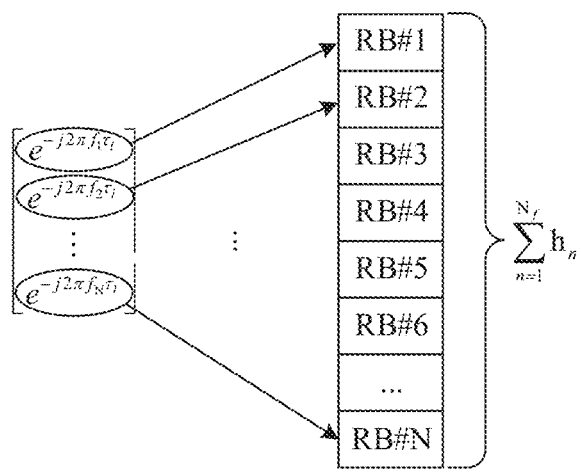
FIG. 2 is a schematic diagram of precoding a reference signal based on a delay vector.

FIG. 2 is a schematic diagram of precoding, based on a delay vector $b_l$, reference signals carried in $N_f$ RBs. The $N_f$ RBs may include, for example, an RB #1, an RB #2, ..., and an RB #$N_f$. Each box in the figure represents one RB. Although not shown in the figure, it may be understood that each RB in the figure may include one or more resource elements (RE) used to carry reference signals.

If the delay vector $b_l$ is loaded to the $N_f$ RBs, corresponding phase rotation may be performed on the $N_f$ RBs respectively. $N_f$ weights in the delay vector may be in a one-to-one correspondence with the $N_f$ RBs. For example, an element $e^{j2\pi f_1 \tau_l}$ in the frequency domain vector $b_l$ may be loaded to the RB #1, an element $e^{j2\pi f_2 \tau_l}$ in the delay vector $b_l$ may be loaded to the RB #2, and an element $e^{-j2\pi f_{N_f} \tau_l}$ in the delay vector $b_l$ may be loaded to the RB #$N_f$. By analogy, the $n^{th}$ element $e^{j2\pi f_n \tau_l}$ in the delay vector $b_l$ may be loaded to the RB #n. For brevity, examples are not listed one by one herein.

It should be understood that FIG. 2 is merely an example, and shows an example of loading the delay vector $b_l$ to the $N_f$ RBs. However, this should not constitute any limitation on this application. The $N_f$ RBs used to carry reference signals in FIG. 2 may be consecutive $N_f$ RBs, or may be inconsecutive $N_f$ RBs. This is not limited in this application.

It should be further understood that, for ease of understanding, only one delay vector is used as an example above to describe a correspondence between a weight in the delay vector and a frequency domain unit. However, this should not constitute any limitation on this application. The network device may load more delay vectors to the $N_f$ RBs.

An example in which an RB is a frequency domain unit is shown above with reference to FIG. 2. However, it should be understood that a specific definition of the frequency domain unit is not limited in this application.

For example, the frequency domain unit may be a subband, may be an RB, or may be an RB group (RBG) or a precoding resource block group (PRG). This is not limited in this application.

Optionally, each frequency domain unit is one RB. Each element in the delay vector may be loaded to one RB. In this case, the length $N_f$ of the delay vector may be equal to a quantity of RBs in a wideband. Each weight in one delay vector corresponds to one RB.

Optionally, each frequency domain unit is one subband. Each element in the delay vector may be loaded to one subband. In this case, the length $N_f$ of the delay vector may be equal to a quantity of subbands in a wideband. Each weight in one delay vector corresponds to one subband.

5. Angle-delay pair: The angle-delay pair may also be referred to as a spatial-frequency vector pair, a spatial-frequency pair, or the like. One angle-delay pair may be a combination of one angle vector and one delay vector. In an implementation, each angle-delay pair may include one angle vector and one delay vector. Angle vectors and/or delay vectors included in any two angle-delay pairs are different. In other words, each angle-delay pair may be uniquely determined by one angle vector and one delay vector.

In embodiments of this application, when a reference signal is precoded based on an angle vector $a(\theta_i)$ and a delay vector $b(\tau_j)$, a precoding matrix used for precoding the reference signal may be represented as a product of conjugate transposes of the angle vector and the delay vector, for example, may be represented as $a(\theta_i) \times b(\tau_j)^H$, where a dimension of the precoding matrix may be $N_{tx} \times N_f$, or a precoding matrix used for precoding the reference signal may be represented as a Kronecker product of the angle vector and the delay vector, for example, may be represented as $a(\theta_i) \otimes b(\tau_j)$, where a dimension of the precoding matrix may be $N_{tx} \times N_f$.

It should be understood that the various mathematical expressions listed above are merely examples, and should not constitute any limitation on this application. For example, a precoding matrix used for precoding the reference signal may be represented as a product of conjugate transposes of the delay vector and the angle vector, or a Kronecker product of the delay vector and the angle vector, where a dimension of the precoding matrix may be $N_f \times N_{tx}$. Alternatively, a precoding matrix used for precoding the reference signal may be represented as mathematical transformation of the foregoing expressions. For brevity, examples are not listed one by one herein.

6. Port: The port may also be referred to as an antenna port. In embodiments of this application, the port may include a transmitting antenna port, a reference signal port, and a receiving port.

The transmitting antenna port may be an actual independent transceiver unit (TxRU). For example, in downlink transmission, the transmitting antenna port may be a TxRU of the network device. In embodiments of this application, $N_{tx}$ may represent a quantity of transmitting antenna ports, and $N_{tx}$ is an integer greater than 1.

The reference signal port may be a port corresponding to a reference signal. Because the reference signal is precoded based on an angle vector and a delay vector, the reference signal port may be a port for a precoded reference signal. For example, each reference signal port corresponds to one or more angle-delay pairs, or each reference signal port corresponds to one angle vector. In embodiments of this application, P may represent a quantity of reference signal ports, and P is an integer greater than or equal to 1.

7. Complex coefficient: Each complex coefficient may correspond to one angle vector and one delay vector that are selected to construct a precoding vector, or correspond to one angle-delay pair. Each complex coefficient may include an amplitude and a phase. For example, in a complex coefficient $ae^{j\theta}$, a is an amplitude, and $\theta$ is a phase.

8. Transport layer: The transport layer may also be referred to as a spatial layer, a layer, a transport stream, a spatial stream, a stream, or the like. In embodiments of this application, a quantity of transport layers may be determined by a rank fed back by the terminal device based on channel measurement. For example, the quantity of transport layers may be equal to the rank fed back by the terminal device based on channel measurement.

For example, a precoding matrix may be determined by performing singular value decomposition (SVD) on a channel matrix or a covariance matrix of the channel matrix. In a process of SVD, different transport layers may be distinguished between each other based on singular values. For example, a precoding vector determined by a right singular vector corresponding to a maximum singular value may correspond to the first transport layer, and a precoding vector determined by a right singular vector corresponding to a minimum singular value may correspond to the $Z^{th}$ transport layer. That is, the singular values corresponding to the first transport layer to the $Z^{th}$ transport layer decrease successively.

For another example, a precoding matrix may be determined by performing eigenvalue decomposition (EVD) on a covariance matrix of a channel matrix. In a process of EVD, different transport layers may be distinguished between each other based on eigenvalues. For example, a precoding vector determined by an eigenvector corresponding to a maximum eigenvalue may correspond to the first transport layer, and a precoding vector determined by an eigenvector corresponding to a minimum eigenvalue may correspond to the $Z^{th}$ transport layer. That is, the eigenvalues corresponding to the first transport layer to the $Z^{th}$ transport layer decrease successively.

It should be understood that distinguishing between different transport layers based on eigenvalues or singular values is merely a possible implementation, and should not constitute any limitation on this application. For example, another criterion for distinguishing between transport layers may be predefined in a protocol. This is not limited in this application.

Physical uplink resources used each time the terminal device reports CSI are pre-allocated by the network device, but the network device cannot ensure that the resources allocated each time are sufficient to carry all information of the CSI determined by the terminal device.

For example, the physical uplink resources pre-allocated by the network device are allocated based on indication overheads required when the rank is 1. When the terminal device determines, based on channel measurement, that the rank is greater than 1, the physical uplink resources pre-allocated by the network device may be insufficient to transmit all information of CSI.

Currently, in a known implementation, when reporting resources of UE are limited, the UE performs priority sorting on reporting amounts of part 2 of a CSI report according to a priority calculation rule, and discards, starting from a lowest priority, some reporting amounts with lower priorities to satisfy the limited reporting resources. The priority calculation rule for the reporting amounts of part 2 of the CSI report is as follows:

$pri(l,i,f)=2 \cdot L \cdot v \cdot \pi(f)+v \cdot i+l,$ $\pi(f)=\min(2 \cdot n_{3,l}^{(f)},(N_3-n_{3,l}^{(f)}-1), n_{3,l}^{(f)} \in \{0,1,\ldots,N_3-1\}$ \hfill (1)

l=1, 2, . . . , v. v is a total quantity of to-be-transmitted streams. i=0, 1, . . . , 2L−1. L is a quantity of beams selected in spatial domain. f=0, 1 . . . , $M_v$−1. $M_v$ is a quantity of subbands selected from $N_3$ subbands in frequency domain. $n_{3,l}^{(f)}$ is a frequency domain index value of a selected $f^{th}$ subband, where the index value is obtained by cyclically shifting a frequency domain component corresponding to a strongest coefficient to zero as a reference, that is, $n_{3,l}^{(0)}=0$.

It can be learned from Formula (1) that a priority order of reporting amounts of part 2 of an existing CSI report is jointly determined by a current quantity of transport streams, a spatial domain beam index, and a frequency domain subband index. A smaller calculated value of pri(l,i,f) indicates a higher priority of a corresponding reporting amount.

Figure 3:
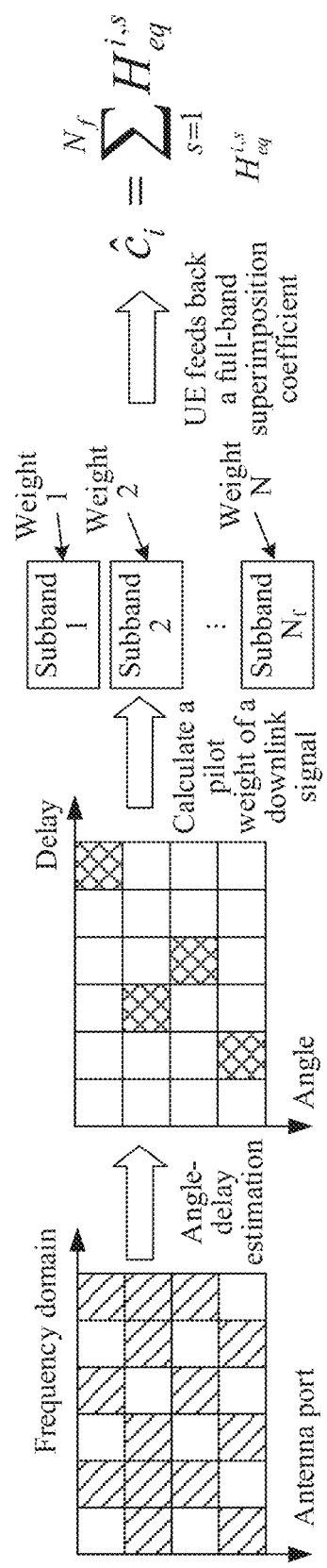
FIG. 3 is a schematic diagram of a method for obtaining channel information based on FDD reciprocity.

As shown in FIG. 3, based on the feature of partial reciprocity between FDD channels, a base station may obtain information about reciprocity (such as an angle and a delay) between uplink and downlink channels through an uplink channel, and load the reciprocity information to a CSI-RS pilot. Further, the UE only needs to feed back information about non-reciprocity between the uplink and downlink channels to the base station. Therefore, the base station may obtain complete CSI of the downlink channel by using the non-reciprocity information fed back by the UE with reference to the reciprocity information obtained from the uplink channel.

The base station performs angle and delay estimation on the uplink channel to obtain the information about reciprocity between the uplink and downlink channels. The uplink channel may be represented as $H_{UL}=SC_{UL}F^H$, and the equation may be vectorized as $\text{vec}(H_{UL})=(F^* \otimes S)\text{vec}(C_{UL})=Z\text{vec}(C_{UL})$. $S \in C^{N_{tx} \times N_{tx}}$ is spatial domain information, and physically corresponds to an angle of arrival/angle of departure of the base station. $N_{tx}$ represents a quantity of transmitting antenna ports. $F \in C^{N_f \times N_f}$ is frequency domain information, and physically corresponds to a delay of each multipath signal arriving at the base station. $N_f$ represents a quantity of frequency domain units. $\otimes$ represents a Kronecker product. $\text{vec}(C_{UL})$ is a column vector representation of an element in a matrix $C_{UL}$. $Z^H=(F^* \otimes S)^H \in C^{N_f N_{tx} \times N_f N_{tx}}$ is a weight matrix corresponding to each angle-delay pair. For FDD uplink and downlink channels, angle information and delay information are reciprocal. That is, there is reciprocity between uplink and downlink channels S and F, and there is no reciprocity between complex coefficients $C_{UL}$ and $C_{DL}$ corresponding to angle-delay pairs of the uplink and downlink channels.

The base station loads both angle information and delay information estimated based on uplink information to a CSI-RS pilot by using the feature of reciprocity between uplink and downlink angles and delays, and loads information about one angle-delay pair for each CSI-RS port. In this case, it is only necessary to perform full-band accumulation on received pilot information on a UE side, to obtain a full-band superimposition coefficient $$C_{DL}^i = \sum_{s=1}^{N_f} H_{eq}^{i,s}$$

of each angle-delay pair. $H_{eq}^{i,x}$ is a channel estimation result of a port i on a subband s. Further, the UE reports the full-band superimposition coefficient of each angle-delay pair to the base station in part 2 of the CSI report. The base station may complete downlink channel reconstruction according to a spatial domain information matrix S and a frequency domain information matrix F that are reciprocal.

It can be learned from the foregoing descriptions that, in a process in which the base station obtains downlink CSI by using partial reciprocity between FDD channels, the UE needs to report only one or more full-band superimposition coefficients in CSI of each pilot port, and a feedback amount is not related to a frequency domain component f. Therefore, π(f) in Formula (1) is no longer required to indicate a priority of a frequency domain subband. Therefore, a method for calculating a priority of a reporting amount of part 2 of a CSI report according to Formula (1) has calculation redundancy, and is no longer applicable.

In view of this, this application provides a channel information feedback method, to directly and effectively identify a priority of to-be-reported CSI.

The channel information feedback method provided in embodiments of this application is described below in detail with reference to the accompanying drawings.

It should be understood that, for ease of description and understanding, the method provided in embodiments of this application is described below in detail by using interaction between a network device and a terminal device as an example. However, this should not constitute any limitation on an execution body of the method provided in this application. For example, a terminal device shown in the following embodiments may be replaced with a component (for example, a circuit, a chip, a chip system, or another functional module that can invoke and execute a program)

disposed in the terminal device, and a network device shown in the following embodiments may be replaced with a component (for example, a circuit, a chip, a chip system, or another functional module that can invoke and execute a program) disposed in the network device, provided that channel information feedback can be implemented according to the method provided in embodiments of this application by running a program that records code of the method provided in embodiments of this application.

Figure 4:
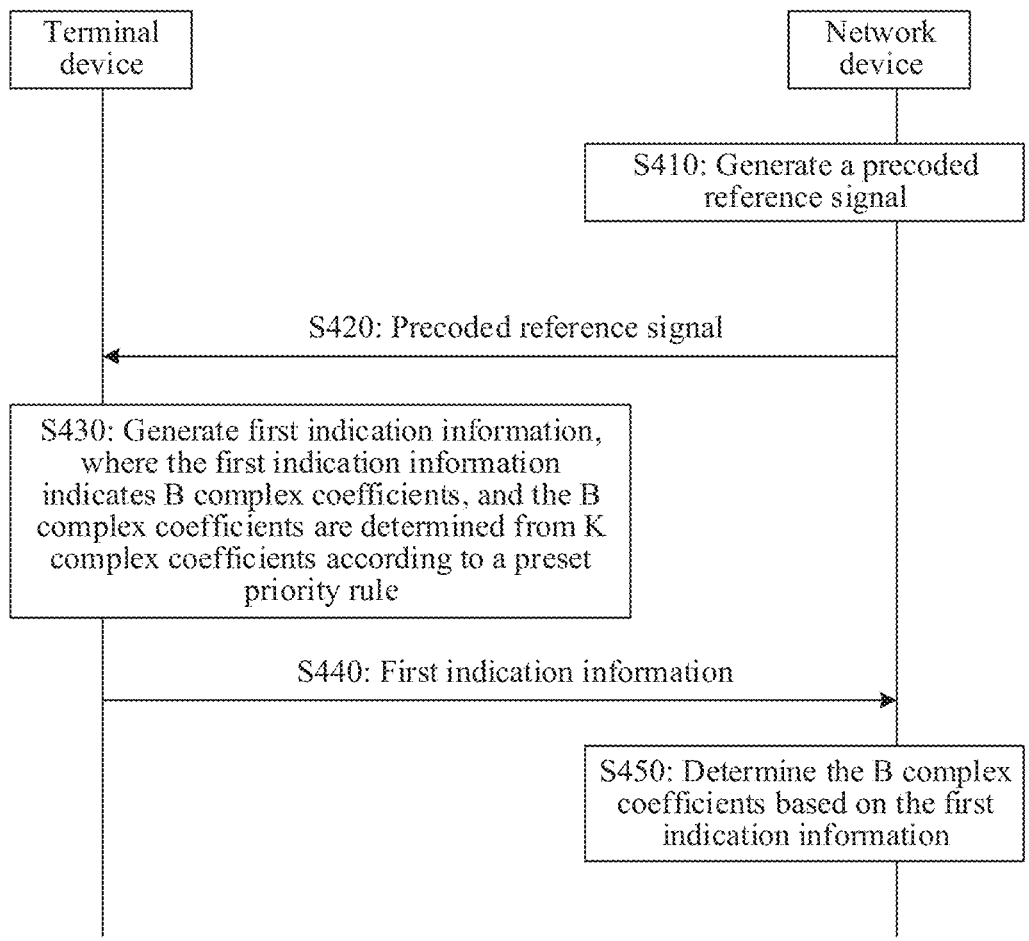
FIG. 4 is a schematic flowchart of a channel information feedback method according to an embodiment of this application.

FIG. 4 is a schematic flowchart of a channel information feedback method 400 according to an embodiment of this application. As shown in FIG. 4, the method 400 may include S410 to S450. The operations in the method 400 are described below in detail with reference to FIG. 4.

S410: A network device generates a precoded reference signal.

The network device may precode the reference signals on P reference signal ports based on Q angle-delay pairs, to obtain precoded reference signals.

Each angle-delay pair in the Q angle-delay pairs includes one angle vector and one delay vector. The Q angle-delay pairs are different from each other. Angle vectors included in any two angle-delay pairs are different, and/or delay vectors included in any two angle-delay pairs are different. In other words, any two angle-delay pairs are at least different in at least one of the following: an angle vector or a delay vector.

Figure 5:
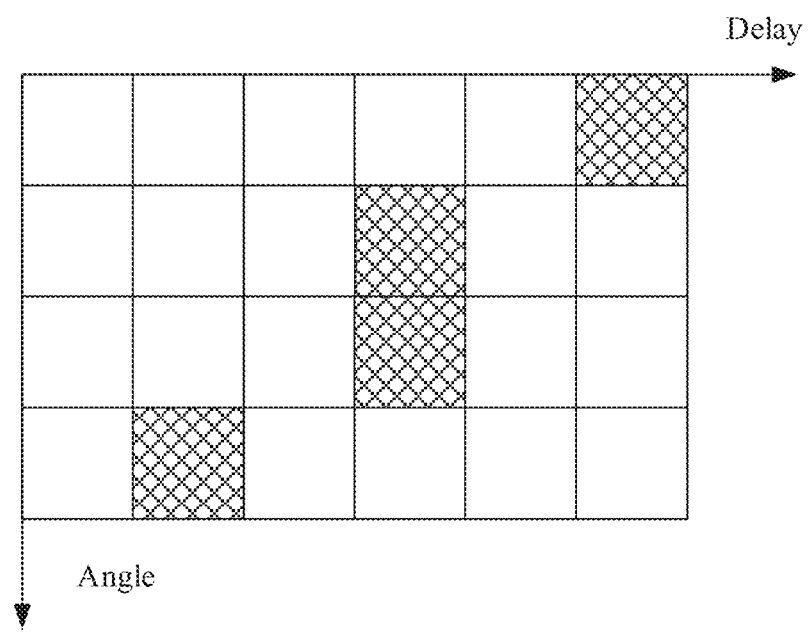
FIG. 5 is a schematic diagram of a correspondence between an angle-delay pair and an angle vector and a delay vector.

Therefore, it may be understood that there may be one or more repetitive angle vectors in the Q angle vectors included in the Q angle-delay pairs, and there may also be one or more repetitive delay vectors in the Q delay vectors included in the Q angle-delay pairs. This is not limited in this application, provided that the Q angle-delay pairs obtained through combination are different from each other. In other words, the Q angle-delay pairs may be obtained by combining one or more different angle vectors and one or more different delay vectors. It is assumed that the Q angle-delay pairs include X angle vectors that are different from each other and Y delay vectors that are different from each other. In this case, Q is not necessarily equal to X×Y For example, in FIG. 5, four angle-delay pairs (boxes filled with patterns in FIG. 5) are shown, and correspond to four angle vectors and three delay vectors.

The one or more angle vectors and the one or more delay vectors may be one or more strong angle vectors and one or more strong delay vectors that are determined by the network device based on uplink channel measurement and reciprocity between uplink and downlink channels. For example, the network device may perform DFT-based determining in spatial domain and frequency domain on the uplink channel, or may perform DFT-based determining by using an existing estimation algorithm, for example, a joint angle and delay estimation (JADE) algorithm. This is not limited in this application.

The one or more angle vectors and the one or more delay vectors may be determined by the network device through statistics collection based on feedback results of one or more previous downlink channel measurements. This is not limited in this application.

A method for generating a precoded reference signal by the network device is described below in detail.

In a possible implementation, the network device may precode the reference signals on P reference signal ports based on Q angle-delay pairs. Reference signal precoding on each reference signal port in the P reference signal ports is determined by one angle-delay pair in the Q angle-delay pairs, and reference signal precoding on different reference signal ports is determined by different angle-delay pairs. It can be understood that, in this case, Q=P.

Figure 6:
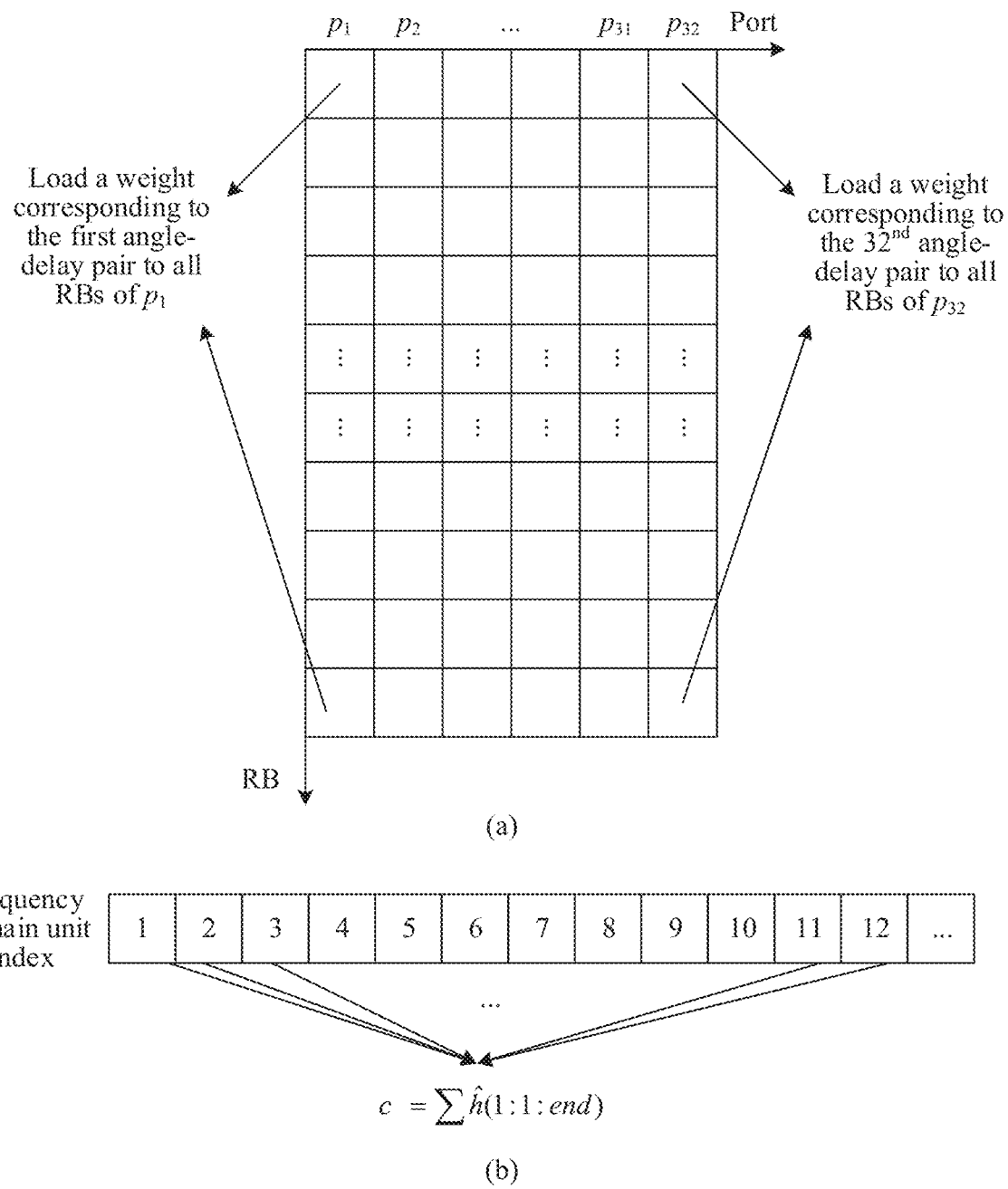
FIG. 6 is a schematic diagram of loading one angle-delay pair to one reference signal port.

(a) of FIG. 6 is a schematic diagram of loading one angle-delay pair to one reference signal port by using an example in which Q=P=32. As shown in (a) of FIG. 6, a weight corresponding to the first angle-delay pair is loaded to all RBs of the first reference signal port (denoted as $p_1$), ..., and a weight corresponding to the $32^{nd}$ angle-delay pair is loaded to all RBs of the $32^{nd}$ reference signal port (denoted as $p_{32}$).

As described above, each angle-delay pair corresponds to one precoding vector (weight vector), and a weight vector set corresponding to the Q angle-delay pairs is denoted as $G=[g_1, g_2, \ldots, g_q, \ldots, g_Q] \in \mathbb{C}^{N_{tx}N_f \times Q}$, where $g_q \in \mathbb{C}^{N_{tx}N_f \times 1}$ is weight vector corresponding to a $q^{th}$ angle-delay pair, and corresponds to a column in $Z^H$ described above. A weight loaded to an $n^{th}$ RB of a $p^{th}$ reference signal port is $g_q((n-1) \times N_{tx}+1:n \times N_{tx})$, that is, the weight loaded to the $n^{th}$ RB of the $p^{th}$ reference signal port is an $((n-1) \times N_{tx}+1)^{th}$ element to an $(n \times N_{tx})^{th}$ element in a weight vector $g_q$ corresponding to the $q^{th}$ angle-delay pair.

In another possible implementation, the network device may precode the reference signals on P reference signal ports based on Q angle-delay pairs. Reference signal precoding on each reference signal port in the P reference signal ports is determined by T angle-delay pairs in the Q angle-delay pairs, and reference signal precoding on different reference signal ports is determined by different angle-delay pairs. T is a positive integer, and T≥2. It can be understood that, in this case, Q=P×T.

In embodiments of this application, a manner of loading the T angle-delay pairs to one reference signal port is not limited.

In an example, the network device may group frequency domain units on each reference signal port, to load the T angle-delay pairs to one reference signal port.

For example, the network device may group frequency domain units on each reference signal port into T groups, and load one angle-delay pair to each frequency domain unit group, to load the T angle-delay pairs to one reference signal port.

Figure 7:
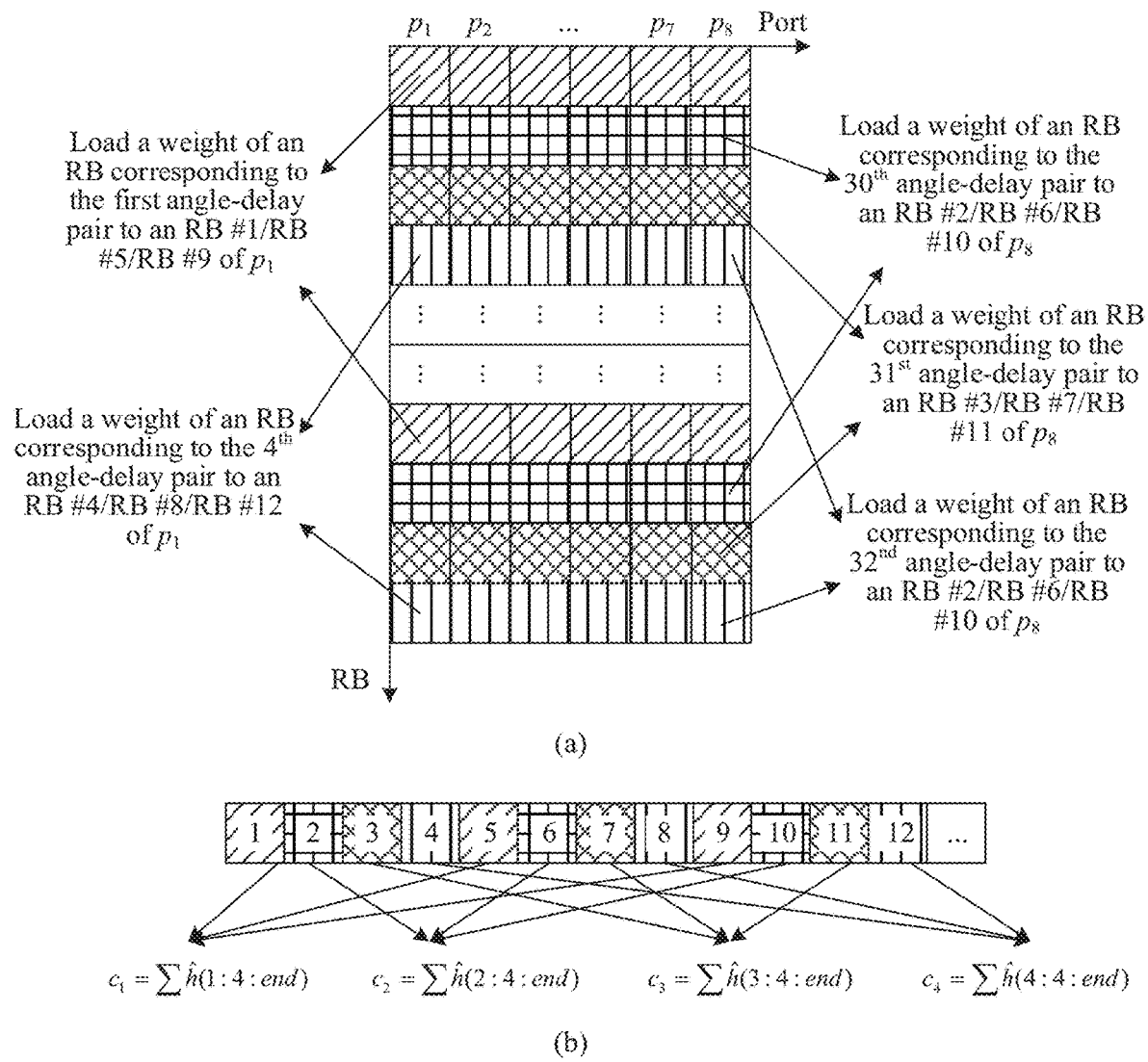
FIG. 7 and FIG. 8 are schematic diagrams of loading a plurality of angle-delay pairs to one reference signal port.

(a) of FIG. 7 is a schematic diagram of loading T angle-delay pairs to one reference signal port by using an example in which Q=32, T=4, and P=8. As shown in (a) of FIG. 7, a weight of an RB corresponding to the first angle-delay pair is loaded to a frequency domain unit group 1 (including an RB #1/RB #5/RB #9 ... ) of the first reference signal port (denoted as $p_1$), ..., a weight of an RB corresponding to the fourth angle-delay pair is loaded to a frequency domain unit group 4 (including an RB #4/RB #8/RB #12 ... ) of $p_1$, ..., a weight of an RB corresponding to the $30^{th}$ angle-delay pair is loaded to a frequency domain unit group 2 (including an RB #2/RB #6/RB #10 ... ) of an eighth reference signal port (denoted as $p_8$), ..., a weight of an RB corresponding to the $31^{st}$ angle-delay pair is loaded to a frequency domain unit group 3 (including an RB #3/RB #7/RB #11 ... ) of $p_8$, and a weight of an RB corresponding to the $32^{nd}$ angle-delay pair is loaded to a frequency domain unit group 4 of $p_8$.

Figure 8:
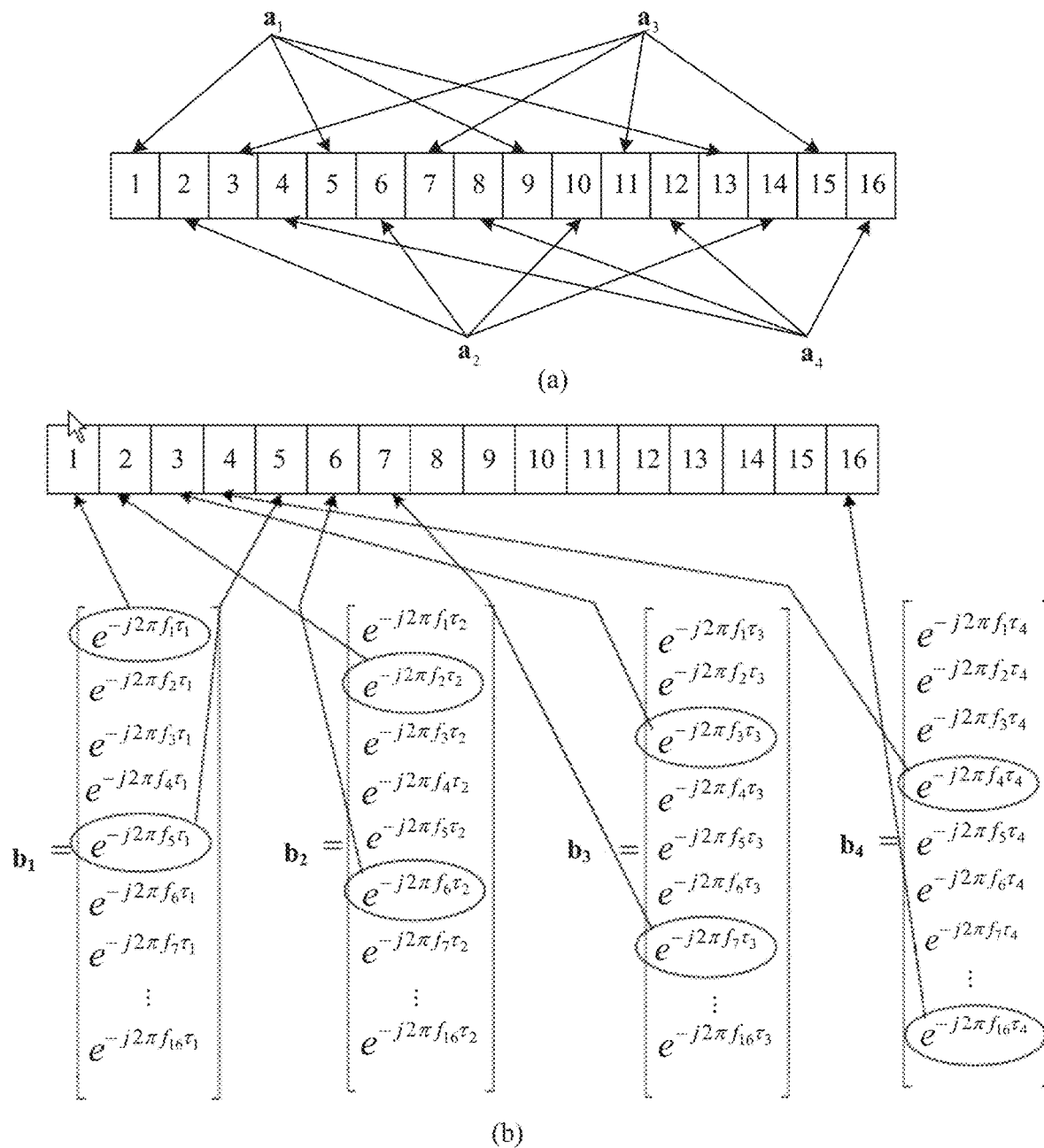

FIG. 8 is a schematic diagram of loading four angle-delay pairs to $p_1$ by using an example in which each reference signal port corresponds to 16 RBs. It is assumed that four angle-delay pairs corresponding to $p_1$ shown in the figure include $(a_1,b_1) (a_2,b_2) (a_3,b_3)$, and $(a_4,b_4)$ The RB #1, the RB #5, the RB #9, and the RB #13 may correspond to a same angle-delay pair $(a_1,b_1)$. The RB #2, the RB #6, the RB #10, and the RB #14 may correspond to a same angle-delay pair ($a_2,b_2$). The RB #3, the RB #7, the RB #11, and the RB #15 may correspond to a same angle-delay pair ($a_3,b_3$). The RB #4, the RB #8, the RB #12, and the RB #16 may correspond to a same angle-delay pair ($a_4,b_4$).

To avoid confusion, (a) of FIG. 8 shows an example of loading angle vectors $a_1$ to $a_4$ to RBs, and (b) of FIG. 8 shows an example of loading delay vectors $b_1$ to $b_4$ to RBs.

First, refer to (a) of FIG. 8. The angle vector $a_1$ may be loaded to the RB #1, the RB #5, the RB #9, and the RB #13. The angle vector $a_2$ may be loaded to the RB #2, the RB #6, the RB #10, and the RB #14. The angle vector $a_3$ may be loaded to the RB #3, the RB #7, the RB #11, and the RB #15. The angle vector $a_4$ may be loaded to the RB #4, the RB #8, the RB #12, and the RB #16. It may be found that, on the 16 RBs sequentially arranged from the RB #1 to the RB #16, the angle vectors $a_1$ to $a_4$ are loaded to the RBs in turn, to form a plurality of cycles, that is, every four consecutive RBs corresponding to a same reference signal port may respectively correspond to four different angle vectors.

Further, refer to (b) of FIG. 8. The delay vectors $b_1$ to $b_4$ are respectively represented as follows:

$$b_1 = \begin{bmatrix} e^{-j2\pi f_1 \tau_1} \\ e^{-j2\pi f_2 \tau_1} \\ e^{-j2\pi f_3 \tau_1} \\ e^{-j2\pi f_4 \tau_1} \\ e^{-j2\pi f_5 \tau_1} \\ e^{-j2\pi f_6 \tau_1} \\ \vdots \\ e^{-j2\pi f_{16} \tau_1} \end{bmatrix}; b_2 = \begin{bmatrix} e^{-j2\pi f_1 \tau_2} \\ e^{-j2\pi f_2 \tau_2} \\ e^{-j2\pi f_3 \tau_2} \\ e^{-j2\pi f_4 \tau_2} \\ e^{-j2\pi f_5 \tau_2} \\ e^{-j2\pi f_6 \tau_2} \\ \vdots \\ e^{-j2\pi f_{16} \tau_2} \end{bmatrix};$$

$$b_3 = \begin{bmatrix} e^{-j2\pi f_1 \tau_3} \\ e^{-j2\pi f_2 \tau_3} \\ e^{-j2\pi f_3 \tau_3} \\ e^{-j2\pi f_4 \tau_3} \\ e^{-j2\pi f_5 \tau_3} \\ e^{-j2\pi f_6 \tau_3} \\ \vdots \\ e^{-j2\pi f_{16} \tau_3} \end{bmatrix}; \text{and } b_4 = \begin{bmatrix} e^{-j2\pi f_1 \tau_4} \\ e^{-j2\pi f_2 \tau_4} \\ e^{-j2\pi f_3 \tau_4} \\ e^{-j2\pi f_4 \tau_4} \\ e^{-j2\pi f_5 \tau_4} \\ e^{-j2\pi f_6 \tau_4} \\ \vdots \\ e^{-j2\pi f_{16} \tau_4} \end{bmatrix}$$

As shown in the figure, the first weight $e^{j2\pi f_1 \tau_1}$ in the delay vector $b_1$ may be loaded to the RB #1. The second weight $e^{j2\pi f_2 \tau_2}$ in the delay vector $b_2$ may be loaded to the RB #2. The third weight e in the delay vector $b_3$ may be loaded to the RB #3. The fourth weight $e^{j2\pi f_4 \tau_4}$ in the delay vector $b_4$ may be loaded to the RB #4. The fifth weight $e^{j2\pi f_5 \tau_1}$ in the delay vector $b_1$ may be loaded to the RB #5. The sixth weight $e^{j2\pi f_6 \tau_2}$ in the delay vector $b_2$ may be loaded to the RB #6. The seventh weight $e^{j2\pi f_{16} \tau_2}$ in the delay vector $b_3$ may be loaded to the RB #7. The eighth weight $e^{j2\pi f_8 \tau_4}$ in the delay vector $b_4$ may be loaded to the RB #8. The rest is deduced by analogy. The $16^{th}$ weight $e^{j2\pi f_{16} \tau_2}$ in the delay vector $b_4$ is loaded to the RB #16. That is, every four consecutive RBs corresponding to a same reference signal port may respectively correspond to four different delay vectors.

For each reference signal port, the network device may load T angle-delay pairs corresponding to the reference signal port to $N_f$ RBs based on the foregoing method.

In another example, the network device may separately load different angle-delay pairs at different delay positions on each reference signal port, to load the T angle-delay pairs to one reference signal port.

For example, on a same reference signal port, the network device may move delays of the T angle-delay pairs to T different specific delay positions (frequency domain basis), and then perform superimposition, to load the T angle-delay pairs to one reference signal port.

Figure 9:
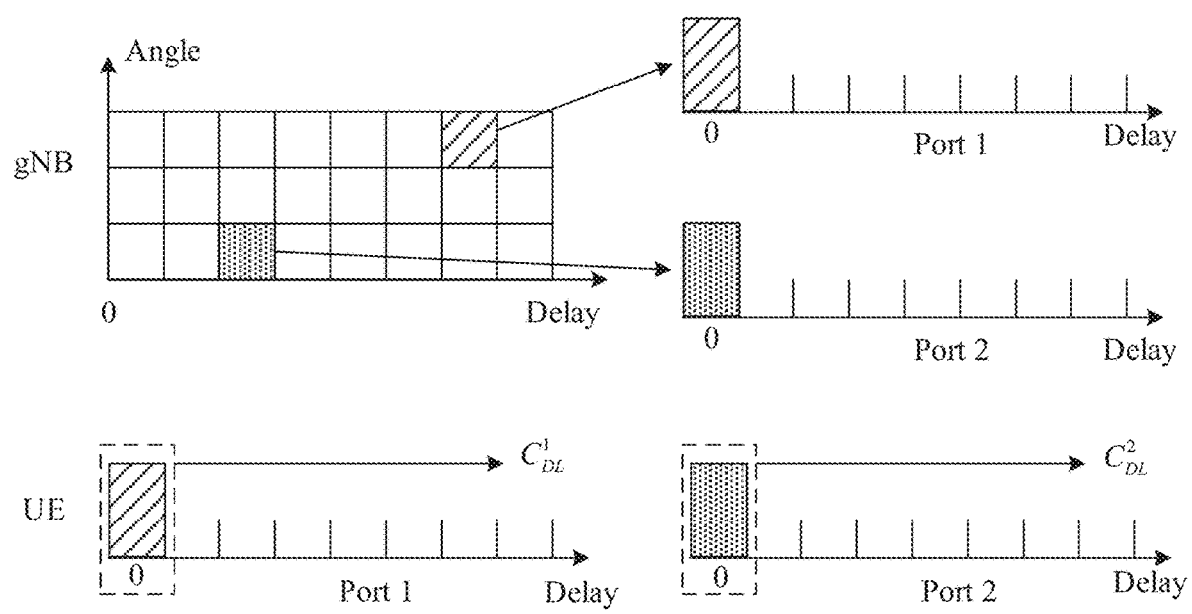
FIG. 9 is a schematic diagram of loading one angle-delay pair to one reference signal port.

FIG. 9 is a schematic diagram of loading one angle-delay pair to one reference signal port by the network device. If a frequency domain DFT basis is used as an example, it is equivalent to that the network device moves a delay of an angle-delay pair to a direct current component on each reference signal port. The terminal device extracts a corresponding direct current component for feedback. For example, in FIG. 9, on a port 1 and a port 2, the network device separately moves delays corresponding to two angle-delay pairs to a direct current component, and the terminal device may obtain a feedback coefficient through full-band superimposition.

Figure 10:
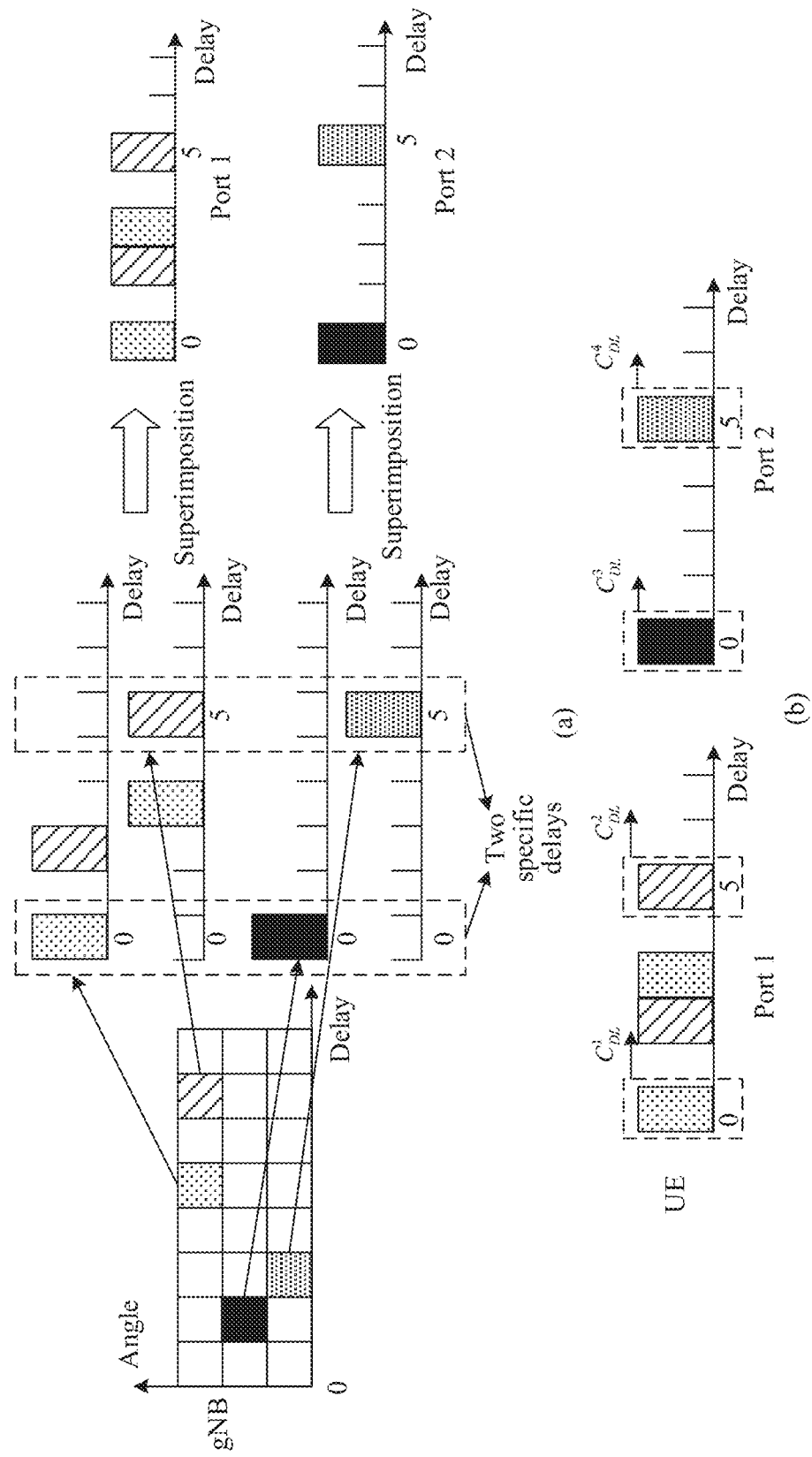
FIG. 10 and FIG. 11 are schematic diagrams of loading a plurality of angle-delay pairs to one reference signal port.

FIG. 10 is a schematic diagram of loading angle-delay pairs at different delay positions of one reference signal port by a network device by using an example in which Q=4, T=2, and P=2. As shown in (a) of FIG. 10, on the port 1, the network device moves delays of two angle-delay pairs to two specific delay positions a delay 0 and a delay 5, and then performs superimposition, to load the two angle-delay pairs to the port 1. Similarly, on the port 2, the network device moves delays of two angle-delay pairs to two specific delay positions a delay 0 and a delay 5, and then performs superimposition, to load the two angle-delay pairs to the port 2.

In still another example, the network device may group frequency domain units on each reference signal port, and separately load different angle-delay pairs at different delay positions on each reference signal port, to load the T angle-delay pairs to one reference signal port.

For example, on a same reference signal port, the network device may group frequency domain units into E groups, and separately load different angle-delay pairs at F different delay positions on one reference signal port, to load T angle-delay pairs to one reference signal port. E and F are both positive integers, and E×F=T.

Figure 11:
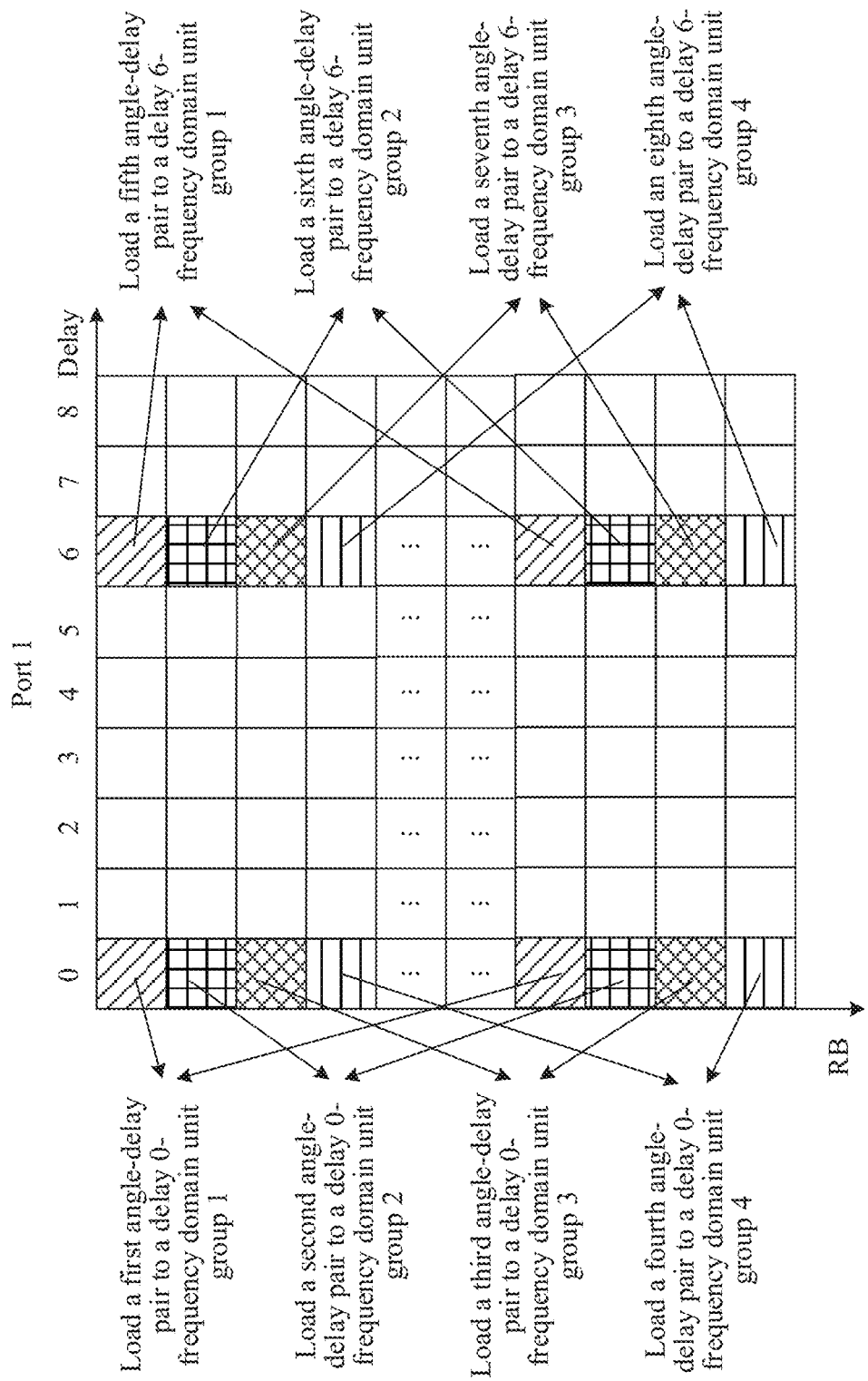

FIG. 11 is a schematic diagram of loading eight angle-delay pairs to a port 1 by using an example in which E=4, F=2, and T=8. As shown in FIG. 11, the network device divides frequency domain units on the port 1 into four groups, so that the network device may separately load different angle-delay pairs to the four frequency domain unit groups, and the network device may further separately load different angle-delay pairs to a delay 0 and a delay 6. To be specific, the network device may load the first angle-delay pair to the delay 0-frequency domain unit group 1, load the second angle-delay pair to the delay 0-frequency domain unit group 2 of the port 1, . . . , load the seventh angle-delay pair to the delay 6-frequency domain unit group 3, and load the eighth angle-delay pair to the delay 6-frequency domain unit group 4.

In still another possible implementation, the network device may precode the reference signals on P reference signal ports based on Q angle-delay pairs. Reference signal precoding on each reference signal port in the P reference signal ports is determined by T forms of one angle-delay pair in the Q angle-delay pairs, and reference signal precoding on different reference signal ports is determined by different angle-delay pairs. It can be understood that, in this case, Q=P.

Figure 12:
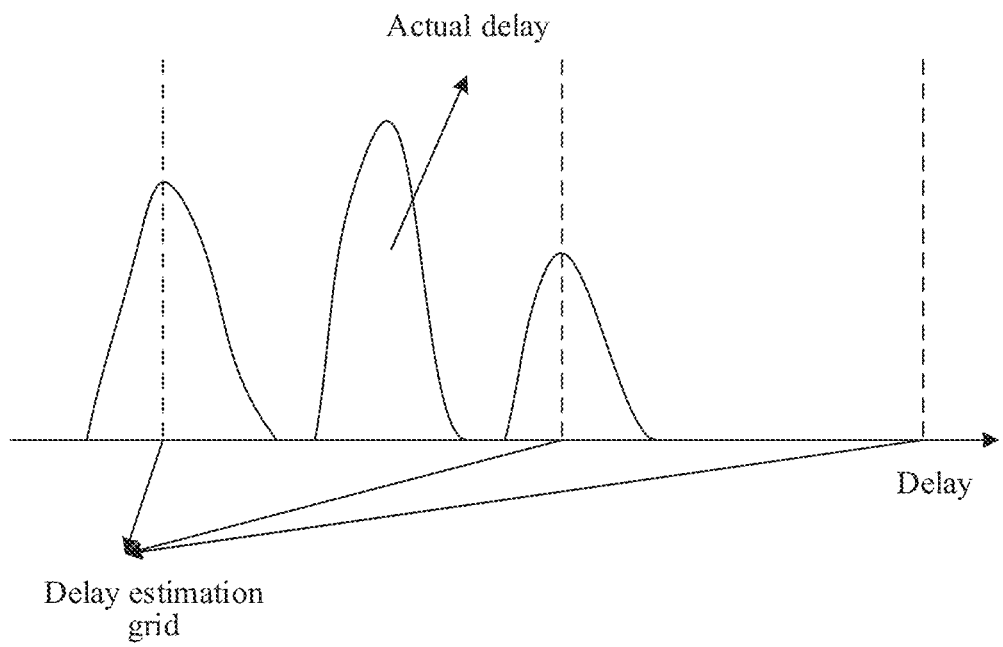
FIG. 12 is a schematic diagram of a delay precision estimation error.

As described above, the one or more angle vectors and the one or more delay vectors included in the Q angle-delay pairs may be obtained by the network device through measurement of an uplink channel based on reciprocity between the uplink link and a downlink channel. However, because precision of delay estimation on a network device side is limited, an error may exist between an estimated delay and an actual delay, for example, as shown in FIG. 12. Therefore, to take delay precision into consideration, the network device may load T forms of one angle-delay pair to one reference signal port. The loading of the T forms of one angle-delay pair to one reference signal port may be implemented by the network device by shifting the angle-delay pair to T specific delay positions. The shifting of the angle-delay pair to a $t^{th}$ specific delay position by the network device may be implemented by multiplying a frequency domain component point of a weight vector corresponding to the angle-delay pair by a DFT vector determined by the $t^{th}$ delay position.

In still another possible implementation, the network device may precode the reference signals on the P reference signal ports based on M angle-delay pairs in the Q angle-delay pairs. Reference signal precoding on each reference signal port in the P reference signal ports is determined by $M_p$ angle-delay pairs in the M angle-delay pairs, and reference signal precoding on different reference signal ports is determined by different angle-delay pairs. M and $M_p$ are positive integers, M<Q, $\Sigma_{p=0}^{P-1} M_p = M$, and p=0, 1, 2, ..., P-1.

A value of M may be not less than a quantity X of angle vectors that are different from each other and that are included in the Q angle-delay pairs.

Figure 13:
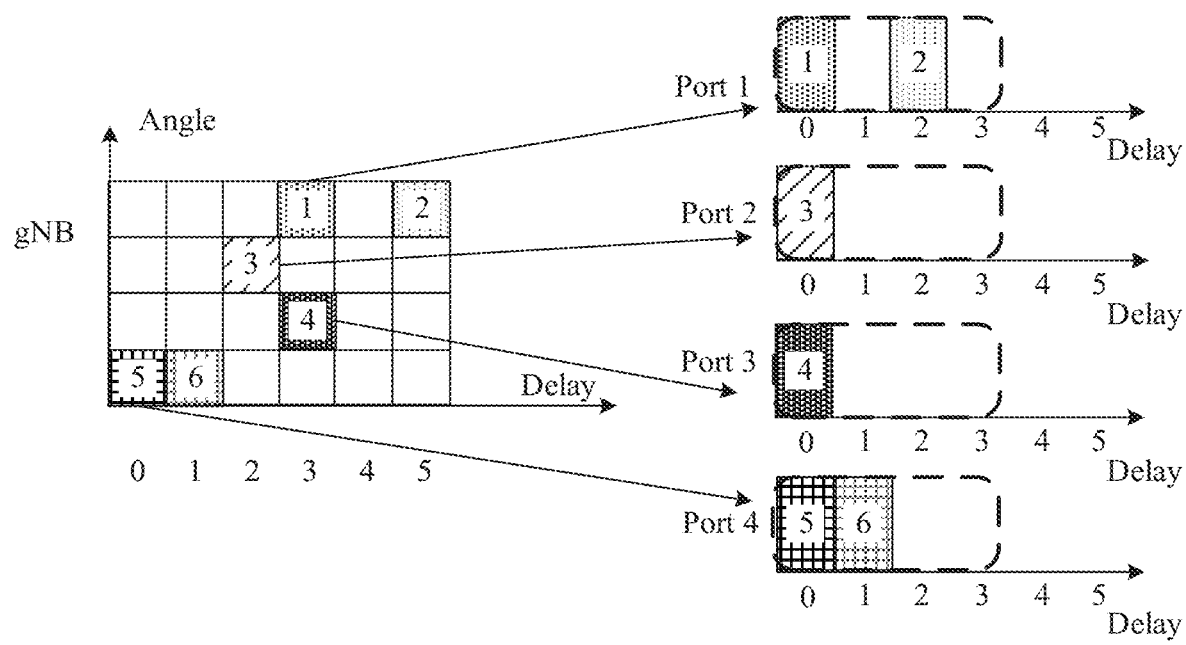
FIG. 13 is a schematic diagram of loading, to a reference signal port, some angle delays in an angle-delay pair obtained based on uplink and downlink channel reciprocity.

FIG. 13 is a schematic diagram of loading an angle-delay pair to a reference signal port by a network device by using an example in which Q=6, P=4, and M=4. As shown in FIG. 13, it is assumed that the network device measures the uplink channel based on reciprocity of the uplink and downlink channels to obtain six angle-delay pairs. An angle-delay pair 1 and an angle-delay pair 2 have same angle information and different delay information, and an angle-delay pair 5 and an angle-delay pair 6 have same angle information and different delay information. The network device may load the angle-delay pair 1, the angle-delay pair 3, the angle-delay pair 4, and the angle-delay pair 5 to the port 1 to the port 4 respectively (it can be learned from the foregoing that loading of an angle-delay pair to a reference signal port is equivalent to translation of a delay of the angle-delay pair to a delay zero point).

It should be understood that in FIG. 13, only an example of loading one angle-delay pair to one reference signal port is used for description. In this implementation, a plurality of angle-delay pairs may be loaded to one reference signal port. For example, the network device may load both the angle-delay pair 1 and the angle-delay pair 2 in FIG. 13 to a reference signal port 1. In another example, the network device may load both the angle-delay pair 5 and the angle-delay pair 6 in FIG. 13 to a reference signal port 4.

It should be further understood that, in FIG. 13, only an example in which angle-delay pairs having different angle information are loaded to different reference signal ports is used for description. In this implementation, the angle-delay pairs having different angle information may be loaded to a same reference signal port. For example, the network device may load the angle-delay pair 3 and the angle-delay pair 4 in FIG. 13 to a same reference signal port.

In still another possible implementation, the network device may precode the reference signals on P reference signal ports based on angle vectors included in the Q angle-delay pairs.

In an example, the network device may precode the reference signals on the P reference signal ports based on Q angle vectors in the Q angle-delay pairs. Reference signal precoding on each reference signal port in the P reference signal ports is determined by one angle vector in the Q angle vectors, and reference signal precoding on different reference signal ports is determined by different angle vectors. It can be understood that, in this case, Q=P.

In this case, the method may further include: The network device sends indication information #1 (that is, second indication information), where the indication information #1 indicates delay vectors that respectively correspond to the Q angle vectors. Correspondingly, the terminal device receives the indication information #1. In other words, the indication information #1 indicates delay vectors that respectively correspond to the P reference signal ports. It may be understood that a quantity of delay vectors corresponding to each angle vector in the Q angle vectors is 1.

In still another example, the network device may precode the reference signals on the P reference signal ports based on X angle vectors different from each other in the Q angle-delay pairs. Reference signal precoding on each reference signal port in the P reference signal ports is determined by one angle vector in the X angle vectors, and reference signal precoding on different reference signal ports is determined by different angle vectors. It can be understood that, in this case, P=X.

In this case, the method 400 may further include: The network device sends, indication information #2 (that is, fifth indication information) to the terminal device, where the indication information #2 indicates delay vectors that respectively correspond to the X angle vectors. In other words, the indication information #2 indicates delay vectors that respectively correspond to the P reference signal ports. It may be understood that, quantities of delay vectors corresponding to different angle vectors in the X angle vectors may be different, or may be the same. For example, in FIG. 13, the six angle-delay pairs include four angle vectors that are different from each other, a quantity of delay vectors corresponding to the first or fourth angle vector is 2, and a quantity of delay vectors corresponding to the second or third angle vector is 1.

S420: The network device sends the precoded reference signal. Correspondingly, in S420, the terminal device receives the precoded reference signal.

The network device may transmit the precoded reference signal to the terminal device by using a preconfigured reference signal resource. A process in which the network device sends the precoded reference signal to the terminal device may be the same as that in the conventional technology. For brevity, details are not described herein again.

It may be understood that the network device sends reference signals of the P reference signal ports, and the terminal device may receive the reference signals of the P reference signal ports.

S430: The terminal device generates first indication information, where the first indication information indicates B complex coefficients, and the B complex coefficients are determined from K complex coefficients according to a preset priority rule.

The K complex coefficients are determined from a complex coefficient set. The complex coefficient set includes $T_p$ complex coefficients that are determined at each transport layer in the Z transport layers and that correspond to the $p^{th}$ reference signal port in the P reference signal ports. p=0, 1, 2, ..., P-1.

The terminal device may perform channel estimation based on the precoded reference signal received in S420, to obtain a channel estimation value corresponding to each reference signal port on each frequency domain unit, and further obtain a complex coefficient corresponding to each reference signal port. It may be understood that, when a quantity of angle-delay pairs corresponding to one reference signal port is different, a quantity of complex coefficients that are obtained by the terminal device and that correspond to the reference signal port is also different.

In a first possible implementation, when the quantity of the angle-delay pairs corresponding to one reference signal port is 1, the quantity of the complex coefficients that are obtained by the terminal device and that correspond to the reference signal port is also 1. That is, $T_0=T_1=T_2=\ldots=T_{P-1}=1$.

As described above, the network device may load one angle-delay pair to one reference signal port, and separately load the Q angle-delay pairs to the P reference signal ports. It may be understood that, in this case, one reference signal port corresponds to one angle-delay pair. Correspondingly, for one reference signal port, the terminal device may obtain one complex coefficient corresponding to the reference signal port.

(b) of FIG. 6 is a schematic diagram of obtaining a complex coefficient corresponding to one reference signal port by a terminal device when one angle-delay pair is loaded to the reference signal port. As shown in (b) of FIG. 6, a complex coefficient corresponding to one reference signal port may be represented as $c=\Sigma\hat{h}(1:1:end)$. $\hat{h}$ represents a channel estimation value in a frequency domain unit. (1:1:end) represents that a value is obtained from 1 with 1 as an increment until a last value is obtained. Therefore, it can be learned that when one reference signal port corresponds to one angle-delay pair, a complex coefficient corresponding to the reference signal port is a sum of channel estimation values that are on each frequency domain unit and that correspond to the reference signal port.

As described above, the network device may load one angle vector to one reference signal port, and separately load Q angle vectors included in the Q angle-delay pairs to the P reference signal ports. It may be understood that, in this case, one reference signal port corresponds to one angle-delay pair. Correspondingly, for one reference signal port, the terminal device may obtain one complex coefficient corresponding to the reference signal port.

It should be understood that, in this implementation, when there are a plurality of transport layers, the terminal device may obtain, at each transport layer, one complex coefficient corresponding to one reference signal port. Therefore, in this implementation, when the quantity of transport layers is Z and the quantity of reference signal ports is P, the foregoing complex coefficient set may include P×Z complex coefficients. Further, the terminal device may determine the K complex coefficients from the P×Z complex coefficients included in the complex coefficient set. How the terminal device determines the K complex coefficients from the P×Z complex coefficients is not limited in embodiments of this application.

In an example, the terminal device may determine the K complex coefficients from the P×Z complex coefficients. In this case, K≤P×Z. A value of K may be predefined in a protocol, or may be indicated by the network device to the terminal device. When the network device indicates the value of K to the terminal device, the method may further include: The network device sends indication information #3, where the indication information #3 indicates the value of K. Correspondingly, the terminal device receives the indication information #3.

It may be understood that, in this example, the K complex coefficients determined by the terminal device may be complex coefficients corresponding to S reference signal ports in the P reference signal ports, that is, K may be equal to S×Z. S is a positive integer, and S≤P.

In another example, the terminal device may determine the K complex coefficients from the complex coefficients corresponding to the S reference signal ports in the P reference signal ports, that is, the terminal device may determine the K complex coefficients from the S×Z complex coefficients. In this case, K≤S×Z. In this example, when determining the K complex coefficients, the terminal device needs to predetermine values of S and K, or predetermine a value of S. The value of S or K may be predefined in a protocol, or may be indicated by the network device to the terminal device. When the network device indicates the value of S or K to the terminal device, the method may further include: The network device sends indication information #4, where the indication information #4 indicates the values of S and K or the indication information #4 indicates the value of S. Correspondingly, the terminal device receives the indication information #4.

It may be understood that, when the terminal device predetermines the value of S but does not predetermine the value of K, the terminal device may use complex coefficients corresponding to the S reference signal ports as the K complex coefficients. That is, K=S×Z.

After the terminal device determines the K complex coefficients, if an uplink resource allocated by the terminal device is sufficient for reporting the K complex coefficients, the terminal device may report all the K complex coefficients to the network device. That is, the terminal device may generate first indication information, where the first indication information indicates the B complex coefficients, and B=K.

If the uplink resource allocated to the terminal device is insufficient for reporting the K complex coefficients, the terminal device may determine the B complex coefficients from the K complex coefficients according to a preset priority rule, and report the B complex coefficients to the terminal device. That is, the terminal device may generate first indication information, where the first indication information indicates the B complex coefficients. B<K.

The preset priority rule is not limited in embodiments of this application.

In an example, the preset priority rule may be related to an index value of each complex coefficient in the K complex coefficients.

The preset priority rule may be represented as $pri(k)=f_1(k)$ and $k=0, 1, \ldots, K-1$. $pri(k)$ represents a priority of a $k^{th}$ complex coefficient in the K complex coefficients. A smaller value of $pri(k)$ indicates a higher priority of the $k^{th}$ complex coefficient. $f_1(k)$ represents an index value of the $k^{th}$ complex coefficient determined based on the K complex coefficients, and $f_1(k) \in \{0, 1, \ldots, K-1\}$. It may be understood that, in this case, each complex coefficient in the K complex coefficients may be identified by (k), and complex coefficients identified by different (k) have different priorities.

A specific form of $f_1(k)$ is not limited in embodiments of this application.

For example, $f_1(k)$ may be a monotonically increasing function related to k. For example, $f_1(k)=k$. In this case, smaller k indicates a higher priority of the $k^{th}$ complex coefficient.

In another example, $f_1(k)$ may be a monotonically decreasing function related to k. For example, $f_1(k)=K-k$. In this case, larger k indicates a higher priority of the $k^{th}$ complex coefficient.

In still another example, $f_1(k)$ may be determined in descending order of amplitudes of the K complex coefficients. In this case, smaller $f_1(k)$ indicates a higher priority of the $k^{th}$ complex coefficient.

In yet another example, $f_1(k)$ may be determined in ascending order of amplitudes of the K complex coefficients. In this case, larger $f_1(k)$ indicates a higher priority of the $k^{th}$ complex coefficient.

It should be understood that, when $f_1(k)$ is related to an amplitude order of the K complex coefficients, the method may further include: The terminal device sends indication information #5, where the indication information #5 indicates a mapping relationship between a sequence number k of each complex coefficient and an index value $f_1(k)$. Correspondingly, the network device receives the indication information #5. The indication information #5 and the first indication information may be carried in same signaling, or may be carried in different signaling. This is not limited in this application.

In another example, the preset priority rule may be related to an index value of a reference signal port corresponding to each complex coefficient in the K complex coefficients.

As described above, the K complex coefficients may be complex coefficients corresponding to the S reference signal ports. In this case, the preset priority rule may be related to an index value, in the S reference signal ports, of a reference signal port corresponding to each complex coefficient in the K complex coefficients.

The preset priority rule may be represented as pri(s)=$f_2(s)$ and s=0, 1, ..., S−1. pri(s) represents a priority of a complex coefficient corresponding to an $s^{th}$ reference signal port in the S reference signal ports. A smaller value of pri(s) indicates a higher priority of the complex coefficient corresponding to the $s^{th}$ reference signal port. $f_2(s)$ represents an index value of the $s^{th}$ reference signal port that is determined based on the K complex coefficients, and $f_2(s) \in \{0, 1, ..., S-1\}$.

It may be understood that, in this case, each complex coefficient in the K complex coefficients may be identified by (s), complex coefficients identified by same (s) have a same priority, and complex coefficients identified by different (s) have different priorities. For example, the complex coefficient that is in the K complex coefficients and that corresponds to the $s^{th}$ reference signal port may include one complex coefficient of the $s^{th}$ reference signal port at one transport layer, or may include a plurality of complex coefficients of the $s^{th}$ reference signal port at a plurality of transport layers. If a plurality of complex coefficients in the K complex coefficients correspond to the $s^{th}$ reference signal port, the plurality of complex coefficients have a same identifier (s), and have a same priority.

A specific form of $f_2(s)$ is not limited in embodiments of this application.

For example, $f_2(s)$ may be a monotonically increasing function related to s. For example, $f_2(s)$=s. In this case, smaller s indicates a higher priority of the complex coefficient corresponding to the $s^{th}$ reference signal port.

In another example, $f_2(s)$ may be a monotonically decreasing function related to s. For example, $f_2(s)$=S−s. In this case, larger s indicates a higher priority of the complex coefficient corresponding to the $s^{th}$ reference signal port.

In still another example, $f_2(s)$ may be determined in descending order of amplitudes of the K complex coefficients. In this case, smaller $f_2(s)$ indicates a higher priority of the complex coefficient corresponding to the $s^{th}$ reference signal port. In a process of determining $f_2(s)$, a complex coefficient used for amplitude sorting may be a sum of amplitudes of one or more complex coefficients that are in the K complex coefficients and that correspond to the $s^{th}$ reference signal port. For example, summation is performed on one or more complex coefficients that are in the K complex coefficients and that correspond to the $0^{th}$ reference signal port to obtain a first complex coefficient, summation is performed on one or more complex coefficients that are in the K complex coefficients and that correspond to the first reference signal port to obtain a second complex coefficient, ..., and summation is performed on one or more complex coefficients that are in the K complex coefficients and that correspond to the $(S-1)^{th}$ reference signal port to obtain an $S^{th}$ complex coefficient. Next, the S complex coefficients are sorted in descending order of amplitudes to obtain an index value of each reference signal port. Similarly, in a process of determining $f_2(s)$, a complex coefficient used for amplitude sorting may alternatively be an average value of amplitudes of one or more complex coefficients that are in the K complex coefficients and that correspond to the $s^{th}$ reference signal port. That is, after S complex coefficients are obtained by calculating the average value of the amplitudes of the one or more complex coefficients that respectively correspond to the S reference signal ports, the S complex coefficients are sorted in descending order of amplitudes to obtain an index value of each reference signal port. In a process of determining $f_2(s)$, a complex coefficient used for amplitude sorting may alternatively be a maximum value of amplitudes of one or more complex coefficients that are in the K complex coefficients and that correspond to the $s^{th}$ reference signal port. That is, after a complex coefficient with a maximum amplitude in the one or more complex coefficients that respectively correspond to the S reference signal ports is selected, the S complex coefficients are sorted in descending order of amplitudes to obtain an index value of each reference signal port.

In yet another example, $f_2(s)$ may be determined in ascending order of amplitudes of the K complex coefficients. In this case, larger $f_2(s)$ indicates a higher priority of the complex coefficient corresponding to the $s^{th}$ reference signal port. In a process of determining $f_2(s)$, a complex coefficient used for amplitude sorting may be a sum of amplitudes of one or more complex coefficients that are in the K complex coefficients and that correspond to the $s^{th}$ reference signal port. For example, summation is performed on one or more complex coefficients that are in the K complex coefficients and that correspond to the $0^{th}$ reference signal port to obtain a first complex coefficient, summation is performed on one or more complex coefficients that are in the K complex coefficients and that correspond to the first reference signal port to obtain a second complex coefficient, ..., and summation is performed on one or more complex coefficients that are in the K complex coefficients and that correspond to the $(S-1)^{th}$ reference signal port to obtain an $S^{th}$ complex coefficient. Next, the S complex coefficients are sorted in ascending order of amplitudes to obtain an index value of each reference signal port. Similarly, in a process of determining $f_2(s)$, a complex coefficient used for amplitude sorting may alternatively be an average value of amplitudes of one or more complex coefficients that are in the K complex coefficients and that correspond to the $s^{th}$ reference signal port. That is, after S complex coefficients are obtained by calculating the average value of the amplitudes of the one or more complex coefficients that respectively correspond to the S reference signal ports, the S complex coefficients are sorted in ascending order of amplitudes to obtain an index value of each reference signal port. In a process of determining $f_2(s)$, a complex coefficient used for amplitude sorting may alternatively be a maximum value of amplitudes of one or more complex coefficients that are in the K complex coefficients and that correspond to the $s^{th}$ reference signal port. That is, after a complex coefficient with a maximum amplitude in the one or more complex coefficients that respectively correspond to the S reference signal ports is selected, the S complex coefficients are sorted in ascending order of amplitudes to obtain an index value of each reference signal port.

It should be understood that, when $f_2(s)$ is related to an amplitude order of the K complex coefficients, the method may further include: The terminal device sends indication information #6, where the indication information #6 indicates a mapping relationship between a sequence number s of each reference signal port in the S reference signal ports and an index value $f_2(s)$. Correspondingly, the network device receives the indication information #6. The indication information #6 and the first indication information may be carried in same signaling, or may be carried in different signaling. This is not limited in this application.

In still another example, the preset priority rule may be related to the following two items: a quantity Z of transport layers and an index value of each complex coefficient in the K complex coefficients.

The preset priority rule may be represented as $pri(z,k_z)=Z\cdot f_4(k_z)+z$, $k_z=0, 1, \ldots, K_z-1$, and $z=1, 2, \ldots, Z$. $K_z$ represents a quantity of complex coefficients at a $z^{th}$ transport layer in the Z transport layers, and $\Sigma_{z=1}^{Z}K_z=K$. $pri(z,k_z)$ represents a priority of a $k_z^{th}$ complex coefficient in the $K_z$ complex coefficients at the $z^{th}$ transport layer. A smaller value of $pri(z,k_z)$ indicates a higher priority of the $k_z^{th}$ complex coefficient in the $K_z$ complex coefficients at the $z^{th}$ transport layer. $f_4(k_z)$ represents an index value of the $k_z^{th}$ complex coefficient that is at the $z^{th}$ transport layer and that is determined based on the $K_z$ complex coefficients at the $z^{th}$ transport layer, and $f_4(k_z)\in\{0, 1, \ldots, K_z-1\}$. It may be understood that, in this case, each complex coefficient in the K complex coefficients may be identified by $(k_z, z)$, complex coefficients identified by same $(k_z, z)$ have a same priority, and complex coefficients identified by different $(k_z, z)$ have different priorities.

A specific form of $f_4(k_z)$ is not limited in embodiments of this application.

For example, $f_4(k)$ may be a monotonically increasing function related to $k_z$. For example, $f_4(k_z)=k_z$. In this case, at the $z^{th}$ transport layer, smaller $k_z$ indicates a higher priority of the $k_z^{th}$ complex coefficient. In this case, a meaning of the preset priority rule is that priorities of the K complex coefficients descend in the following order: the $0^{th}$ complex coefficient at the first transport layer, the $0^{th}$ complex coefficient at the second transport layer, . . . , the $0^{th}$ complex coefficient at the $Z^{th}$ transport layer; the first complex coefficient at the first transport layer, . . . , the first complex coefficient at the $Z^{th}$ transport layer; . . . ; the $(K_1-1)^{th}$ complex coefficient at the first transport layer, . . . , the $(K_Z-1)^{th}$ complex coefficient at the $Z^{th}$ transport layer.

In another example, $f_4(k_z)$ may be a monotonically decreasing function related to $k_z$. For example, $f_4(k_z)=K_z-k_z$. In this case, at the $z^{th}$ transport layer, larger $k_z$ indicates a higher priority of the $k_z^{th}$ complex coefficient. In this case, a meaning of the preset priority rule is that priorities of the K complex coefficients descend in the following order: the $(K_1-1)^{th}$ complex coefficient at the first transport layer, the $(K_2-1)^{th}$ complex coefficient at the second transport layer, . . . , the $(K_Z-1)^{th}$ complex coefficient at the $Z^{th}$ transport layer; the $(K_1-2)^{th}$ complex coefficient at the first transport layer, . . . , the $(K_Z-2)^{th}$ complex coefficient at the $Z^{th}$ transport layer; . . . ; the $0^{th}$ complex coefficient at the first transport layer, . . . , the $0^{th}$ complex coefficient at the $Z^{th}$ transport layer.

In still another example, $f_4(k_z)$ may be determined in descending order of amplitudes of the $K_z$ complex coefficients. In this case, at the $z^{th}$ transport layer, smaller $f_4(k_z)$ indicates a higher priority of the $k_z^{th}$ complex coefficient.

In yet another example, $f_4(k_z)$ may be determined in ascending order of amplitudes of the $K_z$ complex coefficients. In this case, at the $z^{th}$ transport layer, larger $f_4(k_z)$ indicates a higher priority of the $k_z^{th}$ complex coefficient.

When $f_4(k_z)$ is related to the amplitude order of the $K_z$ complex coefficients, a meaning of the preset priority rule is that priorities of the K complex coefficients descend in the following order: a complex coefficient with the largest amplitude at the first transport layer, a complex coefficient with the largest amplitude at the second transport layer, . . . , a complex coefficient with the largest amplitude at the $Z^{th}$ transport layer; a complex coefficient with the second largest amplitude at the first transport layer, . . . , a complex coefficient with the second largest amplitude at the $Z^{th}$ transport layer; . . . ; a complex coefficient with the smallest amplitude at the first transport layer, . . . , a complex coefficient with the smallest amplitude at the $Z^{th}$ transport layer.

It should be understood that, when $f_4(k_z)$ is related to an amplitude order of the K complex coefficients, the method may further include: The terminal device sends indication information #7, where the indication information #7 indicates the amplitude order of the complex coefficients at each transport layer. Correspondingly, the network device receives the indication information #7. The indication information #7 and the first indication information may be carried in same signaling, or may be carried in different signaling. This is not limited in this application.

In yet another example, the preset priority rule may be related to the following two items: a quantity Z of transport layers and an index value of a reference signal port corresponding to each complex coefficient in the K complex coefficients.

As described above, the K complex coefficients may be complex coefficients corresponding to the S reference signal ports. In this case, the preset priority rule may be related to the following two items: the quantity Z of transport layers and the index value, in the S reference signal ports, of the reference signal port corresponding to each complex coefficient in the K complex coefficients.

The preset priority rule may be represented as $pri(z,s_z)=Z\cdot f_5(s_z)+z$, $s_z=0, 1, \ldots, S-1$, and $z=1, 2, \ldots, Z$. $pri(z,s_z)$ represents a priority of a complex coefficient corresponding to an $s_z^{th}$ reference signal port in the S reference signal ports at a $z^{th}$ transport layer. A smaller value of $pri(z,s_z)$ indicates a higher priority of the complex coefficient corresponding to the $s_z^{th}$ reference signal port at the $z^{th}$ transport layer. $f_5(s_z)$ represents an index value of the $s_z^{th}$ reference signal port that is at the $z^{th}$ transport layer and that is determined based on $K_z$ complex coefficients, and $f_5(s_z)\in\{0, 1, \ldots, S-1\}$. $K_z$ represents a quantity of complex coefficients at the $z^{th}$ transport layer, and $\Sigma_{z=1}^{Z}K_z=K$. It may be understood that, in this case, each complex coefficient in the K complex coefficients may be identified by $(z,s_z)$, complex coefficients identified by same $(z,s_z)$ have a same priority, and complex coefficients identified by different $(z,s_z)$ have different priorities.

A specific form of $f_5(s_z)$ is not limited in embodiments of this application.

For example, $f_5(s_z)$ may be a monotonically increasing function related to $s_z$. For example, $f_5(s_z)=s_z$. In this case, at the $z^{th}$ transport layer, smaller $s_z$ indicates a higher priority of the complex coefficient corresponding to the $s_z^{th}$ reference signal port. When $f_5(s_z)$ is a monotonically increasing function related to $s_z$, a meaning of the preset priority rule is that priorities of S×Z complex coefficients of the S reference signal ports at the Z transport layers descend in the following order: a complex coefficient corresponding to the $0^{th}$ reference signal port at the first transport layer, a complex coefficient corresponding to the $0^{th}$ reference signal port at the second transport layer, . . . , a complex coefficient corresponding to the $0^{th}$ reference signal port at the $Z^{th}$ transport layer; a complex coefficient corresponding to the first reference signal port at the first transport layer, . . . , a complex coefficient corresponding to the first reference signal port at the $Z^{th}$ transport layer; . . . ; a complex coefficient corresponding to the $(S-1)^{th}$ reference signal port at the first transport layer, . . . , a complex coefficient corresponding to the $(S-1)^{th}$ reference signal port at the $Z^{th}$ transport layer. When the K complex coefficients are determined from the S×Z complex coefficients, a priority order of the K complex coefficients may be determined based on an identifier $(z,s_z)$ of each complex coefficient and a priority order of the S×Z complex coefficients.

In another example, $f_5(s_z)$ may be a monotonically decreasing function related to $s_z$. For example, $f_5(s_z)=S-s_z$. In this case, at the $z^{th}$ transport layer, larger $s_z$ indicates a higher priority of the complex coefficient corresponding to the $s_z^{th}$ reference signal port. When $f_5(s_z)$ is a monotonically decreasing function related to $s_z$, a meaning of the preset priority rule is that priorities of S×Z complex coefficients of the S reference signal ports at the Z transport layers descend in the following order: a complex coefficient corresponding to the $(S-1)^{th}$ reference signal port at the first transport layer, a complex coefficient corresponding to the $(S-1)^{th}$ reference signal port at the second transport layer, . . . , a complex coefficient corresponding to the $(S-1)^{th}$ reference signal port at the $Z^{th}$ transport layer; a complex coefficient corresponding to the $(S-2)^{th}$ reference signal port at the first transport layer, . . . , a complex coefficient corresponding to the $(S-2)^{th}$ reference signal port at the $Z^{th}$ transport layer; . . . ; a complex coefficient corresponding to the $0^{th}$ reference signal port at the first transport layer, . . . , a complex coefficient corresponding to the $0^{th}$ reference signal port at the $Z^{th}$ transport layer. When the K complex coefficients are determined from the S×Z complex coefficients, a priority order of the K complex coefficients may be determined based on an identifier $(z,s_z)$ of each complex coefficient and a priority order of the S×Z complex coefficients.

In still another example, $f_5(s_z)$ may be determined in descending order of amplitudes of the $K_z$ complex coefficients. In this case, at the $z^{th}$ transport layer, smaller $f_5(s_z)$ indicates a higher priority of the complex coefficient corresponding to the $s_z^{th}$ reference signal port.

In yet another example, $f_5(s_z)$ may be determined in ascending order of amplitudes of the $K_z$ complex coefficients. In this case, at the $z^{th}$ transport layer, larger $f_5(s_z)$ indicates a higher priority of the complex coefficient corresponding to the $s_z^{th}$ reference signal port.

When $f_5(s_z)$ is related to the amplitude order of the $K_z$ complex coefficients, a meaning of the preset priority rule is that priorities of the S×Z complex coefficients of the S reference signal ports at the Z transport layers descend in the following order: a complex coefficient with the largest amplitude at the first transport layer, a complex coefficient with the largest amplitude at the second transport layer, . . . , a complex coefficient with the largest amplitude at the $Z^{th}$ transport layer; a complex coefficient with the second largest amplitude at the first transport layer, . . . , a complex coefficient with the second largest amplitude at the $Z^{th}$ transport layer; . . . ; a complex coefficient with the smallest amplitude at the first transport layer, . . . , a complex coefficient with the smallest amplitude at the $Z^{th}$ transport layer.

When $f_5(s_z)$ is determined in descending order of amplitudes of the $K_z$ complex coefficients, at the $z^{th}$ transport layer, a complex coefficient with the largest amplitude is a complex coefficient corresponding to the $s_z^{th}$ reference signal port when $f_5(s_z)$ is 0; a complex coefficient with the second largest amplitude is a complex coefficient corresponding to the $s_z^{th}$ reference signal port when $f_5(s_z)$ is 1; . . . ; and a complex coefficient with the smallest amplitude is a complex coefficient corresponding to the $s_z^{th}$ reference signal port when $f_5(s_z)$ is S−1. When $f_5(s_z)$ is determined in ascending order of amplitudes of the $K_z$ complex coefficients, at the $z^{th}$ transport layer, a complex coefficient with the largest amplitude is a complex coefficient corresponding to the $s_z^{th}$ reference signal port when $f_5(s$ is S−1; a complex coefficient with the second largest amplitude is a complex coefficient corresponding to the $s_z^{th}$ reference signal port when $f_5(s_z)$ is S−2; . . . ; and a complex coefficient with the smallest amplitude is a complex coefficient corresponding to the $s_z^{th}$ reference signal port when $f_5(s_z)$ is 0.

When the K complex coefficients are determined from the S×Z complex coefficients, a priority order of the K complex coefficients may be determined based on $(z, f_5(s_z))$ corresponding to an identifier $(z,s_z)$ of each complex coefficient and a priority order of the S×Z complex coefficients.

It should be understood that, when $f_5(s_z)$ is related to an amplitude order of the $K_z$ complex coefficients, the method may further include: The terminal device sends indication information #8, where the indication information #8 indicates a mapping relationship between a sequence number $s_z$ of a reference signal port at each transport layer and an index value $f_5(s_z)$. Correspondingly, the network device receives the indication information #8. The indication information #8 and the first indication information may be carried in same signaling, or may be carried in different signaling. This is not limited in this application.

In a second possible implementation, when the quantity of the angle-delay pairs corresponding to one reference signal port is 1, the quantity of the complex coefficients that are obtained by the terminal device and that correspond to the reference signal port is T. That is, $T_0=T_1=T_2=\ldots=T_{P-1}=T\geq 2$.

As described above, the network device may load T forms of one angle-delay pair to one reference signal port, and separately load the Q angle-delay pairs to the P reference signal ports. It may be understood that, in this case, one reference signal port corresponds to one angle-delay pair. Correspondingly, because the loading of the T forms of one angle-delay pair to one reference signal port may be implemented by the network device by shifting the angle-delay pair to T specific delay positions, for one reference signal port, the terminal device may separately obtain, at the T specific delay positions, one complex coefficient corresponding to the reference signal port.

In this implementation, when the terminal device determines, on the T specific delay positions, the T complex coefficients corresponding to each reference signal port, the T specific delay positions need to be predetermined. The T specific delay positions may be predefined in a protocol, or may be indicated by the network device to the terminal device. When the network device indicates the T specific delay positions to the terminal device, the method may further include: The network device sends indication information #9 (that is, third indication information), where the indication information #9 indicates the T specific delay positions. Correspondingly, the terminal device receives the indication information #9.

After the terminal device determines the T complex coefficients that respectively correspond to each reference signal port, on one reference signal port, the terminal device may select, from the T complex coefficients corresponding to the reference signal port, one complex coefficient as a complex coefficient that actually corresponds to an angle-delay pair corresponding to the reference signal port. For example, the terminal device may use a complex coefficient with the largest amplitude in the T complex coefficients corresponding to one reference signal port as the complex coefficient corresponding to the reference signal port. The method may further include: The terminal device sends indication information #10 (that is, fourth indication information), where the indication information #10 indicates a delay position corresponding to a complex coefficient selected by the terminal device on each reference signal port. Correspondingly, the network device receives the indication information #10. The indication information #10 and the first indication information may be carried in same signaling, or may be carried in different signaling. This is not limited in this application.

It should be understood that, in this implementation, when there are a plurality of transport layers, the terminal device may determine, at each transport layer, one complex coefficient corresponding to one reference signal port. Therefore, in this implementation, when the quantity of transport layers is Z and the quantity of reference signal ports is P, the foregoing complex coefficient set may include P×Z complex coefficients. Further, the terminal device may determine the K complex coefficients from the P×Z complex coefficients included in the complex coefficient set. For a manner in which the terminal device determines the K complex coefficients from the P×Z complex coefficients, refer to descriptions in the first possible implementation. For brevity, details are not described herein again.

After the terminal device determines the K complex coefficients, if an uplink resource allocated by the terminal device is sufficient for reporting the K complex coefficients, the terminal device may report all the K complex coefficients to the network device. That is, the terminal device may generate first indication information, where the first indication information indicates the B complex coefficients, and B=K.

If the uplink resource allocated to the terminal device is insufficient for reporting the K complex coefficients, the terminal device may determine the B complex coefficients from the K complex coefficients according to a preset priority rule, and report the B complex coefficients to the terminal device. That is, the terminal device may generate first indication information, where the first indication information indicates the B complex coefficients. B<K.

The preset priority rule is not limited in embodiments of this application. For details, refer to the description of the preset priority rule in the foregoing first possible implementation. For brevity, details are not described herein again.

In a third possible implementation, the terminal device obtains a quantity T of complex coefficients corresponding to one reference signal port. That is, $T_0=T_1=T_2=\ldots=T_{P-1}=T\geq 2$.

As described above, the network device may load T angle-delay pairs to one reference signal port. Correspondingly, for one reference signal port, the terminal device may obtain T complex coefficients corresponding to the reference signal port. Corresponding to the P reference signal ports, a total of P×T complex coefficients may be determined.

(b) of FIG. 7 is a schematic diagram of obtaining four complex coefficients corresponding to one reference signal port by a terminal device when four angle-delay pairs are loaded to the reference signal port. As shown in (b) of FIG. 7, the first complex coefficient corresponding to one reference signal port may be represented as $c_1=\Sigma\hat{h}(1:4:end)$. $\hat{h}$ represents a channel estimation value in a frequency domain unit. (1:4:end) represents that a value is obtained from 1 with 4 as an increment until a last value is obtained. Therefore, it can be learned that the first complex coefficient is a sum of channel estimation values corresponding to the reference signal port on frequency domain units included in the frequency domain unit group 1. The second complex coefficient corresponding to one reference signal port may be represented as $c_2=\Sigma\hat{h}(2:4:end)$. $\hat{h}$ represents a channel estimation value in a frequency domain unit. (2:4:end) represents that a value is obtained from 2 with 4 as an increment until a last value is obtained. Therefore, it can be learned that the second complex coefficient is a sum of channel estimation values corresponding to the reference signal port on frequency domain units included in the frequency domain unit group 2. The third complex coefficient corresponding to one reference signal port may be represented as $c_3=\Sigma\hat{h}(3:4:end)$. $\hat{h}$ represents a channel estimation value in a frequency domain unit. (3:4:end) represents that a value is obtained from 3 with 4 as an increment until a last value is obtained. Therefore, it can be learned that the third complex coefficient is a sum of channel estimation values corresponding to the reference signal port on frequency domain units included in the frequency domain unit group 3. The fourth complex coefficient corresponding to one reference signal port may be represented as $c_4=\Sigma\hat{h}(4:4:end)$ $\hat{h}$ represents a channel estimation value in a frequency domain unit. (4:4:end) represents that a value is obtained from 4 with 4 as an increment until a last value is obtained. Therefore, it can be learned that the fourth complex coefficient is a sum of channel estimation values corresponding to the reference signal port on frequency domain units included in the frequency domain unit group 4.

(b) of FIG. 10 is a schematic diagram of obtaining two complex coefficients corresponding to one reference signal port by a terminal device when two angle-delay pairs are loaded to the reference signal port. As shown in (b) of FIG. 10, for the port 1, the terminal device may obtain, through calculation at a delay position "0", a complex coefficient $c_1$ corresponding to an angle-delay pair, and the terminal device may further obtain, through calculation at a delay position "5", a complex coefficient $c_2$ corresponding to another angle-delay pair. For the port 2, the terminal device may obtain, through calculation at a delay position "0", a complex coefficient $c_3$ corresponding to an angle-delay pair, and the terminal device may further obtain, through calculation at a delay position "5", a complex coefficient $c_4$ corresponding to another angle-delay pair.

As described above, the network device may load the M angle-delay pairs in the Q angle-delay pairs to the P reference signal ports, and a quantity of angle-delay pairs loaded to each reference signal port is $M_p$. Correspondingly, for one reference signal port, the terminal device may obtain $M_p$ complex coefficients corresponding to the reference signal port. In addition, the terminal device may further perform detection near the delay position "0" of the reference signal port by using a specific delay range and a delay search granularity, to obtain additional $T-M_p$ complex coefficients. That is, the terminal device may obtain T complex coefficients corresponding to the reference signal port. Corresponding to the P reference signal ports, a total of P×T complex coefficients may be determined. A value of T is determined based on a delay range and a delay search granularity for searching by the terminal device. It should be understood that a complex coefficient in the $T-M_p$ complex coefficients that are additionally obtained by the terminal device through detection may correspond to an actual angle-delay pair, or may correspond to no angle-delay pair.

As shown in FIG. 13, the network device separately loads four angle-delay pairs in the six angle-delay pairs to four reference signal ports. Correspondingly, the terminal device may separately obtain, based on the precoded reference signal received on each reference signal port, complex coefficients corresponding to the angle-delay pairs loaded to the four reference signal ports. In addition, the terminal device may further perform detection near the delay position "0" of each reference signal port by using a specific delay range (for example, a dashed box in FIG. 13) and a delay search granularity, to obtain additional complex coefficients. The port 1 is used as an example. The network device loads the angle-delay pair 1 to the port 1, which is equivalent to that the angle-delay pair 1 is translated to the delay position "0", and the angle-delay pair 2 is also translated to the delay position "2". In other words, the angle-delay pair 1 and the angle-delay pair 2 still maintain a same delay interval. Assuming that the delay search range enabled by the terminal device is a dashed box in FIG. 13 (including delay positions "0", "1", "2", and "3"), and the delay search granularity is consistent with the delay interval obtained by uplink estimation, the terminal device may obtain four complex coefficients through calculation on the port 1. Only complex coefficients obtained at the time delay position "0" and the time delay "2" correspond to the angle-delay pair 1 and the angle-delay pair 2 respectively, and the other two complex coefficients do not correspond to any angle-delay pair, and an amplitude is close to 0. Similarly, the terminal device may obtain four complex coefficients through calculation on each port in the port 2 to the port 4.

It should be understood that FIG. 13 is described only by using an example in which a search delay granularity of the terminal device is consistent with an uplink delay estimation granularity. Alternatively, the search delay granularity of the terminal device may be inconsistent with the uplink delay estimation granularity.

When determining the T complex coefficients corresponding to each reference signal port, the terminal device needs to predetermine the delay search range and the delay search granularity. The delay search range and the delay search granularity may be predefined in a protocol, or may be indicated by the network device to the terminal device. Alternatively, one of the delay search range and the delay search granularity may be predefined in a protocol, and the other is indicated by the network device to the terminal device. When the network device indicates the delay search range and/or the delay search granularity to the terminal device, the method may further include: The network device sends indication information #11 (that is, sixth indication information), where the indication information #11 indicates the delay search range and/or the delay search granularity. Correspondingly, the terminal device receives the indication information #11.

It should be understood that, when the terminal device performs detection to obtain additional complex coefficients, in a process in which the terminal device sends complex coefficients to the network device, the method may further include: The terminal device sends indication information #12 (that is, seventh indication information), where the indication information #12 indicates delay positions that respectively correspond to the complex coefficients reported by the terminal device. Correspondingly, the network device receives the indication information #12. The indication information #12 and the first indication information may be carried in same signaling, or may be carried in different signaling. This is not limited in this application.

It should be understood that, in this implementation, when there are a plurality of transport layers, the terminal device may determine P×T complex coefficients at each transport layer. Therefore, in this implementation, when the quantity of transport layers is Z, the complex coefficient set described above may include P×T×Z complex coefficients. Further, the terminal device may determine the K complex coefficients from the P×T×Z complex coefficients included in the complex coefficient set. How the terminal device determines the K complex coefficients from the P×T×Z complex coefficients is not limited in embodiments of this application.

In an example, the terminal device may determine the K complex coefficients from the P×T×Z complex coefficients. In this case, K≤P×T×Z. A value of K may be predefined in a protocol, or may be indicated by the network device to the terminal device. When the network device indicates the value of K to the terminal device, the method may further include: The network device sends indication information #3, where the indication information #3 indicates the value of K. Correspondingly, the terminal device receives the indication information #3.

It may be understood that, in this example, the K complex coefficients determined by the terminal device may be complex coefficients corresponding to S reference signal ports in the P reference signal ports, that is, K may be equal to S×T×Z. The K complex coefficients determined by the terminal device may be some complex coefficients in the complex coefficients corresponding to the P reference signal ports. In other words, K may be equal to P×U×Z, U is a positive integer, and U≤T. Alternatively, the K complex coefficients determined by the terminal device may be some complex coefficients in the complex coefficients corresponding to the S reference signal ports, that is, K may be equal to S×U×Z.

In another example, the terminal device may determine the K complex coefficients from the U complex coefficients corresponding to each reference signal port in the S reference signal ports, that is, the terminal device may determine the K complex coefficients from the S×U×Z complex coefficients. In this case, K≤S×U×Z. In this example, when determining the K complex coefficients, the terminal device needs to predetermine the values of S, U, and K, or predetermine the values of S and U, or predetermine the value of U, or predetermine the value of S. The value of S, U, or K may be predefined in a protocol, or may be indicated by the network device to the terminal device. When the network device indicates the value of S, U, or K to the terminal device, the method may further include: The network device sends indication information #13, where the indication information #13 indicates the values of S, U, and K, or the indication information #13 indicates the values of S and U, or the indication information #13 indicates the value of U, or the indication information #13 indicates the value of S. Correspondingly, the terminal device receives the indication information #13.

Optionally, as described above, when the network device loads the T angle-delay pairs to one reference signal port by using the frequency domain unit group and the plurality of delay positions, the value of U may be determined by using a quantity E' of selected frequency domain unit groups and/or a quantity F' of selected delay positions. E'≤E. F'≤F. E is a total quantity of frequency domain unit groups on one reference signal port. F is a total quantity of delay positions that are loaded with different angle-delay pairs on one reference signal port. For example, U may be equal to E'×F, or U may be equal to E×F', or U=E'×F'. The value of E' and/or F' may be predefined in a protocol, or may be indicated by the network device to the terminal device.

It may be understood that, when the terminal device predetermines the values of S and U but does not predetermine the value of K, the terminal device may use U complex coefficients corresponding to each reference signal port in the S reference signal ports as the K complex coefficients. That is, K=S×U×Z.

It may further be understood that, when the terminal device predetermines the value of U but does not predetermine the values of S and K, the terminal device may use U complex coefficients corresponding to each reference signal port in the P reference signal ports as the K complex coefficients. That is, K=P×U×Z. It may also be understood as S=P.

It may further be understood that, when the terminal device predetermines the value of S but does not predetermine the values U and K, the terminal device may use T complex coefficients corresponding to each reference signal port in the S reference signal ports as the K complex coefficients. That is, K=S×T×Z. It may also be understood as U=T.

After the terminal device determines the K complex coefficients, if an uplink resource allocated by the terminal device is sufficient for reporting the K complex coefficients, the terminal device may report all the K complex coefficients to the network device. That is, the terminal device may generate first indication information, where the first indication information indicates the B complex coefficients, and B=K.

If the uplink resource allocated to the terminal device is insufficient for reporting the K complex coefficients, the terminal device may determine the B complex coefficients from the K complex coefficients according to a preset priority rule, and report the B complex coefficients to the terminal device. That is, the terminal device may generate first indication information, where the first indication information indicates the B complex coefficients. B<K.

The preset priority rule is not limited in embodiments of this application.

Example 1: The preset priority rule may be related to an index value of each complex coefficient in the K complex coefficients.

For the preset priority rule in this example, refer to the descriptions in the first possible implementation. For brevity, details are not described herein again.

Example 2: The preset priority rule may be related to an index value of a reference signal port corresponding to each complex coefficient in the K complex coefficients.

As described above, the K complex coefficients may be complex coefficients corresponding to the S reference signal ports. In this case, the preset priority rule may be related to an index value, in the S reference signal ports, of a reference signal port corresponding to each complex coefficient in the K complex coefficients.

The preset priority rule may be represented as $pri(s)=f_2(s)$, and $s=0, 1, \ldots, S-1$. $pri(s)$ represents a priority of a complex coefficient corresponding to an $s^{th}$ reference signal port in the S reference signal ports. A smaller value of $pri(s)$ indicates a higher priority of the complex coefficient corresponding to the $s^{th}$ reference signal port. $f_2(s)$ represents an index value of the $s^{th}$ reference signal port that is determined based on the K complex coefficients, and $f_2(s) \in \{0, 1, \ldots, S-1\}$.

It may be understood that, in this case, each complex coefficient in the K complex coefficients may be identified by (s), complex coefficients identified by same (s) have a same priority, and complex coefficients identified by different (s) have different priorities. As described above, the terminal device may determine the K complex coefficients from the U complex coefficients corresponding to each reference signal port in the S reference signal ports. Therefore, it may be understood that there may be one or more complex coefficients that are in the K complex coefficients and that correspond to the $s^{th}$ reference signal port. If a plurality of complex coefficients in the K complex coefficients correspond to the $s^{th}$ reference signal port, the plurality of complex coefficients have a same identifier (s), and have a same priority.

A specific form of $f_2(s)$ is not limited in embodiments of this application.

For example, $f_2(s)$ may be a monotonically increasing function related to s. For example, $f_2(s)=s$. In this case, smaller s indicates a higher priority of the complex coefficient corresponding to the $s^{th}$ reference signal port.

In another example, $f_2(s)$ may be a monotonically decreasing function related to s. For example, $f_2(s)=S-S$. In this case, larger s indicates a higher priority of the complex coefficient corresponding to the $s^{th}$ reference signal port.

In still another example, $f_2(s)$ may be determined in descending order of amplitudes of the K complex coefficients. In this case, smaller $f_2(s)$ indicates a higher priority of the complex coefficient corresponding to the $s^{th}$ reference signal port. In a process of determining $f_2(s)$, a complex coefficient used for amplitude sorting may be a sum of amplitudes of one or more complex coefficients that are in the K complex coefficients and that correspond to the $s^{th}$ reference signal port. For example, summation is performed on one or more complex coefficients that are in the K complex coefficients and that correspond to the $0^{th}$ reference signal port to obtain a first complex coefficient, summation is performed on one or more complex coefficients that are in the K complex coefficients and that correspond to the first reference signal port to obtain a second complex coefficient, . . . , and summation is performed on one or more complex coefficients that are in the K complex coefficients and that correspond to the $(S-1)^{th}$ reference signal port to obtain an $S^{th}$ complex coefficient. Next, the S complex coefficients are sorted in descending order of amplitudes to obtain an index value of each reference signal port. Similarly, in a process of determining $f_2(s)$, a complex coefficient used for amplitude sorting may alternatively be an average value of amplitudes of one or more complex coefficients that are in the K complex coefficients and that correspond to the $s^{th}$ reference signal port. That is, after S complex coefficients are obtained by calculating the average value of the amplitudes of the one or more complex coefficients that respectively correspond to the S reference signal ports, the S complex coefficients are sorted in descending order of amplitudes to obtain an index value of each reference signal port. In a process of determining $f_2(s)$, a complex coefficient used for amplitude sorting may alternatively be a maximum value of amplitudes of one or more complex coefficients that are in the K complex coefficients and that correspond to the $s^{th}$ reference signal port. That is, after a complex coefficient with a maximum amplitude in the one or more complex coefficients that respectively correspond to the S reference signal ports is selected, the S complex coefficients are sorted in descending order of amplitudes to obtain an index value of each reference signal port.

In yet another example, $f_2(s)$ may be determined in ascending order of amplitudes of the K complex coefficients. In this case, larger $f_2(s)$ indicates a higher priority of the complex coefficient corresponding to the $s^{th}$ reference signal port. In a process of determining $f_2(s)$, a complex coefficient used for amplitude sorting may be a sum of amplitudes of one or more complex coefficients that are in the K complex coefficients and that correspond to the $s^{th}$ reference signal port. For example, summation is performed on one or more complex coefficients that are in the K complex coefficients and that correspond to the $0^{th}$ reference signal port to obtain a first complex coefficient, summation is performed on one or more complex coefficients that are in the K complex coefficients and that correspond to the first reference signal port to obtain a second complex coefficient, . . . , and summation is performed on one or more complex coefficients that are in the K complex coefficients and that correspond to the $(S-1)^{th}$ reference signal port to obtain an $S^{th}$ complex coefficient. Next, the S complex coefficients are sorted in ascending order of amplitudes to obtain an index value of each reference signal port. Similarly, in a process of determining $f_2(s)$, a complex coefficient used for amplitude sorting may alternatively be an average value of amplitudes of one or more complex coefficients that are in the K complex coefficients and that correspond to the $s^{th}$ reference signal port. That is, after S complex coefficients are obtained by calculating the average value of the amplitudes of the one or more complex coefficients that respectively correspond to the S reference signal ports, the S complex coefficients are sorted in ascending order of amplitudes to obtain an index value of each reference signal port. In a process of determining $f_2(s)$, a complex coefficient used for amplitude sorting may alternatively be a maximum value of amplitudes of one or more complex coefficients that are in the K complex coefficients and that correspond to the $s^{th}$ reference signal port. That is, after a complex coefficient with a maximum amplitude in the one or more complex coefficients that respectively correspond to the S reference signal ports is selected, the S complex coefficients are sorted in ascending order of amplitudes to obtain an index value of each reference signal port.

It should be understood that, when $f_2(s)$ is related to an amplitude order of the K complex coefficients, the method may further include: The terminal device sends indication information #6, where the indication information #6 indicates a mapping relationship between a sequence number s of each reference signal port in the S reference signal ports and an index value $f_2(s)$. Correspondingly, the network device receives the indication information #6. The indication information #6 and the first indication information may be carried in same signaling, or may be carried in different signaling. This is not limited in this application.

Example 3: The preset priority rule may be related to the following two items: a quantity Z of transport layers and an index value of each complex coefficient in the K complex coefficients.

For the preset priority rule in this example, refer to the descriptions in the first possible implementation. For brevity, details are not described herein again.

Example 4: The preset priority rule may be related to the following two items: a quantity Z of transport layers and an index value of a reference signal port corresponding to each complex coefficient in the K complex coefficients.

As described above, the K complex coefficients may be complex coefficients corresponding to the S reference signal ports. In this case, the preset priority rule may be related to the following two items: the quantity Z of transport layers and the index value, in the S reference signal ports, of the reference signal port corresponding to each complex coefficient in the K complex coefficients.

The preset priority rule may be represented as $pri(z,s_z)=Z \cdot f_5(s_z)+z$, $s_z=0, 1, \ldots, S-1$, and $z=1, 2, \ldots, Z$. $pri(z,s_z)$ represents a priority of a complex coefficient corresponding to an $s_z^{th}$ reference signal port in the S reference signal ports at a $z^{th}$ transport layer. A smaller value of $pri(z,s_z)$ indicates a higher priority of the complex coefficient corresponding to the $S_z^{th}$ reference signal port at the $z^{th}$ transport layer. $f_5(s_z)$ represents an index value of the $S_z^{th}$ reference signal port that is at the $z^{th}$ transport layer and that is determined based on $K_z$ complex coefficients, and $f_5(s_z) \in \{0, 1, \ldots, S-1\}$, $K_z$ represents a quantity of complex coefficients at the $z^{th}$ transport layer, and $\Sigma_{z=1}^{Z} K_z = K$.

It may be understood that, in this case, each complex coefficient in the K complex coefficients may be identified by (z,sz), complex coefficients identified by same (z,sz) have a same priority, and complex coefficients identified by different (z,sz) have different priorities. As described above, a quantity of complex coefficients corresponding to the $s_z^{th}$ reference signal port at the $z^{th}$ transport layer is U. Therefore, it may be understood that there may be one or more complex coefficients corresponding to the $s_z^{th}$ reference signal port at the $z^{th}$ transport layer in the K complex coefficients. If a plurality of complex coefficients in the K complex coefficients correspond to the $s_z^{th}$ reference signal port at the $z^{th}$ transport layer, the plurality of complex coefficients have a same identifier $(z,s_z)$, and have a same priority.

A specific form of $f_5(s_z)$ is not limited in embodiments of this application.

For example, $f_5(s_z)$ may be a monotonically increasing function related to $s_z$. For example, $f_5(s_z)=s_z$. In this case, at the $z^{th}$ transport layer, smaller $s_z$ indicates a higher priority of the complex coefficient corresponding to the $s_z^{th}$ reference signal port. When $f_5(s_z)$ is a monotonically increasing function related to $s_z$, a meaning of the preset priority rule is that priorities of S×Z×U complex coefficients of the S reference signal ports at the Z transport layers descend in the following order: U complex coefficients corresponding to the $0^{th}$ reference signal port at the first transport layer, U complex coefficients corresponding to the $0^{th}$ reference signal port at the second transport layer, . . . , U complex coefficients corresponding to the $0^{th}$ reference signal port at the $Z^{th}$ transport layer; U complex coefficients corresponding to the first reference signal port at the first transport layer, . . . , U complex coefficients corresponding to the first reference signal port at the $Z^{th}$ transport layer; . . . ; U complex coefficients corresponding to the $(S-1)^{th}$ reference signal port at the first transport layer, . . . , U complex coefficients corresponding to the $(S-1)^{th}$ reference signal port at the $Z^{th}$ transport layer. When the K complex coefficients are determined from the S×Z×U complex coefficients, a priority order of the K complex coefficients may be determined based on an identifier $(z,s_z)$ of each complex coefficient and a priority order of the S×Z×U complex coefficients.

In another example, $f_5(s_z)$ may be a monotonically decreasing function related to $s_z$. For example, $f_5(s_z)=S-s_z$. In this case, at the $z^{th}$ transport layer, larger $s_z$ indicates a higher priority of the complex coefficient corresponding to the $s_z^{th}$ reference signal port. When $f_5(s_z)$ is a monotonically decreasing function related to $s_z$, a meaning of the preset priority rule is that priorities of S×Z×U complex coefficients of the S reference signal ports at the Z transport layers descend in the following order: U complex coefficients corresponding to the $(S-1)^{th}$ reference signal port at the first transport layer, U complex coefficients corresponding to the $(S-1)^{th}$ reference signal port at the second transport layer, . . . , U complex coefficients corresponding to the $(S-1)^{th}$ reference signal port at the $Z^{th}$ transport layer; U complex coefficients corresponding to the $(S-_2)^{th}$ reference signal port at the first transport layer, . . . , U complex coefficients corresponding to the $(S-_2)^{th}$ reference signal port at the $Z^{th}$ transport layer; . . . ; U complex coefficients corresponding to the $0^{th}$ reference signal port at the first transport layer, . . . , U complex coefficients corresponding to the $0^{th}$ reference signal port at the $Z^{th}$ transport layer. When the K complex coefficients are determined from the S×Z×U complex coefficients, a priority order of the K complex coefficients may be determined based on an identifier $(z,s_z)$ of each complex coefficient and a priority order of the S×Z×U complex coefficients.

In still another example, $f_5(s_z)$ may be determined in descending order of amplitudes of the $K_z$ complex coefficients. In this case, at the $z^{th}$ transport layer, smaller $f_5(s_z)$ indicates a higher priority of the complex coefficient corresponding to the $s_z^{th}$ reference signal port. In a process of determining $f_5(s_z)$, a complex coefficient used for amplitude sorting may be a sum of amplitudes of one or more complex coefficients that are in the K complex coefficients and that correspond to the $s_z^{th}$ reference signal port at the $z^{th}$ transport layer. For example, summation is performed on one or more complex coefficients that are in the K complex coefficients and that correspond to the $0^{th}$ reference signal port at the $z^{th}$ transport layer to obtain a first complex coefficient, summation is performed on one or more complex coefficients that are in the K complex coefficients and that correspond to the first reference signal port at the $z^{th}$ transport layer to obtain a second complex coefficient, . . . , and summation is performed on one or more complex coefficients that are in the K complex coefficients and that correspond to the $(S-1)^{th}$ reference signal port at the $z^{th}$ transport layer to obtain an $S^{th}$ complex coefficient. Next, the S complex coefficients are sorted in descending order of amplitudes to obtain an index value of each reference signal port at the $z^{th}$ transport layer. In a process of determining $f_5(s_z)$, a complex coefficient used for amplitude sorting may alternatively be an average value of amplitudes of one or more complex coefficients that are in the K complex coefficients and that correspond to the $s^{th}$ reference signal port at the $z^{th}$ transport layer. That is, after S complex coefficients are obtained by calculating the average value of the amplitudes of the one or more complex coefficients that respectively correspond to the S reference signal ports at the $z^{th}$ transport layer, the S complex coefficients are sorted in descending order of amplitudes to obtain an index value of each reference signal port at the $z^{th}$ transport layer. In a process of determining $f_5(s_z)$, a complex coefficient used for amplitude sorting may be a maximum value of amplitudes of one or more complex coefficients that are in the K complex coefficients and that correspond to the $s_z^{th}$ reference signal port at the $z^{th}$ transport layer. That is, after a complex coefficient with a maximum amplitude in the one or more complex coefficients that respectively correspond to the S reference signal ports at the $z^{th}$ transport layer is selected, the S complex coefficients are sorted in descending order of amplitudes to obtain an index value of each reference signal port at the $z^{th}$ transport layer.

In yet another example, $f_5(s_z)$ may be determined in ascending order of amplitudes of the $K_z$ complex coefficients. In this case, at the $z^{th}$ transport layer, larger $f_5(s_z)$ indicates a higher priority of the complex coefficient corresponding to the $s_z^{th}$ reference signal port. In a process of determining $f_5(s_z)$, a complex coefficient used for amplitude sorting may be a sum of amplitudes of one or more complex coefficients that are in the K complex coefficients and that correspond to the $s_z^{th}$ reference signal port at the $z^{th}$ transport layer. For example, summation is performed on one or more complex coefficients that are in the K complex coefficients and that correspond to the $0^{th}$ reference signal port at the $z^{th}$ transport layer to obtain a first complex coefficient, summation is performed on one or more complex coefficients that are in the K complex coefficients and that correspond to the first reference signal port at the $z^{th}$ transport layer to obtain a second complex coefficient, . . . , and summation is performed on one or more complex coefficients that are in the K complex coefficients and that correspond to the $(S-1)^{th}$ reference signal port at the $z^{th}$ transport layer to obtain an $S^{th}$ complex coefficient. Next, the S complex coefficients are sorted in ascending order of amplitudes to obtain an index value of each reference signal port at the $z^{th}$ transport layer. In a process of determining $f_5(s_z)$, a complex coefficient used for amplitude sorting may alternatively be an average value of amplitudes of one or more complex coefficients that are in the K complex coefficients and that correspond to the $s_z^{th}$ reference signal port at the $z^{th}$ transport layer. That is, after S complex coefficients are obtained by calculating the average value of the amplitudes of the one or more complex coefficients that respectively correspond to the S reference signal ports at the $z^{th}$ transport layer, the S complex coefficients are sorted in ascending order of amplitudes to obtain an index value of each reference signal port at the $z^{th}$ transport layer. In a process of determining $f_5(s_z)$, a complex coefficient used for amplitude sorting may be a maximum value of amplitudes of one or more complex coefficients that are in the K complex coefficients and that correspond to the $s_z^{th}$ reference signal port at the $z^{th}$ transport layer. That is, after a complex coefficient with a maximum amplitude in the one or more complex coefficients that respectively correspond to the S reference signal ports at the $z^{th}$ transport layer is selected, the S complex coefficients are sorted in ascending order of amplitudes to obtain an index value of each reference signal port at the $z^{th}$ transport layer.

When $f_5(s_z)$ is related to the amplitude order of the $K_z$ complex coefficients, a meaning of the preset priority rule is that priorities of S×Z×U complex coefficients of the S reference signal ports at the Z transport layers descend in the following order: U complex coefficients corresponding to a reference signal port corresponding to a complex coefficient with the largest amplitude at the first transport layer, U complex coefficients corresponding to a reference signal port corresponding to a complex coefficient with the largest amplitude at the second transport layer, . . . , U complex coefficients corresponding to a reference signal port corresponding to a complex coefficient with the largest amplitude at the $Z^{th}$ transport layer; U complex coefficients corresponding to a reference signal port corresponding to a complex coefficient with the second largest amplitude at the first transport layer, . . . , U complex coefficients corresponding to a reference signal port corresponding to a complex coefficient with the second largest amplitude at the $Z^{th}$ transport layer; . . . ; U complex coefficients corresponding to a reference signal port corresponding to a complex coefficient with the smallest amplitude at the first transport layer, . . . , U complex coefficients corresponding to a reference signal port corresponding to a complex coefficient with the smallest amplitude at the $Z^{th}$ transport layer. It may be understood that the complex coefficient used for amplitude sorting at each transport layer may be a complex coefficient with the largest amplitude in the U complex coefficients corresponding to each reference signal port, or may be a sum of the U complex coefficients corresponding to each reference signal port, or may be an average value of the U complex coefficients corresponding to each reference signal port.

When $f_5(s_z)$ is determined in descending order of amplitudes of the $K_z$ complex coefficients, at the $z^{th}$ transport layer, a reference signal port corresponding to a complex coefficient with the largest amplitude is the $s_z^{th}$ reference signal port when $f_5(s_z)$ is 0; a reference signal port corresponding to a complex coefficient with the second largest amplitude is the $s_z^{th}$ reference signal port when $f_5(s_z)$ is 1; . . . ; and a reference signal port corresponding to a complex coefficient with the smallest amplitude is the $s_z^{th}$ reference signal port when $f_5(s_z)$ is S−1. When $f_5(s_z)$ is determined in ascending order of amplitudes of the $K_z$ complex coefficients, at the $z^{th}$ transport layer, a reference signal port corresponding to a complex coefficient with the largest amplitude is the $s_z^{th}$ reference signal port when $f_5(s_z)$ is S−1; a reference signal port corresponding to a complex coefficient with the second largest amplitude is the $s_z^{th}$ reference signal port when $f_5(s_z)$ is S−2; . . . ; and a reference signal port corresponding to a complex coefficient with the smallest amplitude is the $s_z$ reference signal port when $f_5(s_z)$ is 0.

When the K complex coefficients are determined from the S×Z×U complex coefficients, a priority order of the K complex coefficients may be determined based on (z, $f_5(s_z)$) corresponding to an identifier (z,$s_z$) of each complex coefficient and a priority order of the S×Z×U complex coefficients.

It should be understood that, when $f_5(s_z)$ is related to an amplitude order of the K complex coefficients, the method may further include: The terminal device sends indication information #7, where the indication information #7 indicates the amplitude order of the complex coefficients at each transport layer. Correspondingly, the network device receives the indication information #7. The indication information #7 and the first indication information may be carried in same signaling, or may be carried in different signaling. This is not limited in this application.

Example 5: The preset priority rule may be related to the following two items: an index value of a reference signal port corresponding to each complex coefficient in the K complex coefficients, and an index value of each complex coefficient in the K complex coefficients for a corresponding reference signal port.

As described above, the K complex coefficients may be determined from the U complex coefficients corresponding to each reference signal port in the S reference signal ports. In this case, the preset priority rule may be related to the following two items: an index value of a reference signal port corresponding to each complex coefficient in the K complex coefficients in the S reference signal ports, and an index value of each complex coefficient in the K complex coefficients in U complex coefficients corresponding to a corresponding reference signal port.

The preset priority rule may be represented as pri(s,$u_s$)=U·$f_2(s)$+$f_3(u_s)$ s=0, 1, . . . , S−1, and $u_s$=0, 1, . . . , U−1. pri(s,$u_s$) represents a priority of a $u_s^{th}$ complex coefficient that corresponds to the $s^{th}$ reference signal port in the S reference signal ports and that is on the $s^{th}$ reference signal port. A smaller value of pri(s,$u_s$) indicates a higher priority of the $u_s^{th}$ complex coefficient that corresponds to the $s^{th}$ reference signal port in the S reference signal ports and that is on the $s^{th}$ reference signal port. $f_2(s)$ represents an index value of the $s^{th}$ reference signal port determined based on the K complex coefficients, and $f_2(s)\in\{0, 1, \ldots, S-1\}$. $f_3(u_s)$ represents an index value of the $u_s^{th}$ complex coefficient that is determined based on a complex coefficient that is in the K complex coefficients and that corresponds to the $s^{th}$ reference signal port, and $f_3(u_s)\in\{0, 1, \ldots, U-1\}$.

It may be understood that, in this case, each complex coefficient in the K complex coefficients may be identified by (s,$u_s$), complex coefficients identified by same (s,$u_s$) have a same priority, and complex coefficients identified by different (s,$u_s$) have different priorities. As described above, the terminal device may obtain, at each transport layer in the Z transport layers, the U complex coefficients corresponding to the $s^{th}$ reference signal port. Therefore, it may be understood that the $u_s^{th}$ complex coefficient that is in the K complex coefficients and that corresponds to the $s^{th}$ reference signal port may be a $u_s^{th}$ complex coefficient at one transport layer, or may be $u_s^{th}$ complex coefficients at a plurality of transport layers. If the $u_s^{th}$ complex coefficient that is in the K complex coefficients and that corresponds to the $s^{th}$ reference signal port is $u_s^{th}$ complex coefficients at a plurality of transport layers, the $u_s^{th}$ complex coefficients at the plurality of transport layers have a same identifier (s,$u_s$) and have a same priority.

A specific form of $f_2(s)$ is not limited in embodiments of this application. For details, refer to the description of $f_2(s)$ in the foregoing Example 2. For brevity, details are not described herein again.

A specific form of $f_3(u_s)$ is not limited in embodiments of this application.

For example, $f_3(u_s)$ may be a monotonically increasing function related to $u_s$. For example, $f_3(u_s)$+$u_s$. In this case, on the $s^{th}$ reference signal port, smaller $u_s$ indicates a higher priority of a corresponding $u_s^{th}$ complex coefficient.

In another example, $f_3(u_s)$ may be a monotonically decreasing function related to $u_s$. For example, $f_3(u_s)$=U−$u_s$. In this case, on the $s^{th}$ reference signal port, larger $u_s$ indicates a higher priority of a corresponding $u_s^{th}$ complex coefficient.

In still another example, $f_3(u_s)$ may be determined in descending order of amplitudes of complex coefficients that are in the K complex coefficients and that correspond to the $s^{th}$ reference signal port. In this case, on the $s^{th}$ reference signal port, smaller $f_3(u_s)$ indicates a higher priority of a corresponding $u_s^{th}$ complex coefficient.

An example in which K=S×Z×U is used to describe a method for determining $f_3(u_s)$ in descending order of amplitudes of complex coefficients that are in the K complex coefficients and that correspond to the $s^{th}$ reference signal port. It may be understood that, when K=S×Z×U, a quantity of complex coefficients that are in the K complex coefficients and that correspond to the $s^{th}$ reference signal port is Z×U. In a process of determining $f_3(u_s)$, a complex coefficient used for amplitude sorting may be a sum of amplitudes of $u_s^{th}$ complex coefficients that respectively correspond to the $s^{th}$ reference signal port at each transport layer. For example, summation is performed on the $0^{th}$ complex coefficients corresponding to the $s^{th}$ reference signal port at the Z transport layers to obtain a first complex coefficient, summation is performed on the first complex coefficients corresponding to the $s^{th}$ reference signal port at the Z transport layers to obtain a second complex coefficient, . . . , and summation is performed on the $(U-1)^{th}$ complex coefficients corresponding to the $s^{th}$ reference signal port at the Z transport layers to obtain a $U^{th}$ complex coefficient. Next, the U complex coefficients are sorted in descending order of amplitudes, to obtain an index value of a $u_s^{th}$ complex coefficient corresponding to the $s^{th}$ reference signal port. Similarly, in a process of determining $f_3(u_s)$, the complex coefficient used for amplitude sorting may be alternatively an average value of amplitudes of $u_s^{th}$ complex coefficients that respectively correspond to the $s^{th}$ reference signal port at each transport layer. In a process of determining $f_3(u_s)$, a complex coefficient used for amplitude sorting may be a maximum value of amplitudes of $u_s^{th}$ complex coefficients that respectively correspond to the $s^{th}$ reference signal port at each transport layer.

In another example, $f_3(u_s)$ may be determined in ascending order of amplitudes of complex coefficients that are in the K complex coefficients and that correspond to the $s^{th}$ reference signal port. In this case, on the $s^{th}$ reference signal port, larger $f_3(u_s)$ indicates a higher priority of a corresponding $u_s^{th}$ complex coefficient.

An example in which $K=S\times Z\times U$ is used to describe a method for determining $f_3(u_s)$ in ascending order of amplitudes of complex coefficients that are in the K complex coefficients and that correspond to the s' reference signal port. It may be understood that, when $K=S\times Z\times U$, a quantity of complex coefficients that are in the K complex coefficients and that correspond to the $s^{th}$ reference signal port is $Z\times U$. In a process of determining $f_3(u_s)$, a complex coefficient used for amplitude sorting may be a sum of amplitudes of $u_s^{th}$ complex coefficients that respectively correspond to the $s^{th}$ reference signal port at each transport layer. For example, summation is performed on the $0^{th}$ complex coefficients corresponding to the $s^{th}$ reference signal port at the Z transport layers to obtain a first complex coefficient, summation is performed on the first complex coefficients corresponding to the $s^{th}$ reference signal port at the Z transport layers to obtain a second complex coefficient, . . . , and summation is performed on the $(U-1)^{th}$ complex coefficients corresponding to the $s^{th}$ reference signal port at the Z transport layers to obtain a $U^{th}$ complex coefficient. Next, the U complex coefficients are sorted in ascending order of amplitudes, to obtain an index value of a $u_s^{th}$ complex coefficient corresponding to the $s^{th}$ reference signal port. Similarly, in a process of determining $f_3(u_s)$, the complex coefficient used for amplitude sorting may be alternatively an average value of amplitudes of $u_s^{th}$ complex coefficients that respectively correspond to the $s^{th}$ reference signal port at each transport layer. In a process of determining $f_3(u_s)$, a complex coefficient used for amplitude sorting may be a maximum value of amplitudes of $u_s^{th}$ complex coefficients that respectively correspond to the $s^{th}$ reference signal port at each transport layer.

It may be understood that, when $K \leq S\times Z\times U$, a quantity of complex coefficients that are in the K complex coefficients and that correspond to the $s^{th}$ reference signal port is less than $Z\times U$. For example, the $u_s^{th}$ complex coefficient that is in the K complex coefficients and that corresponds to the $s^{th}$ reference signal port is $u_s^{th}$ complex coefficients at Z' transport layers, where $Z'<Z$. In another example, a quantity of complex coefficients that are in the K complex coefficients and that correspond to the $s^{th}$ reference signal port at the $z^{th}$ transport layer may be U', where $U'<U$.

It should be understood that, when $f_3(u_s)$ is related to an amplitude order of the complex coefficients corresponding to the $s^{th}$ reference signal port, the method may further include: The terminal device sends indication information #14, where the indication information #14 indicates a mapping relationship between a sequence number $u_s$ of a complex coefficient on each reference signal port and an index value $f_3(u_s)$. Correspondingly, the network device receives the indication information #14. The indication information #14 and the first indication information may be carried in same signaling, or may be carried in different signaling. This is not limited in this application.

A meaning of the foregoing priority rule is that priorities of $S\times Z\times U$ complex coefficients of the S reference signal ports at the Z transport layers descend in the following order: the first complex coefficient corresponding to the first reference signal port at each transport layer, the second complex coefficient corresponding to the first reference signal port at each transport layer, . . . , the $U^{th}$ complex coefficient corresponding to the first reference signal port at each transport layer; the first complex coefficient corresponding to the second reference signal port at each transport layer, . . . , the $U^{th}$ complex coefficient corresponding to the second reference signal port at each transport layer; . . . ; the first complex coefficient corresponding to the $S^{th}$ reference signal port at each transport layer, . . . , the $U^{th}$ complex coefficient corresponding to the $S^{th}$ reference signal port at each transport layer.

The first reference signal port is a corresponding $s^{th}$ reference signal port when $f_2(s)$ is 0, the second reference signal port is a corresponding $s^{th}$ reference signal port when $f_2(s)$ is 1, . . . , and the $S^{th}$ reference signal port is a corresponding $s^{th}$ reference signal port when $f_2(s)$ is $S-1$. When $f_2(s)$ is determined in ascending order of amplitudes of the K complex coefficients, the first reference signal port is a corresponding $s^{th}$ reference signal port when $f_2(s)$ is $S-1$, the second reference signal port is a corresponding $s^{th}$ reference signal port when $f_2(s)$ is $S-2$, . . . , and the $S^{th}$ reference signal port is a corresponding $s^{th}$ reference signal port when $f_2(s)$ is 0.

The first complex coefficient is a corresponding $u_s^{th}$ complex coefficient when $f_3(u_s)$ is 0, the second complex coefficient is a corresponding $u_s^{th}$ complex coefficient when $f_3(u_s)$ is 1, . . . , and the $U^{th}$ complex coefficient is a corresponding $u_s^{th}$ complex coefficient when $f_3(u_s)$ is $U-1$. When $f_3(u_s)$ is determined in ascending order of amplitudes of complex coefficients that are in the K complex coefficients and that correspond to the $s^{th}$ reference signal port, the first complex coefficient is a corresponding $u_s^{th}$ complex coefficient when $f_3(u_s)$ is $U-1$, the second complex coefficient is a corresponding $u_s^{th}$ complex coefficient when $f_3(u_s)$ is $U-2$, . . . , and the $U^{th}$ complex coefficient is a corresponding $u_s^{th}$ complex coefficient when $f_3(u_s)$ is 0.

When the K complex coefficients are determined from the $S\times Z\times U$ complex coefficients, a priority order of the K complex coefficients may be determined based on $(f_2(s), f_3(u_s))$ corresponding to an identifier $(s, u_s)$ of each complex coefficient and a priority order of the $S\times Z\times U$ complex coefficients.

The preset priority rule may be represented as $pri(s, u_s) = S \cdot f_3(u_s) + f_2(s)$, $s=0, 1, \ldots, S-1$, and $u_s=0, 1, \ldots, U-1$. $pri(s, u_s)$ represents a priority of a $u_s^{th}$ complex coefficient that corresponds to the $s^{th}$ reference signal port in the S reference signal ports and that is on the $s^{th}$ reference signal port. A smaller value of $pri(s, u_s)$ indicates a higher priority of the $u_s^{th}$ complex coefficient that corresponds to the $s^{th}$ reference signal port in the S reference signal ports and that is on the $s^{th}$ reference signal port. $f_2(s)$ represents an index value of the $s^{th}$ reference signal port determined based on the K complex coefficients, and $f_2(s) \in \{0, 1, \ldots, S-1\}$. $f_3(u_s)$ represents an index value of the $u_s^{th}$ complex coefficient that is determined based on a complex coefficient that is in the K complex coefficients and that corresponds to the $s^{th}$ reference signal port, and $f_3(u_s) \in \{0, 1, \ldots, U-1\}$.

It may be understood that, in this case, each complex coefficient in the K complex coefficients may be identified by $(s,u_s)$, complex coefficients identified by same $(s,u_s)$ have a same priority, and complex coefficients identified by different $(s,u_s)$ have different priorities. As described above, the terminal device may obtain, at each transport layer in the Z transport layers, the U complex coefficients corresponding to the $s^{th}$ reference signal port. Therefore, it may be understood that the $u_s^{th}$ complex coefficient that is in the K complex coefficients and that corresponds to the $s^{th}$ reference signal port may be a $u_s^{th}$ complex coefficient at one transport layer, or may be $u_s^{th}$ complex coefficients at a plurality of transport layers. If the $u_s^{th}$ complex coefficient that is in the K complex coefficients and that corresponds to the $s^{th}$ reference signal port is $u_s^{th}$ complex coefficients at a plurality of transport layers, the $u_s^{th}$ complex coefficients at the plurality of transport layers have a same identifier $(s,u_s)$ and have a same priority.

A specific form of $f_2(s)$ is not limited in embodiments of this application. For details, refer to the description of $f_2(s)$ in the foregoing Example 2. For brevity, details are not described herein again.

However, it should be understood that, in this implementation, when $f_2(s)$ is a monotonically increasing function related to s, the priority of the $u^{th}$ complex coefficient corresponding to the $s^{th}$ reference signal port is higher than a priority of a $u^{th}$ complex coefficient corresponding to an $(s+1)^{th}$ reference signal port. When $f_2(s)$ is a monotonically decreasing function related to s, the priority of the $u^{th}$ complex coefficient corresponding to the $s^{th}$ reference signal port is lower than a priority of a $u^{th}$ complex coefficient corresponding to an $(s+1)^{th}$ reference signal port. A $u^{th}$ complex coefficient corresponding to the $s^{th}$ reference signal port is a complex coefficient whose index value is u on the $s^{th}$ reference signal port, a $u^{th}$ complex coefficient corresponding to the $(s+1)^{th}$ reference signal port is a complex coefficient whose index value is u on the $(s+1)^{th}$ reference signal port, and $u=0, 1, \ldots, U-1$.

When $f_2(s)$ is determined in descending order of amplitudes of the K complex coefficients, the priority of the $u^{th}$ complex coefficient corresponding to the $s'^{th}$ reference signal port is higher than a priority of a $u^{th}$ complex coefficient corresponding to an $(s'+1)^{th}$ reference signal port. When $f_2(s)$ is determined in ascending order of amplitudes of the K complex coefficients, the priority of the $u^{th}$ complex coefficient corresponding to the $s'^{th}$ reference signal port is lower than a priority of a $u^{th}$ complex coefficient corresponding to an $(s'+1)^{th}$ reference signal port. A $u^{th}$ complex coefficient corresponding to the $s'^{th}$ reference signal port is a complex coefficient whose index value is u on the $s'^{th}$ reference signal port, the $s'^{th}$ reference signal port is a reference signal port whose index value is $s'$, a $u^{th}$ complex coefficient corresponding to the $(s'+1)^{th}$ reference signal port is a complex coefficient whose index value is u on the $(s'+1)^{th}$ reference signal port, and the $(s'+1)^{th}$ reference signal port is a reference signal port whose index value is $s+1$, where $s'=0, 1, \ldots, S-1$.

A specific form of $f_3(u_s)$ is not limited in embodiments of this application. For details, refer to the description of $f_3(u_s)$ in the foregoing. For brevity, details are not described herein again.

A meaning of the foregoing priority rule is that priorities of $S \times Z \times U$ complex coefficients of the S reference signal ports at the Z transport layers descend in the following order: the first complex coefficient corresponding to the first reference signal port at each transport layer, the first complex coefficient corresponding to the second reference signal port at each transport layer, . . . , the first complex coefficient corresponding to the $S^{th}$ reference signal port at each transport layer; the second complex coefficient corresponding to the first reference signal port at each transport layer, . . . , the second complex coefficient corresponding to the $S^{th}$ reference signal port at each transport layer; . . . ; the $U^{th}$ complex coefficient corresponding to the first reference signal port at each transport layer, . . . , the $U^{th}$ complex coefficient corresponding to the $S^{th}$ reference signal port at each transport layer.

The first reference signal port is a corresponding $s^{th}$ reference signal port when $f_2(s)$ is 0, the second reference signal port is a corresponding $s^{th}$ reference signal port when $f_2(s)$ is 1, . . . , and the $S^{th}$ reference signal port is a corresponding $s^{th}$ reference signal port when $f_2(s)$ is $S-1$. When $f_2(s)$ is determined in ascending order of amplitudes of the K complex coefficients, the first reference signal port is a corresponding $s^{th}$ reference signal port when $f_2(s)$ is $S-1$, the second reference signal port is a corresponding $s^{th}$ reference signal port when $f_2(s)$ is $S-2$, . . . , and the $S^{th}$ reference signal port is a corresponding $s^{th}$ reference signal port when $f_2(s)$ is 0.

The first complex coefficient is a corresponding $u_s^{th}$ complex coefficient when $f_3(u_s)$ is 0, the second complex coefficient is a corresponding $u_s^{th}$ complex coefficient when $f_3(u_s)$ is 1, . . . , and the $U^{th}$ complex coefficient is a corresponding $u_s^{th}$ complex coefficient when 3 is $U-1$. When $f_3(u_s)$ is determined in ascending order of amplitudes of complex coefficients that are in the K complex coefficients and that correspond to the $s^{th}$ reference signal port, the first complex coefficient is a corresponding $u_s^{th}$ complex coefficient when $f_3(u_s)$ is $U-1$, the second complex coefficient is a corresponding $u_s^{th}$ complex coefficient when $f_3(u_s)$ is $U-2$, . . . , and the $U^{th}$ complex coefficient is a corresponding $u_s^{th}$ complex coefficient when $f_3(u_s)$ is 0.

When the K complex coefficients are determined from the $S \times Z \times U$ complex coefficients, a priority order of the K complex coefficients may be determined based on $(f_2(s) f_3(u_s))$ corresponding to an identifier $(s,u_s)$ of each complex coefficient and a priority order of the $S \times Z \times U$ complex coefficients.

Example 6: The preset priority rule may be related to the following three items: a quantity Z of transport layers, an index value of a reference signal port corresponding to each complex coefficient in the K complex coefficients, and an index value of each complex coefficient in the K complex coefficients for a corresponding reference signal port.

As described above, the K complex coefficients may be determined from the U complex coefficients corresponding to each reference signal port in the S reference signal ports. In this case, the preset priority rule may be related to the following three items: a quantity Z of transport layers, an index value of a reference signal port corresponding to each complex coefficient in the K complex coefficients in the S reference signal ports, and an index value of each complex coefficient in the K complex coefficients in U complex coefficients corresponding to a corresponding reference signal port.

The preset priority rule may be represented as $pri(z,s_z,u_{s,z})=Z \cdot U \cdot f_5(s_z)+Z \cdot f_6(u_{s,z})+z$, $s_z=0, 1, \ldots, S-1$, $u=0, 1, \ldots, U-1$, and $z=1, 2, \ldots, Z$. $pri(z,s_z,u_{s,z})$ represents a priority of a $u_{s,z}^{th}$ complex coefficient corresponding to an $s_z^{th}$ reference signal port at a $z^{th}$ transport layer. A smaller value of $pri(z,s_z,u_{s,z})$ indicates a higher priority of the $u_{s,z}^{th}$ complex coefficient corresponding to the $s_z^{th}$ reference signal port at the $Z^{th}$ transport layer. $f_5(s_z)$ represents an index value of the $s_z^{th}$ reference signal port at the $z^{th}$ transport layer that is determined based on $K_z$ complex coefficients, $f_5(s_z) \in \{0, 1, \ldots, S-1\}$, $K_z$ represents a quantity of complex coefficients at the $z^{th}$ transport layer, and $\Sigma_{z=1}^{Z} K_z = K$. $f_6(u_{s,z})$ represents an index value of the $u_{s,z}^{th}$ complex coefficient that is determined based on a complex coefficient that is in the $K_z$ complex coefficients and that corresponds to the $s_z^{th}$ reference signal port at the $z^{th}$ transport layer, and $f_6(u_{s,z}) \in \{0, 1, \ldots, U-1\}$. It may be understood that, in this case, each complex coefficient in the K complex coefficients may be identified by $(z,s_z,u_{s,z})$, complex coefficients identified by same $(z,s_z,u_{s,z})$ have a same priority, and complex coefficients identified by different $(z,s_z,u_{s,z})$ have different priorities.

A specific form of $f_5(s_z)$ is not limited in embodiments of this application. For details, refer to the description of $f_5(s_z)$ in the foregoing Example 4. For brevity, details are not described herein again.

A specific form of $f_6(u_{s,z})$ is not limited in embodiments of this application.

For example, $f_6(u_{s,z})$ may be a monotonically increasing function related to $u_{s,z}$. For example, $f_6(u_{s,z})=u_{s,z}$. In this case, on the $s_z^{th}$ reference signal port at the $z^{th}$ transport layer, Smaller $u_{s,z}$ indicates a higher priority of a corresponding $u_{s,z}^{th}$ complex coefficient.

In another example, $f_6(u_{s,z})$ may be a monotonically decreasing function related to $u_{s,z}$. For example, $f_6(u_s)=U-u_{s,z}$. In this case, on the $s_z$ reference signal port at the $z^{th}$ transport layer, larger $u_{s,z}$ indicates a higher priority of a corresponding $u_{s,z}^{th}$ complex coefficient.

In still another example, $f_6(u_{s,z})$ may be determined in descending order of amplitudes of complex coefficients that are in the $K_z$ complex coefficients and that correspond to $s_z$ reference signal ports at the $z^{th}$ transport layer. In this case, on the $s_z^{th}$ reference signal port at the $z^{th}$ transport layer, smaller $f_6(u_{s,z})$ indicates a higher priority of a corresponding $u_{s,z}^{th}$ complex coefficient.

In yet another example, $f_6(u_{s,z})$ may be determined in ascending order of amplitudes of complex coefficients that are in the $K_z$ complex coefficients and that correspond to $s_z$ reference signal ports at the $z^{th}$ transport layer. In this case, on the $s_z^{th}$ reference signal port at the $z^{th}$ transport layer, larger $f_6(u_{s,z})$ indicates a higher priority of a corresponding $u_{s,z}^{th}$ complex coefficient.

It should be understood that, when $f_6(u_{s,z})$ is related to an amplitude order of the complex coefficients corresponding to the $s_z^{th}$ reference signal port at the $z^{th}$ transport layer, the method may further include: The terminal device sends indication information #15, where the indication information #15 indicates a mapping relationship between a sequence number $u_{s,z}$ of a complex coefficient on each reference signal port at each transport layer and an index value $f_6(u_{s,z})$. Correspondingly, the network device receives the indication information #15. The indication information #15 and the first indication information may be carried in same signaling, or may be carried in different signaling. This is not limited in this application.

A meaning of the foregoing priority rule is that priorities of S×Z×U complex coefficients of the S reference signal ports at the Z transport layers descend in the following order: the first complex coefficients corresponding to the first reference signal ports at the first transport layer to the $Z^{th}$ transport layer are arranged in sequence; the second complex coefficients corresponding to the first reference signal ports at the first transport layer to the $Z^{th}$ transport layer are arranged in sequence, . . . , the $U^{th}$ complex coefficients corresponding to the first reference signal ports at the first transport layer to the $Z^{th}$ transport layer are arranged in sequence; the first complex coefficients corresponding to the second reference signal ports at the first transport layer to the $Z^{th}$ transport layer are arranged in sequence, . . . , the $U^{th}$ complex coefficients corresponding to the second reference signal ports at the first transport layer to the $Z^{th}$ transport layer are arranged in sequence; . . . ; the first complex coefficients corresponding to the $S^{th}$ reference signal ports at the first transport layer to the $Z^{th}$ transport layer are arranged in sequence, . . . , the $U^{th}$ complex coefficients corresponding to the $S^{th}$ reference signal ports at the first transport layer to the $Z^{th}$ transport layer are arranged in sequence.

The first reference signal port at the $z^{th}$ transport layer is a corresponding $s_z^{th}$ reference signal port when $f_5(s_z)$ is 0, the second reference signal port at the $z^{th}$ transport layer is a corresponding $s_z^{th}$ reference signal port when $f_5(s_z)$ is 1, . . . , and the $S^{th}$ reference signal port at the $z^{th}$ transport layer is a corresponding $s_z^{th}$ reference signal port when $f_5(s_z)$ is S−1. When $f_5(s_z)$ is determined in ascending order of amplitudes of the $K_z$ complex coefficients, the first reference signal port at the $z^{th}$ transport layer is a corresponding $s_z^{th}$ reference signal port when $f_5(s_z)$ is S−1, the second reference signal port at the $z^{th}$ transport layer is a corresponding $s_z^{th}$ reference signal port when $f_5(s_z)$ is S−2, . . . , and the S' reference signal port at the $z^{th}$ transport layer is a corresponding $s_z^{th}$ reference signal port when $f_5(s_z)$ is 0.

The first complex coefficient corresponding to the $s_z^{th}$ reference signal port at the $z^{th}$ transport layer is a corresponding $u_{s,z}^{th}$ complex coefficient when 6 is 0, the second complex coefficient corresponding to the $s_z^{th}$ reference signal port at the $z^{th}$ transport layer is a corresponding $u_{s,z}^{th}$ complex coefficient when 6 is 1, . . . , and the $U^{th}$ complex coefficient corresponding to the $s_z^{th}$ reference signal port at the $z^{th}$ transport layer is a corresponding $u_{s,z}^{th}$ complex coefficient when $f_6(u_{s,z})$ is U−1. When $f_6(u_{s,z})$ is determined in ascending order of amplitudes of complex coefficients corresponding to the $s_z^{th}$ reference signal port at the $z^{th}$ transport layer, the first complex coefficient corresponding to the $s_z^{th}$ reference signal port at the $z^{th}$ transport layer is a corresponding $u_{s,z}^{th}$ complex coefficient when $f_6(u_{s,z})$ is U−1, the second complex coefficient corresponding to the $s_z^{th}$ reference signal port at the $z^{th}$ transport layer is a corresponding $u_{s,z}^{th}$ complex coefficient when $f_6(u_{s,z})$ is U−2, . . . , and the $U^{th}$ complex coefficient corresponding to the $s_z^{th}$ reference signal port at the $z^{th}$ transport layer is a corresponding $u_{s,z}^{th}$ complex coefficient when $f_6(u_{s,z})$ is 0.

When the K complex coefficients are determined from the S×Z×U complex coefficients, a priority order of the K complex coefficients may be determined based on $(z,s_z,u_{s,z})$ corresponding to an identifier $(z, f_5(s_z), f_6(u_{s,z}))$ of each complex coefficient and a priority order of the S×Z×U complex coefficients.

The preset priority rule may be represented as $pri(z,s_z,u_{s,z})=Z \cdot S \cdot f_6(u_{s,z})+Z \cdot f_5(s_z)+z$, $s_z=0, 1, \ldots, S-1$, $u_{s,z}=0, 1, \ldots, U-1$, and $z=1, 2, \ldots, Z$. $pri(z,s_z,u_{s,z})$ represents a priority of a $u_{s_z}{}^{th}$ complex coefficient corresponding to an $s_z{}^{th}$ reference signal port at a $z^{th}$ transport layer. A smaller value of $pri(z,s_z,u_{s_z})$ indicates a higher priority of the $u_{s_z}{}^{th}$ complex coefficient corresponding to the $s_z{}^{th}$ reference signal port at the $z^{th}$ transport layer. $f_5(s_z)$ represents an index value of the $s_z{}^{th}$ reference signal port at the $z^{th}$ transport layer that is determined based on $K_z$ complex coefficients, $f_5(s_z) \in \{0, 1, \ldots, S-1\}$, $K_z$ represents a quantity of complex coefficients at the $z^{th}$ transport layer, and $\Sigma_{z=1}^{Z} K_z + K$. $f_6(u_{s_z})$ is an index value of the $u_{s_z}{}^{th}$ complex coefficient that is determined based on a complex coefficient that is in the $K_z$ complex coefficients and that corresponds to the $s_z{}^{th}$ reference signal port at the $z^{th}$ transport layer, and $f_6(u_{s_z}) \in \{0, 1, \ldots, U-1\}$. It may be understood that, in this case, each complex coefficient in the K complex coefficients may be identified by $(z,s_z,u_{s_z})$, complex coefficients identified by same $(z,s_z,u_{s_z})$ have a same priority, and complex coefficients identified by different $(z,s_z,u_{s_z})$ have different priorities.

A specific form of $f_5(s_z)$ is not limited in embodiments of this application. For details, refer to the description of $f_5(s_z)$ in the foregoing Example 4. For brevity, details are not described herein again.

However, it should be understood that, in this implementation, when $f_5(s_z)$ is a monotonically increasing function related to $s_z$, at the $z^{th}$ transport layer, the priority of the $u^{th}$ complex coefficient corresponding to the $s_z{}^{th}$ reference signal port is higher than a priority of a $u^{th}$ complex coefficient corresponding to an $(s_z+1)^{th}$ reference signal port. When $f_5(s_z)$ is a monotonically decreasing function related to $s_z$, at the $z^{th}$ transport layer, the priority of the $u^{th}$ complex coefficient corresponding to the $s_z{}^{th}$ reference signal port is lower than a priority of a $u^{th}$ complex coefficient corresponding to an $(s_z+1)^{th}$ reference signal port. At the $z^{th}$ transport layer, a $u^{th}$ complex coefficient corresponding to the $s_z{}^{th}$ reference signal port is a complex coefficient whose index value is u on the $s_z$ reference signal port, and a $u^{th}$ complex coefficient corresponding to the $(s_z+1)^{th}$ reference signal port is a complex coefficient whose index value is u on the $(s_z+1)^{th}$ reference signal port, and $u=0, 1, \ldots, U-1$.

When $f_5(s_z)$ is determined in descending order of amplitudes of the $K_z$ complex coefficients, at the $z^{th}$ transport layer, the priority of the $u^{th}$ complex coefficient corresponding to the $s^{th}$ reference signal port is higher than a priority of a $u^{th}$ complex coefficient corresponding to an $(s+1)^{th}$ reference signal port. When $f_5(s_z)$ is determined in ascending order of amplitudes of the $K_z$ complex coefficients, the priority of the $u^{th}$ complex coefficient corresponding to the $s^{th}$ reference signal port is lower than a priority of a $u^{th}$ complex coefficient corresponding to an $(S+1)^{th}$ reference signal port. At the $z^{th}$ transport layer, a $u^{th}$ complex coefficient corresponding to the $s^{th}$ reference signal port is a complex coefficient whose index value is u on the $s^{th}$ reference signal port, the $s^{th}$ reference signal port is a reference signal port whose index value is s, a $u^{th}$ complex coefficient corresponding to the $(s+1)^{th}$ reference signal port is a complex coefficient whose index value is u on the $(s+1)^{th}$ reference signal port, and the $(s+1)^{th}$ reference signal port is a reference signal port whose index value is s+1, where s=0, 1, ..., S-1.

A specific form of $f_6(u_{s_z})$ is not limited in embodiments of this application. For details, refer to the description of $f_6(u_{s_z})$ in the foregoing. For brevity, details are not described herein again.

A meaning of the foregoing priority rule is that priorities of S×Z×U complex coefficients of the S reference signal ports at the Z transport layers descend in the following order: the first complex coefficients corresponding to the first reference signal ports at the first transport layer to the $Z^{th}$ transport layer are arranged in sequence, the first complex coefficients corresponding to the second reference signal ports at the first transport layer to the $Z^{th}$ transport layer are arranged in sequence, . . . , the first complex coefficients corresponding to the $S^{th}$ reference signal ports at the first transport layer to the $Z^{th}$ transport layer are arranged in sequence; the second complex coefficients corresponding to the first reference signal ports at the first transport layer to the $Z^{th}$ transport layer are arranged in sequence, . . . , the second complex coefficients corresponding to the $S^{th}$ reference signal ports at the first transport layer to the $Z^{th}$ transport layer are arranged in sequence; . . . ; the $U^{th}$ complex coefficients corresponding to the first reference signal ports at the first transport layer to the $Z^{th}$ transport layer are arranged in sequence, . . . , the $U^{th}$ complex coefficients corresponding to the $S^{th}$ reference signal ports at the first transport layer to the $Z^{th}$ transport layer are arranged in sequence.

The first reference signal port at the $z^{th}$ transport layer is a corresponding $s_z{}^{th}$ reference signal port when $f_5(s_z)$ is 0, the second reference signal port at the $z^{th}$ transport layer is a corresponding $s_z{}^{th}$ reference signal port when $f_5(s_z)$ is 1, . . . , and the $S^{th}$ reference signal port at the $z^{th}$ transport layer is a corresponding $s_z{}^{th}$ reference signal port when $f_5(s_z)$ is S−1. When $f_5(s_z)$ is determined in ascending order of amplitudes of the $K_z$ complex coefficients, the first reference signal port at the $z^{th}$ transport layer is a corresponding $s_z{}^{th}$ reference signal port when $f_5(s_z)$ is S−1, the second reference signal port at the $z^{th}$ transport layer is a corresponding $s_z{}^{th}$ reference signal port when $f_5(s_z)$ is S−2, . . . , and the $S^{th}$ reference signal port at the $z^{th}$ transport layer is a corresponding $s_z{}^{th}$ reference signal port when $f_5(s_z)$ is 0.

The first complex coefficient corresponding to the $s_z{}^{th}$ reference signal port at the $z^{th}$ transport layer is a corresponding $u_{s_z}{}^{th}$ complex coefficient when $f_6(u_{s_z})$ is 0, the second complex coefficient corresponding to the $s_z{}^{th}$ reference signal port at the $z^{th}$ transport layer is a corresponding $u_{s_z}{}^{th}$ complex coefficient when $f_6(u_{s_z})$ is 1, . . . , and the $U^{th}$ complex coefficient corresponding to the $s_z{}^{th}$ reference signal port at the $z^{th}$ transport layer is a corresponding $u_{s_z}{}^{th}$ complex coefficient when $f_6(u_{s_z})$ is U−1. When $f_6(u_{s_z})$ is determined in ascending order of amplitudes of complex coefficients corresponding to the $s_z{}^{th}$ reference signal port at the $z^{th}$ transport layer, the first complex coefficient corresponding to the $s_z{}^{th}$ reference signal port at the $z^{th}$ transport layer is a corresponding $u_{s_z}{}^{th}$ complex coefficient when $f_6(u_{s_z})$ is U−1, the second complex coefficient corresponding to the $s_z{}^{th}$ reference signal port at the $z^{th}$ transport layer is a corresponding $u_{s_z}{}^{th}$ complex coefficient when $f_6(u_{s_z})$ is U−2, . . . , and the $U^{th}$ complex coefficient corresponding to the $s_z{}^{th}$ reference signal port at the $z^{th}$ transport layer is a corresponding $u_{s_z}{}^{th}$ complex coefficient when $f_6(u_{s_z})$ is 0.

When the K complex coefficients are determined from the S×Z×U complex coefficients, a priority order of the K complex coefficients may be determined based on $(z,s_z,u_{s_z})$ corresponding to an identifier $(z, f_5(s_z), f_6(u_{s_z}))$ of each complex coefficient and a priority order of the S×Z×U complex coefficients.

In a third possible implementation, when the quantity of the angle-delay pairs corresponding to one reference signal port is $T_p$, the quantity of the complex coefficients that are obtained by the terminal device and that correspond to the reference signal port is T. $T_p$ is a positive integer.

As described above, the network device may load one angle vector to one reference signal port, and separately load Q angle vectors included in the X angle-delay pairs different from each other to the P reference signal ports. It may be understood that, when X is less than Q, one or more delay vectors may correspond to one angle vector in the X angle vectors. Therefore, one or more angle-delay pairs may correspond to one reference signal port in the P reference signal ports. Correspondingly, for one reference signal port, the terminal device may obtain one or more complex coefficients corresponding to the reference signal port.

For example, in FIG. 13, a quantity of angle vectors that are included in the six angle-delay pairs and that are different from each other is 4. If the network device loads the first angle vector to the port 1, and indicates, to the terminal device, two delay vectors corresponding to the first angle vector, the terminal device may obtain, through calculation, two complex coefficients corresponding to the port 1, and the two complex coefficients respectively correspond to the two angle-delay pairs. Similarly, if the network device loads the second angle vector to the port 2, and indicates, to the terminal device, one delay vector corresponding to the second angle vector, the terminal device may obtain, through calculation, one complex coefficient corresponding to the port 2. If the network device loads the third angle vector to the port 3, and indicates, to the terminal device, one delay vector corresponding to the third angle vector, the terminal device may obtain, through calculation, one complex coefficient corresponding to the port 3. If the network device loads the fourth angle vector to the port 4, and indicates, to the terminal device, two delay vectors corresponding to the fourth angle vector, the terminal device may obtain, through calculation, two complex coefficients corresponding to the port 4.

It should be understood that, in this implementation, when there are a plurality of transport layers, the terminal device may obtain, at each transport layer, one or more complex coefficients corresponding to one reference signal port. Therefore, in this implementation, when the quantity of transport layers is Z and the quantity of angle-delay pairs obtained by the network device based on the uplink and downlink channel reciprocity is Q, the complex coefficient set described above may include Q×Z complex coefficients. Further, the terminal device may determine the K complex coefficients from the Q×Z complex coefficients included in the complex coefficient set.

When determining the K complex coefficients from the Q×Z complex coefficients, the terminal device needs to predetermine a value of K. The value of K may be predefined in a protocol, or may be indicated by the network device to the terminal device. When the network device indicates the value of K to the terminal device, the method may further include: The network device sends indication information #3, where the indication information #3 indicates the value of K. Correspondingly, the terminal device receives the indication information #3.

After the terminal device determines the K complex coefficients, if an uplink resource allocated by the terminal device is sufficient for reporting the K complex coefficients, the terminal device may report all the K complex coefficients to the network device. That is, the terminal device may generate first indication information, where the first indication information indicates the B complex coefficients, and B=K.

If the uplink resource allocated to the terminal device is insufficient for reporting the K complex coefficients, the terminal device may determine the B complex coefficients from the K complex coefficients according to a preset priority rule, and report the B complex coefficients to the terminal device. That is, the terminal device may generate first indication information, where the first indication information indicates the B complex coefficients. B<K.

The preset priority rule is not limited in embodiments of this application.

In an example, the preset priority rule may be related to an index value of each complex coefficient in the K complex coefficients.

For the preset priority rule in this example, refer to the descriptions in the first possible implementation. For brevity, details are not described herein again.

In still another example, the preset priority rule may be related to the following two items: a quantity Z of transport layers and an index value of each complex coefficient in the K complex coefficients.

For the preset priority rule in this example, refer to the descriptions in the first possible implementation. For brevity, details are not described herein again.

It should be understood that the foregoing enumerated representation forms of the preset priority rule are merely examples, and should not constitute any limitation on this application. Based on a same concept, a person skilled in the art may further figure out more other possible representation forms. In other words, a preset priority rules that is related to at least one of the following falls within the protection scope of this application: an index value of each complex coefficient in the K complex coefficients, an index value of a reference signal port corresponding to each complex coefficient in the K complex coefficients in the S reference signal ports, or an index value of each complex coefficient in the K complex coefficients in the U complex coefficients corresponding to the corresponding reference signal port.

After the terminal device determines the B complex coefficients from the K complex coefficients according to the preset priority rule, the terminal device sends the first indication information to the network device.

S440: The terminal device sends the first indication information. Correspondingly, in S440, the network device receives the first indication information.

The first indication information may be, for example, channel state information (CSI), or may be some information elements in the CSI, for example, may be a bitmap in the CSI. The first indication information may alternatively be other information. For example, the first indication information is a precoding matrix indicator (PMI). This is not limited in this application. The first indication information may be carried in one or more messages in the conventional technology and sent by the terminal device to the network device, or may be carried in one or more newly designed messages and sent by the terminal device to the network device. For example, the terminal device may send the first indication information to the network device by using a physical uplink resource such as a physical uplink shared channel (PUSCH) or a physical uplink control channel (PUCCH), so that the network device determines the precoding matrix based on the first indication information.

A specific method used by the terminal device to send the first indication information to the network device by using the physical uplink resource may be the same as that in the current technology. For brevity, detailed descriptions of a specific sending process are omitted herein.

S450: The network device determines the B complex coefficients based on the first indication information.

The network device may determine, based on the received first indication information, the B complex coefficients and the angle-delay pairs corresponding to the B complex coefficients, and further determine the precoding matrix with reference to the B complex coefficients and the angle-delay pairs corresponding to the B complex coefficients.

Based on the foregoing technical solution, if reporting resources of a terminal device are limited, the terminal device may report, according to the foregoing preset priority rule, a calculated complex coefficient. Compared with a method for determining a priority of a reporting amount of CSI part 2 in a known technology, when the network device loads, to a downlink reference signal port, an angle-delay pair or an angle vector included in the angle-delay pair that is obtained based on uplink and downlink channel reciprocity, there is no calculation redundancy when a complex coefficient is reported according to the preset priority rule, thereby reducing complexity of the terminal device.

It should be understood that, in the foregoing embodiments, the terminal device and/or the network device may perform some or all of the operations in the embodiments. These operations or operations are merely examples. Other operations or variations of various operations may further be performed in embodiments of this application. In addition, the operations may be performed in a sequence different from a sequence presented in embodiments, and not all operations in embodiments of this application need to be performed. In addition, sequence numbers of the operations do not mean an execution sequence. An execution sequence of the processes should be determined based on functions and internal logic of the processes, and should not constitute any limitation on the implementation processes of embodiments of this application.

The channel measurement method provided in embodiments of this application is described above in detail, with reference to FIG. 4 to FIG. 13. A communication apparatus provided in embodiments of this application is described below in detail with reference to FIG. 14 to FIG. 17.

Figure 14:
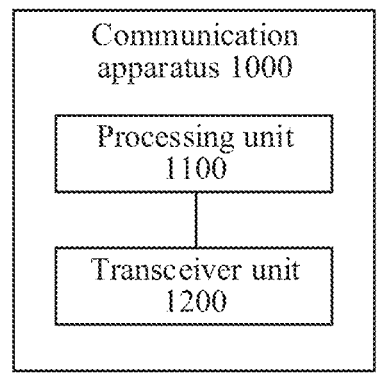
FIG. 14 and FIG. 15 are schematic block diagrams of a communication apparatus according to an embodiment of this application.

FIG. 14 is a schematic block diagram of a communication apparatus according to an embodiment of this application. As shown in FIG. 14, a communication apparatus 1000 may include a processing unit 1100 and a transceiver unit 1200.

Optionally, the communication apparatus 1000 may correspond to the terminal device in the foregoing method embodiments, for example, may be the terminal device, or a component (such as a circuit, a chip, or a chip system) disposed in the terminal device.

It should be understood that the communication apparatus 1000 may correspond to the terminal device in the method 400 according to embodiments of this application. The communication apparatus 1000 may include units configured to perform the method performed by the terminal device in the method 400 in FIG. 4. In addition, the units in the communication apparatus 1000 and the foregoing other operations and/or functions are separately used to implement corresponding procedures of the method 400 in FIG. 4.

When the communication apparatus 1000 is configured to perform the method 400 in FIG. 4, the processing unit 1100 may be configured to perform S430 in the method 400, and the transceiver unit 1200 may be configured to perform S420 and S440 in the method 400. It should be understood that a specific process in which the units perform the foregoing corresponding operations is described in detail in the foregoing method embodiments, and for brevity, details are not described herein.

Figure 15:
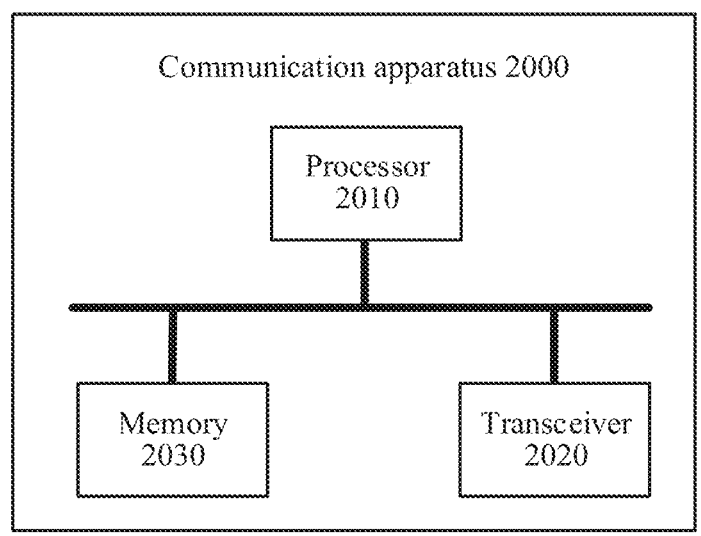
Figure 16:
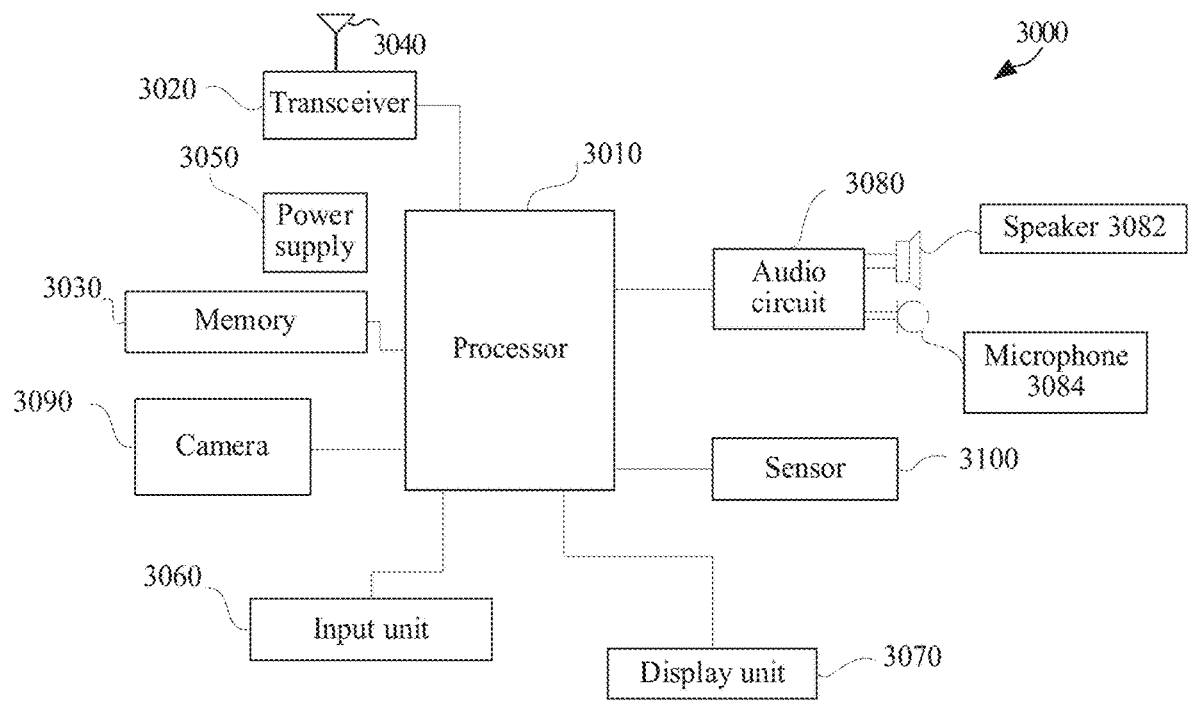
FIG. 16 is a schematic diagram of a structure of a terminal device according to an embodiment of this application.

It should be further understood that when the communication apparatus 1000 is a terminal device, the transceiver unit 1200 in the communication apparatus 1000 may be implemented by using a transceiver, for example, may correspond to a transceiver 2020 in the communication apparatus 2000 shown in FIG. 15 or the transceiver 3020 in the terminal device 3000 shown in FIG. 16. The processing unit 1100 in the communication apparatus 1000 may be implemented by using at least one processor, for example, the processor may correspond to the processor 2010 in the communication apparatus 2000 shown in FIG. 15 or the processor 3010 in the terminal device 3000 shown in FIG. 16.

It should be further understood that when the communication apparatus 1000 is the chip or the chip system disposed in the terminal device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

Optionally, the communication apparatus 1000 may correspond to the network device in the foregoing method embodiments, for example, may be the network device, or may be a component (for example, a circuit, a chip, or a chip system) disposed in the network device.

It should be understood that the communication apparatus 1000 may correspond to the network device in the method 400 according to embodiments of this application, and the communication apparatus 1000 may include a unit configured to perform the method performed by the network device in the method 400 in FIG. 4. In addition, the units in the communication apparatus 1000 and the foregoing other operations and/or functions are separately used to implement corresponding procedures of the method 400 in FIG. 4.

When the communication apparatus 1000 is configured to perform the method 400 in FIG. 4, the processing unit 1100 may be configured to perform S410 and S450 in the method 400, and the transceiver unit 1200 may be configured to perform S420 and S440 in the method 400. It should be understood that a specific process in which the units perform the foregoing corresponding operations is described in detail in the foregoing method embodiments, and for brevity, details are not described herein.

Figure 17:
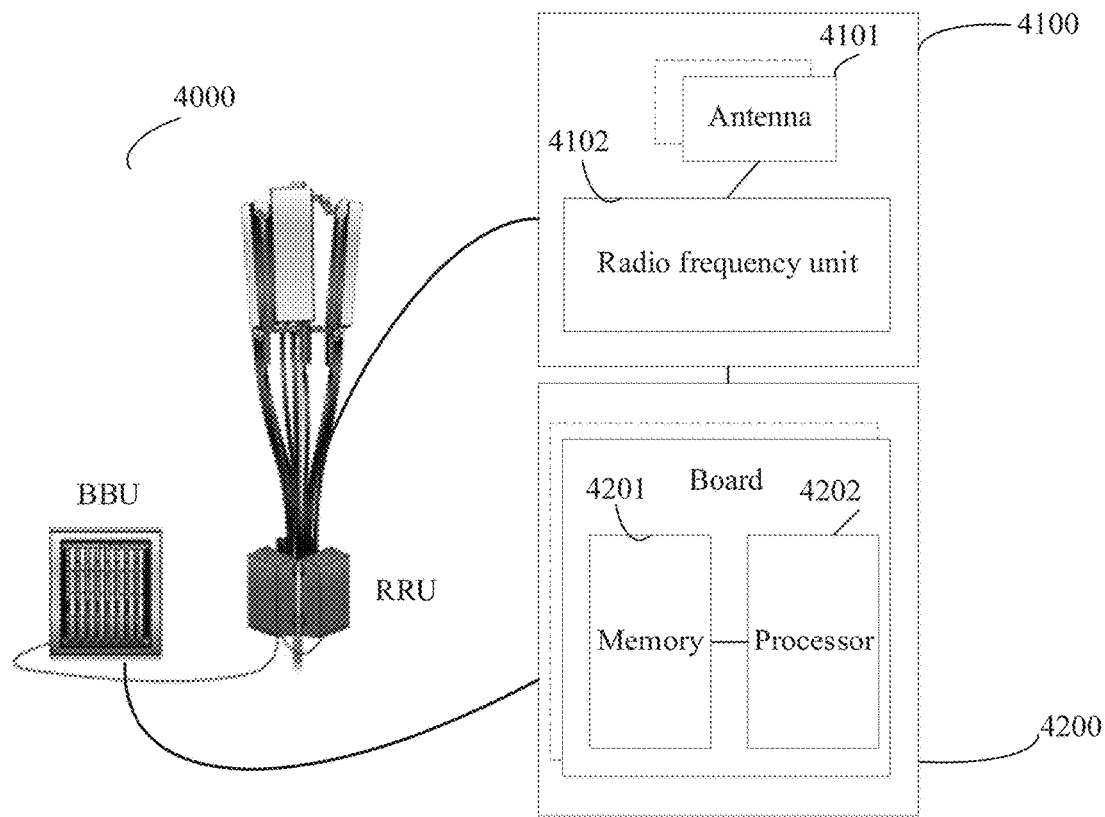
FIG. 17 is a schematic diagram of a structure of a network device according to an embodiment of this application.

It should be further understood that when the communication apparatus 1000 is a network device, the transceiver unit 1200 in the communication apparatus 1000 may be implemented by using a transceiver, for example, may correspond to the transceiver 2020 in the communication apparatus 2000 shown in FIG. 15 or the RRU 4100 in the network device 4000 shown in FIG. 17. The processing unit 1100 in the communication apparatus 1000 may be implemented by using at least one processor, for example, the processor may correspond to the processor 2010 in the communication apparatus 2000 shown in FIG. 15 or the processing unit 4200 or the processor 4202 in the network device 4000 shown in FIG. 17.

It should be further understood that when the communication apparatus 1000 is the chip or the chip system disposed in the network device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

FIG. 15 is another schematic block diagram of the communication apparatus 2000 according to an embodiment of this application. As shown in FIG. 15, the communication apparatus 2000 includes the processor 2010, the transceiver 2020, and a memory 2030. The processor 2010, the transceiver 2020, and the memory 2030 communicate with each other by using an internal connection path. The memory 2030 is configured to store instructions. The processor 2010 is configured to execute the instructions stored in the memory 2030, to control the transceiver 2020 to send a signal and/or receive a signal.

It should be understood that the communication apparatus 2000 may correspond to the terminal device in the foregoing method embodiments, and may be configured to perform operations and/or procedures performed by the network device or the terminal device in the foregoing method embodiments. Optionally, the memory 2030 may include a read-only memory and a random access memory, and provide instructions and data to the processor. A part of the memory may further include a non-volatile random access memory. The memory 2030 may be an independent component, or may be integrated into the processor 2010. The processor 2010 may be configured to execute the instructions stored in the memory 2030. In addition, when the processor 2010 executes the instructions stored in the memory, the processor 2010 is configured to perform operations and/or procedures corresponding to the network device or the terminal device in the foregoing method embodiments.

Optionally, the communication apparatus 2000 is the terminal device in the foregoing embodiments.

Optionally, the communication apparatus 2000 is the network device in the foregoing embodiments.

The transceiver 2020 may include a transmitter and a receiver. The transceiver 2020 may further include an antenna. There may be one or more antennas. The processor 2010, the memory 2030, and the transceiver 2020 may be components integrated into different chips. For example, the processor 2010 and the memory 2030 may be integrated into a baseband chip, and the transceiver 2020 may be integrated into a radio frequency chip. Alternatively, the processor 2010, the memory 2030, and the transceiver 2020 may be components integrated into a same chip. This is not limited in this application.

Optionally, the communication apparatus 2000 is a component disposed in the terminal device, for example, a circuit, a chip, or a chip system.

Optionally, the communication apparatus 2000 is a component disposed in the network device, for example, a circuit, a chip, or a chip system.

Alternatively, the transceiver 2020 may be a communication interface, for example, an input/output interface or a circuit. The transceiver 2020, the processor 2010, and the memory 2030 may be integrated into a same chip, for example, integrated into a baseband chip.

FIG. 16 is a schematic diagram of a structure of a terminal device 3000 according to an embodiment of this application. The terminal device 3000 may be used in the system shown in FIG. 1, and performs a function of the terminal device in the foregoing method embodiments. As shown in the figure, the terminal device 3000 includes the processor 3010 and the transceiver 3020. Optionally, the terminal device 3000 further includes a memory 3030. The processor 3010, the transceiver 3020, and the memory 3030 may communicate with each other by using an internal connection path, to transfer a control signal and/or a data signal. The memory 3030 is configured to store a computer program. The processor 3010 is configured to invoke the computer program from the memory 3030 and run the computer program, to control the transceiver 3020 to send and receive a signal. Optionally, the terminal device 3000 may further include an antenna 3040, configured to send, by using a radio signal, uplink data or uplink control signaling outputted by the transceiver 3020.

The processor 3010 and the memory 3030 may be integrated into one processing apparatus. The processor 3010 is configured to execute program code stored in the memory 3030, to implement the foregoing function. During specific implementation, the memory 3030 may alternatively be integrated into the processor 3010, or may be independent of the processor 3010. The processor 3010 may correspond to the processing unit 1100 in FIG. 14 or the processor 2010 in FIG. 15.

The transceiver 3020 may correspond to the transceiver unit 1200 in FIG. 14 or the transceiver 2020 in FIG. 15. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that, the terminal device 3000 shown in FIG. 16 can implement processes related to the terminal device in the method embodiment shown in FIG. 4. Operations and/or functions of the modules in the terminal device 3000 are separately intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments. The transceiver 3020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 3000 may further include a power supply 3050, configured to supply power to various components or circuits in the terminal device.

In addition, to improve functions of the terminal device, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

FIG. 17 is a schematic diagram of a structure of a network device according to an embodiment of this application, for example, may be a schematic diagram of a structure of a base station. The base station 4000 may be used in the system shown in FIG. 1, and performs a function of the network device in the foregoing method embodiments. As shown in the figure, the base station 4000 may include one or more radio frequency units such as remote radio units (RRUs) 4100 and one or more baseband units (BBUs) (which may also be referred to as distributed units (DUs)) 4200. The RRU 4100 may be referred to as a transceiver unit, and may correspond to the transceiver unit 1200 in FIG. 14 or the transceiver 2020 in FIG. 15. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 is mainly configured to: send and receive a radio frequency signal, and perform conversion between the radio frequency signal and a baseband signal. For example, the RRU 4100 is configured to send indication information to a terminal device. The BBU 4200 is mainly configured to: perform baseband processing, control the base station, and so on. The RRU 4100 and the BBU 4200 may be physically disposed together, or may be physically disposed separately, namely, a distributed base station.

The BBU 4200 is a control center of the base station, may also be referred to as a processing unit, may correspond to the processing unit 1100 in FIG. 14 or the processor 2010 in FIG. 15, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, generate the foregoing indication information.

In an example, the BBU 4200 may include one or more boards, and a plurality of boards may jointly support a radio access network (for example, an LTE network) having a single access standard, or may separately support radio access networks (for example, the LTE network, a 5G network, or another network) having different access standards. The BBU 4200 further includes a memory 4201 and the processor 4202. The memory 4201 is configured to store necessary instructions and data. The processor 4202 is configured to control the base station to perform a necessary action, for example, control the base station to perform the operation procedure related to the network device in the foregoing method embodiments. The memory 4201 and the processor 4202 may serve one or more boards. In other words, a memory and a processor may be disposed on each board. Alternatively, a plurality of boards may share a same memory and a same processor. In addition, a necessary circuit may further be disposed on each board.

It should be understood that, the base station 4000 shown in FIG. 17 can implement processes related to the network device in the method embodiment shown in FIG. 4. The operations and/or the functions of the modules in the base station 4000 are separately intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the network device and that is described in the foregoing method embodiments. The RRU 4100 may be configured to perform an action of sending to or receiving from the terminal device by the network device that is described in the foregoing method embodiments. For details, refer to the descriptions in the foregoing method embodiments. Details are not described herein again.

It should be understood that the base station 4000 shown in FIG. 17 is merely a possible form of the network device, and should not constitute any limitation on this application. The method provided in this application is applicable to a network device in another form. For example, the network device includes an AAU, and may further include a CU and/or a DU, or include a BBU and an adaptive radio unit (ARU), or a BBU; or may be customer premises equipment (CPE), or may be in another form. A specific form of the network device is not limited in this application.

The CU and/or the DU may be configured to perform an action that is implemented inside the network device and that is described in the foregoing method embodiments, and the AAU may be configured to perform an action of sending to the terminal device or receiving from the terminal device by the network device that is described in the foregoing method embodiments. For details, refer to the descriptions in the foregoing method embodiments. Details are not described herein again.

This application further provides a processing apparatus, including at least one processor, where the at least one processor is configured to execute a computer program stored in a memory, to enable the processing apparatus to perform the method performed by a terminal device or a network device in the foregoing method embodiments.

It should be understood that, the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processor (DSP) circuit, a micro controller unit (MCU), a programmable controller (PLD), or another integrated chip.

An embodiment of this application further provides a processing apparatus, including a processor and a communication interface. The communication interface is coupled to the processor. The communication interface is configured to input and/or output information. The information includes at least one of instructions and data. The processor is configured to execute a computer program, to enable the processing apparatus to perform the method performed by a terminal device or a network device in the foregoing method embodiments.

An embodiment of this application further provides a processing apparatus, including a processor and a memory. The memory is configured to store a computer program, and the processor is configured to invoke the computer program from the memory and run the computer program, to enable the processing apparatus to perform the method performed by a terminal device or a network device in the foregoing method embodiments.

In an implementation process, operations in the foregoing methods can be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again.

It should be noted that, the processor in embodiments of this application may be an integrated circuit chip, and has a signal processing capability. In an implementation process, operations in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method performed by the terminal device or the method performed by the network device in the embodiment shown in FIG. 4.

According to the method provided in embodiments of this application, this application further provides a computer-readable storage medium. The computer-readable storage medium stores program code. When the program code is run on a computer, the computer is enabled to perform the method performed by the terminal device or the method performed by the network device in the embodiment shown in FIG. 4.

According to the method provided in embodiments of this application, this application further provides a system. The system includes the foregoing one or more terminal devices and the foregoing one or more network devices.

The network device and the terminal device in the foregoing apparatus embodiments correspond to the network device and the terminal device in the method embodiments. A corresponding module or unit performs a corresponding operation. For example, the communication unit (the transceiver) performs a receiving or sending operation in the method embodiments, and a operation other than the sending operation and the receiving operation may be performed by the processing unit (the processor). For a function of a specific unit, refer to a corresponding method embodiment. There may be one or more processors.

In the foregoing embodiments, the terminal device may be used as an example of a receiving device, and the network device may be used as an example of a sending device. However, this shall not constitute any limitation on this application. For example, both the sending device and the receiving device may be terminal devices. Specific types of the sending device and the receiving device are not limited in this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it is to be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel information feedback method, comprising:
generating first indication information, wherein the first indication information is determined based on a received precoded reference signal, and the received precoded reference signal corresponds to P reference signal ports; the first indication information indicates B complex coefficients, the B complex coefficients are determined from K complex coefficients according to a preset priority value, the K complex coefficients are determined from a complex coefficient set, the complex coefficient set comprises U complex coefficients that are determined for an $s^{th}$ reference signal port in S reference signal ports at each transport layer of Z transport layers, wherein $s=0, 1, \ldots, S-1$, the S reference signal ports are a part or all of the P reference signal ports, the U complex coefficients are a part or all of $T_s$ complex coefficients corresponding to the $s^{th}$ reference signal port, and the preset priority value is related to at least one of the following: an index value of each complex coefficient in the K complex coefficients, an index value of a reference signal port corresponding to each complex coefficient in the K complex coefficients in the S reference signal ports, and an index value of each complex coefficient in the K complex coefficients in a plurality of complex coefficients that are allowed to be selected for a corresponding reference signal port; wherein P, B, K, S, Z, and $T_s$ are positive integers, $B \leq K$, $U \leq T_s$, and $S \leq P$; and
sending the first indication information.

2. The method according to claim 1, wherein the preset priority value is further related to a quantity Z of transport layers.

3. The method according to claim 2, wherein the preset priority value satisfies $pri(z,s_z)=Z \cdot f_5(s_z)+z$, wherein $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\sum_{z=1}^{Z} K_z = K$.

4. The method according to claim 2, wherein $T_0 = T_1 = \ldots = T_{S-1} = T \geq 2$, the preset priority value satisfies $pri(z,s_z,u_{s_z})=Z \cdot S \cdot f_6(u_{s_z})+Z \cdot f_5(s_z)+z$, wherein $s_z=0, 1, \ldots, S-1$, $u_{s_z}=0, 1, \ldots, U-1$, $z=1, 2, \ldots, Z$, $pri(z,s_z,u_{s_z})$ represents a priority of a $u_{s_z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\sum_{z=1}^{Z} K_z = K$, $f_6(u_{s_z})$, represents an index value of the $u_{s_z}^{th}$ complex coefficient that is determined based on a complex coefficient corresponding to the $s_z^{th}$ reference signal port at the $z^{th}$ transport layer in the $K_z$ complex coefficients, $f_6(u_{s_z}) \in \{0, 1, \ldots, U-1\}$, U is a positive integer, $U \leq T$, and $K \leq S \times U \times Z$.

5. The method according to claim 3, wherein $f_5(s_z)=s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

6. The method according to claim 4, wherein $f_5(s_z)=s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, wherein the $u^{th}$ complex coefficient corresponding to the $s_z^{th}$ reference signal port is a complex coefficient whose index value is u on the $s_z^{th}$ reference signal port, the $u^{th}$ complex coefficient corresponding to the $(s_z+1)^{th}$ reference signal port is a complex coefficient whose index value is u on the $(s_z+1)^{th}$ reference signal port, and $u=0, 1, \ldots, U-1$.

7. The method according to claim 4, wherein $f_6(u_{s_z})=u_{s_z}$, and on the $s_z^{th}$ reference signal port at the $z^{th}$ transport layer, a smaller value of $u_{s_z}$ indicates a higher priority of a corresponding $u_{s_z}^{th}$ complex coefficient.

8. The method according to claim 6, wherein a smaller value of $pri(z,s_z,u_{s_z})$ indicates a higher priority of the $u_{s_z}^{th}$ complex coefficient corresponding to the $s_z^{th}$ reference signal port at the $z^{th}$ transport layer.

9. The method according to claim 7, wherein a smaller value of $pri(z,s_z,u_{s_z})$ indicates a higher priority of the $u_{s_z}^{th}$ complex coefficient corresponding to the $s_z^{th}$ reference signal port at the $z^{th}$ transport layer.

10. A communication apparatus, comprising:
at least one processor configured with processor-executable instructions to perform at least following operations:
generating first indication information, wherein the first indication information is determined based on a received precoded reference signal, and the received precoded reference signal corresponds to P reference signal ports; the first indication information indicates B complex coefficients, the B complex coefficients are determined from K complex coefficients according to a preset priority value, the K complex coefficients are determined from a complex coefficient set, the complex coefficient set comprises U complex coefficients that are determined for an $s^{th}$ reference signal port in S reference signal ports at each transport layer of Z transport layers, wherein s=0, 1, ..., S−1, the S reference signal ports are a part or all of the P reference signal ports, the U complex coefficients are a part or all of $T_s$ complex coefficients corresponding to the $s^{th}$ reference signal port, and the preset priority value is related to at least one of the following: an index value of each complex coefficient in the K complex coefficients, an index value of a reference signal port corresponding to each complex coefficient in the K complex coefficients in the S reference signal ports, and an index value of each complex coefficient in the K complex coefficients in a plurality of complex coefficients that are allowed to be selected for a corresponding reference signal port; wherein P, B, K, S, Z, and $T_s$ are positive integers, B≤K, U≤$T_s$, and S≤P; and sending the first indication information.

11. The apparatus according to claim 10, wherein the preset priority value is further related to a quantity Z of transport layers.

12. The apparatus according to claim 11, wherein the preset priority value satisfies $pri(z,s_z)=Z \cdot f_5(s_z)+z$, wherein $s_z=0, 1, \ldots, S-1$, $z=1, 2, \ldots, Z$, $pri(z,s_z)$, represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\sum_{z=1}^{Z} K_z = K$.

13. The apparatus according to claim 11, wherein $T_0=T_1=\ldots=T_{S-1}=T\geq 2$, the preset priority value satisfies $pri(z,s_z,u_{s,z})=Z \cdot S \cdot f_6(u_{s,z})+Z \cdot f_5(s_z)+z$, wherein $s_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, $\sum_{z=1}^{Z} K_z = K$, $f_6(u_{s,z})$ represents an index value of the $u_{s,z}^{th}$ complex coefficient that is determined based on a complex coefficient corresponding to the $s_z^{th}$ reference signal port at the $z^{th}$ transport layer in the $K_z$ complex coefficients, $f_6(u_{s,z}) \in \{0, 1, \ldots, U-1\}$, U is a positive integer, U≤T, and K≤S×U×Z.

14. The apparatus according to claim 12, wherein $f_5(s_z)=s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

15. The apparatus according to claim 13, wherein $f_5(s_z)=s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, wherein the $u^{th}$ complex coefficient corresponding to the $s_z^{th}$ reference signal port is a complex coefficient whose index value is u on the $s_z^{th}$ reference signal port, the $u^{th}$ complex coefficient corresponding to the $(s_z+1)^{th}$ reference signal port is a complex coefficient whose index value is u on the $(s_z+1)^{th}$ reference signal port, and u=0, 1, ..., U−1.

16. The apparatus according to claim 13, wherein $f_6(u_{s,z})=u_{s,z}$, and on the $s_z^{th}$ reference signal port at the $z^{th}$ transport layer, a smaller value of $u_{s,z}$ indicates a higher priority of a corresponding $u_{s,z}^{th}$ complex coefficient.

17. The apparatus according to claim 15, wherein a smaller value of $pri(z,s_z,u_{s,z})$ indicates a higher priority of the $u_{s,z}^{th}$ complex coefficient corresponding to the $s_z^{th}$ reference signal port at the $z^{th}$ transport layer.

18. The apparatus according to claim 16, wherein a smaller value of $pri(z,s_z,u_{s,z})$ indicates a higher priority of the $u_{s,z}^{th}$ complex coefficient corresponding to the $s_z^{th}$ reference signal port at the $z^{th}$ transport layer.

19. A communications chip comprising at least one processor, wherein the at least one processor is coupled with at least one memory that stores computer instructions, that when executed by the at least one processor, cause the communications chip to perform at least following operations:

generating first indication information, wherein the first indication information is determined based on a received precoded reference signal, and the received precoded reference signal corresponds to P reference signal ports; the first indication information indicates B complex coefficients, the B complex coefficients are determined from K complex coefficients according to a preset priority value, the K complex coefficients are determined from a complex coefficient set, the complex coefficient set comprises U complex coefficients that are determined for an $s^{th}$ reference signal port in S reference signal ports at each transport layer of Z transport layers, wherein s=0, 1, ..., S−1, the S reference signal ports are a part or all of the P reference signal ports, the U complex coefficients are a part or all of $T_s$ complex coefficients corresponding to the $s^{th}$ reference signal port, and the preset priority value is related to at least one of the following: an index value of each complex coefficient in the K complex coefficients, an index value of a reference signal port corresponding to each complex coefficient in the K complex coefficients in the S reference signal ports, and an index value of each complex coefficient in the K complex coefficients in a plurality of complex coefficients that are allowed to be selected for a corresponding reference signal port; wherein P, B, K, S, Z, and $T_s$ are positive integers, B≤K, U≤$T_s$, and S≤P; and sending the first indication information.

20. The communications chip according to claim 19, wherein the preset priority value is further related to a quantity Z of transport layers.

21. The communications chip according to claim 20, wherein the preset priority value satisfies $pri(z,s_z)=Z \cdot f_5(s_z)+z$, wherein $s_z=0, 1, \ldots, S-1$, $z=1, 2, \ldots, Z$, $pri(z,s_z)$ represents a priority of a complex coefficient corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) \in \{0, 1, \ldots, S-1\}$, $K_z$ represents a quantity of complex coefficients at the $z^{th}$ transport layer, and $\sum_{z=1}^{Z} K_z = K$.

22. The communications chip according to claim 20, wherein $T_0=T_1=\ldots=T_{S-1}=T\geq 2$, the preset priority value satisfies $pri(z,s_z,u_{s,z})=Z \cdot S \cdot f_6(u_{s,z})+Z \cdot f_5(s_z)+z$, wherein $S_z=0, 1, \ldots, S-1$, $u_{s,z}=0, 1, \ldots, U-1$, $z=1, 2, \ldots, Z$, $pri(z,s_z,u_{s,z})$ represents a priority of a $u_{s,z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) = \in \{0, 1, \ldots, S-1\}$, $K_z$ represents a quantity of complex coefficients at the $z^{th}$ transport layer, $\Sigma_{z=1}^{Z} K_z = K$, $f_6(u_{s_z})$ represents an index value of the $u_{s_z}^{th}$ complex coefficient that is determined based on a complex coefficient corresponding to the $s_z^{th}$ reference signal port at the $z^{th}$ transport layer in the $K_z$ complex coefficients, $f_6(u_{s_z}) = \in \{0, 1, \ldots, U-1\}$, U is a positive integer, U≤T, and K≤S×U×Z.

23. The communications chip according to claim 21, wherein $f_5(s_z) = s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

24. The communications chip according to claim 22, wherein $f_5(s_z) = s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, wherein the $u^{th}$ complex coefficient corresponding to the $s_z^{th}$ reference signal port is a complex coefficient whose index value is u on the $s_z^{th}$ reference signal port, the $u^{th}$ complex coefficient corresponding to the $(s_z+1)^{th}$ reference signal port is a complex coefficient whose index value is u on the $(s_z+1)^{th}$ reference signal port, and u=0, 1, ..., U-1.

25. The communications chip according to claim 22, wherein $f_6(u_{s_z}) = u_{s_z}$, and on the $s_z^{th}$ reference signal port at the $z^{th}$ transport layer, a smaller value of $u_{s_z}$ indicates a higher priority of a corresponding $u_{s_z}^{th}$ complex coefficient.

26. The communications chip according to claim 24, wherein a smaller value of $pri(z,s_z,u_{s_z})$ indicates a higher priority of the $u_{s_z}^{th}$ complex coefficient corresponding to the $s_z^{th}$ reference signal port at the $z^{th}$ transport layer.

27. The communications chip according to claim 25, wherein a smaller value of $pri(z,s_z,u_{s_z})$ indicates a higher priority of the $u_{s_z}^{th}$ complex coefficient corresponding to the $s_z^{th}$ reference signal port at the $z^{th}$ transport layer.

28. A non-transitory computer-readable storage medium storing computer instructions, that when executed by at least one processor, cause the at least one processor to perform at least following operations:
generating first indication information, wherein the first indication information is determined based on a received precoded reference signal, and the received precoded reference signal corresponds to P reference signal ports; the first indication information indicates B complex coefficients, the B complex coefficients are determined from K complex coefficients according to a preset priority value, the K complex coefficients are determined from a complex coefficient set, the complex coefficient set comprises U complex coefficients that are determined for an $s^{th}$ reference signal port in S reference signal ports at each transport layer of Z transport layers, wherein s=0, 1, ..., S−1, the S reference signal ports are a part or all of the P reference signal ports, the U complex coefficients are a part or all of $T_s$ complex coefficients corresponding to the $s^{th}$ reference signal port, and the preset priority value is related to at least one of the following: an index value of each complex coefficient in the K complex coefficients, an index value of a reference signal port corresponding to each complex coefficient in the K complex coefficients in the S reference signal ports, and an index value of each complex coefficient in the K complex coefficients in a plurality of complex coefficients that are allowed to be selected for a corresponding reference signal port; wherein P, B, K, S, Z, and $T_s$ are positive integers, B≤K, U≤$T_s$, and S≤P; and
sending the first indication information.

29. The non-transitory computer-readable storage medium according to claim 28, wherein the preset priority value is further related to a quantity Z of transport layers, and Z is a positive integer.

30. The non-transitory computer-readable storage medium according to claim 29, wherein the preset priority value satisfies $pri(z,s_z) = Z \cdot f_5(s_z) + z$, wherein $s_z = 0, 1, \ldots, S-1$, $z=1, 2, \ldots, Z$, $pri(z,s_z)$ represents a priority of a complex coefficient, corresponding to an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) = \in \{0, 1, \ldots, S-1\}$, $K_z$ represents a quantity of complex coefficients at the $z^{th}$ transport layer, and $\Sigma_{z=1}^{Z} K_z = K$.

31. The non-transitory computer-readable storage medium according to claim 29, wherein $T_0 = T_1 = \ldots = T_{S-1} = T \geq 2$, the preset priority value satisfies $pri(z,s_z,u_{s_z}) = Z \cdot S \cdot f_6(u_{s_z}) + Z \cdot f_5(s_z) + z$, wherein $s_z = 0, 1, \ldots, S-1$, $u_{s_z} = 0, 1, \ldots, U-1$, $z=1, 2, \ldots, Z$, $pri(z,s_z,u_{s_z})$ represents a priority of a $u_{s_z}^{th}$ complex coefficient on an $s_z^{th}$ reference signal port in the S reference signal ports at a $z^{th}$ transport layer in the Z transport layers, $f_5(s_z)$ represents an index value of the $s_z^{th}$ reference signal port that is at the $z^{th}$ transport layer and that is determined based on $K_z$ complex coefficients, $f_5(s_z) = \in \{0, 1, \ldots, S-1\}$, $K_z$ represents a quantity of complex coefficients at the $z^{th}$ transport layer, $\Sigma_{z=1}^{Z} K_z = K$, $f_6(u_{s_z})$ represents an index value of the $u_{s_z}^{th}$ complex coefficient that is, determined based on a complex coefficient corresponding to the $s_z^{th}$ reference signal port at the $z^{th}$ transport layer in the $K_z$ complex coefficients, $f_6(u_{s_z}) = \in \{0, 1, \ldots, U-1\}$, U is a positive integer, U≤T, and K≤S×U×Z.

32. The non-transitory computer-readable storage medium according to claim 30, wherein $f_5(s_z) = s_z$, and at the $z^{th}$ transport layer, the priority of the complex coefficient corresponding to the $s_z^{th}$ reference signal port is higher than a priority of a complex coefficient corresponding to an $(s_z+1)^{th}$ reference signal port.

33. The non-transitory computer-readable storage medium according to claim 31, wherein $f_5(s_z) = s_z$, and at the $z^{th}$ transport layer, a priority of a $u^{th}$ complex coefficient corresponding to the $s_z^{th}$ reference signal port is higher than a priority of a $u^{th}$ complex coefficient corresponding to an $(s_z+1)^{th}$ reference signal port, wherein the $u^{th}$ complex coefficient corresponding to the $s_z^{th}$ reference signal port is a complex coefficient whose index value is u on the $s_z^{th}$ reference signal port, the $u^{th}$ complex coefficient corresponding to the $(s_z+1)^{th}$ reference signal port is a complex coefficient whose index value is u on the $(s_z+1)^{th}$ reference signal port, and u=0, 1, ..., U-1.

34. The non-transitory computer-readable storage medium according to claim 31, wherein $f_6(u_{s_z}) = u_{s_z}$, and on the $s_z^{th}$ reference signal port at the $z^{th}$ transport layer, a smaller value of $u_{s_z}$ indicates a higher priority of a corresponding $u_{s_z}^{th}$ complex coefficient.

35. The non-transitory computer-readable storage medium according to claim 33, wherein a smaller value of $pri(z,s_z,u_{s_z})$ indicates a higher priority of the $u_{s_z}^{th}$ complex coefficient corresponding to the $s_z^{th}$ reference signal port at the $z^{th}$ transport layer.

36. The non-transitory computer-readable storage medium according to claim 34, wherein a smaller value of $pri(z, s_z, u_{s,z})$ indicates a higher priority of the $u_{s,z}{}^{th}$ complex coefficient corresponding to the $s_z{}^{th}$ reference signal port at the $z^{th}$ transport layer.

\* \* \* \* \*

UNITED STATES PATENT AND TRADEMARK OFFICE
CERTIFICATE OF CORRECTION

PATENT NO. : 12,224,833 B2
APPLICATION NO. : 18/331518
DATED : February 11, 2025
INVENTOR(S) : Jie Wang et al.

Page 1 of 2

It is certified that error appears in the above-identified patent and that said Letters Patent is hereby corrected as shown below:

In the Claims

In Column 84, In Line 20, In Claim 4, delete "$f_5(s_z)=\in \{0, 1, \ldots, S-1\}$," and insert -- $f_5(s_z)\in \{0, 1, \ldots, S-1\}$, --.

In Column 84, In Line 22, In Claim 4, delete "$f_6(u_{s,z})$," and insert -- $f_5(u_{s,z})$ --.

In Column 84, In Line 26, In Claim 4, delete "$f_6(u_{s,z})=\in \{0, 1, \ldots, U-1\}$," and insert -- $f_6(u_{s,z})\in \{0, 1, \ldots, U-1\}$, --.

In Column 85, In Line 26, In Claim 12, delete "$pri(z,s_z)$," and insert -- $pri(z,s_z)$ --.

In Column 85, In Line 44, In Claim 13, delete "$f_5(s_z)=\in \{0, 1, \ldots, S-1\}$," and insert -- $f_5(s_z)\in \{0, 1, \ldots, S-1\}$, --.

In Column 86, In Line 63, In Claim 22, delete "$S_z=0$," and insert -- $s_z=0$, --.

In Column 87, In Line 3, In Claim 22, delete "$f_5(s_z)=\in \{0, 1, \ldots, S-1\}$," and insert -- $f_5(s_z)\in \{0, 1, \ldots, S-1\}$, --.

In Column 87, In Line 9, In Claim 22, delete "$f_6(u_{s,z})=\in \{0, 1, \ldots, U-1\}$," and insert -- $f_6(u_{s,z})\in \{0, 1, \ldots, U-1\}$, --.

In Column 88, In Line 6-7, In Claim 29, delete "layers, and Z is a positive integer." and insert -- layers. --.

In Column 88, In Line 12, In Claim 30, delete "coefficient," and insert -- coefficient --.

Signed and Sealed this
Fifteenth Day of July, 2025

Coke Morgan Stewart
*Acting Director of the United States Patent and Trademark Office*

CERTIFICATE OF CORRECTION (continued)
U.S. Pat. No. 12,224,833 B2

In Column 88, In Line 30, In Claim 31, delete "$f_5(s_z)=\in\{0, 1, \ldots, S-1\}$," and insert -- $f_5(s_z)\in\{0, 1, \ldots, S-1\}$, --.

In Column 88, In Line 33, In Claim 31, delete "is," and insert -- is --.

In Column 88, In Line 36, In Claim 31, delete "$f_6(u_{s,z})=\in\{0, 1, \ldots, U-1\}$," and insert -- $f_6(u_{s,z})\in\{0, 1, \ldots, U-1\}$, --.